US012568355B2

(12) United States Patent
    Speidel et al.

(10) Patent No.:     US 12,568,355 B2
(45) Date of Patent:         Mar. 3, 2026

(54) RECEIVER-BASED COMPUTATION OF TRANSMITTER PARAMETERS AND STATE FOR COMMUNICATIONS BEYOND DESIGN RANGES OF A CELLULAR NETWORK PROTOCOL

(71) Applicant: Lynk Global, Inc., Falls Church, VA (US)

(72) Inventors: Tyghe Robert Speidel, Washington, DC (US); Anders Buvarp, Boulder, CO (US); James Liu, South Riding, VA (US)

(73) Assignee: Lynk Global, Inc., Falls Church, VA (US)

( * ) Notice: Subject to any disclaimer, the term of this patent is extended or adjusted under 35 U.S.C. 154(b) by 474 days.

(21) Appl. No.: 18/059,946

(22) Filed: Nov. 29, 2022

(65) Prior Publication Data

US 2023/0179990 A1      Jun. 8, 2023

Related U.S. Application Data

(63) Continuation-in-part of application No. 17/387,974, filed on Jul. 28, 2021, now Pat. No. 11,546,726.
(Continued)

(51) Int. Cl.
    H04W 8/22           (2009.01)
(52) U.S. Cl.
    CPC ..................................... H04W 8/22 (2013.01)
(58) Field of Classification Search
    CPC ........... H04W 56/001; H04W 72/0446; H04W 56/0025; H04W 16/28; H04W 84/06;
(Continued)

(56) References Cited

U.S. PATENT DOCUMENTS

2008/0053212 A1    3/2008   Karaoguz et al.
2008/0056212 A1    3/2008   Karaoguz
                           (Continued)

FOREIGN PATENT DOCUMENTS

WO          2020051508 A1     3/2020

OTHER PUBLICATIONS

International Search report from PCT Application No. PCT/US2021/043561, Mailed Oct. 20, 2021.
                           (Continued)

*Primary Examiner* — Kwasi Karikari
(74) *Attorney, Agent, or Firm* — Haynes and Boone, LLP

(57)          ABSTRACT

A telecommunications receiver is adapted to communicate with mobile devices that operate according to a protocol where the telecommunications receiver operates outside of expected ranges for the protocol but modifies its communications with mobile devices to appear to those mobile devices as being within the expected ranges. To determine what modifications to make to transmissions, the telecommunication receiver processes signals from mobile devices to determine where a communications channel is relative to the expected ranges and uses that information to modify transmissions to mobile devices. The expected ranges might relate to maximum distance between telecommunications receiver and a mobile device, maximum relative velocity, power etc. Determining a relative velocity, and therefore a Doppler shift, can be done by determining a fractional frequency offset, determining an expected subchannel, and determining an integer frequency offset based on the expected subchannel carrier frequency and the measured carrier frequency.

20 Claims, 47 Drawing Sheets

Related U.S. Application Data

(60) Provisional application No. 63/057,756, filed on Jul. 28, 2020.

(58) Field of Classification Search
CPC ..... H04W 24/10; H04W 4/025; H04W 4/027; H04W 64/006; H04W 74/00; H04W 80/00
See application file for complete search history.

(56) References Cited

U.S. PATENT DOCUMENTS

| | | |
|---|---|---|
| 2015/0270890 A1 | 9/2015 | Vasavada |
| 2015/0381264 A1 | 12/2015 | Collins et al. |
| 2018/0241464 A1 | 8/2018 | Michaels |
| 2019/0199431 A1 | 6/2019 | Speidel et al. |
| 2019/0334615 A1 | 10/2019 | Speidel et al. |
| 2021/0120590 A1* | 4/2021 | Medles ................. H04L 27/266 |

OTHER PUBLICATIONS

Cui Gaofeng et al.: "Enhanced Timing Advanced Estimation With Symmetric Zadoff-Chu Sequences for Satellite Systems", IEEE Communications Letters, IEEE Service Center, Piscataway, NJ, US, vol. 19, No. 5, May 1, 2015, pp. 747-750, XP011580683, ISSN: 1089-7798, DOI: 10.1109/LCOMM.2015.2411610 [retrieved on May 7, 2015].

Ericsson: "On NTN synchronization, random 1-15 access, and timing advance", 3GPP Draft; RI-1910982 on NTN Synchronization, Random Access, and Timing Advance, 3rd Generation Partnership Project (3GPP), Mobile Competence Centre; 650, Route Des Lucioles; F-06921 Sophia-Antipol, vol. RAN WG1, No. Chongqing, China; Oct. 14, 2019-Oct. 20, 2019, Oct. 5, 2019, XP051789762, Retrieved from the Internet: URL:http://www.3gpp.org/ftp/tsg_ran/WG1_RL 1/TSGR1_98b/Docs/R1-1910982.zip [retrieved on Oct. 5, 2019].

Extended European Search Report, mailed Jun. 24, 2024, in European Patent Application No. 21848739.5, filed Jul. 28, 2021, 12 pages.

Zhen Li et al: "Sounding reference signal 1-15 based timing advance adjustment for LTE-satellite mobile communication systems", 2016 19th International Symposium on Wireless Personal Multimedia Communications (WPMC), National Institute of Information and Communications Technology (NICT), Nov. 14, 2016, pp. 287-292, XP033106548, [retrieved on Jun. 20, 2017].

* cited by examiner

PRACH Configuration Index Table

| PRACH Config. Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2 ,7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1 6 |
| 23 | 1 | Any | 2 ,7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | NIA | NIA | NIA |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2 ,7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | NIA | NIA | NIA |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1 6 |
| 55 | 3 | Any | 2 ,7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | NIA | NIA | NIA |
| 61 | NIA | NIA | NIA |
| 62 | NIA | NIA | NIA |
| 63 | 3 | Even | 9 |

FIG. 1

PRACH Preamble Formats
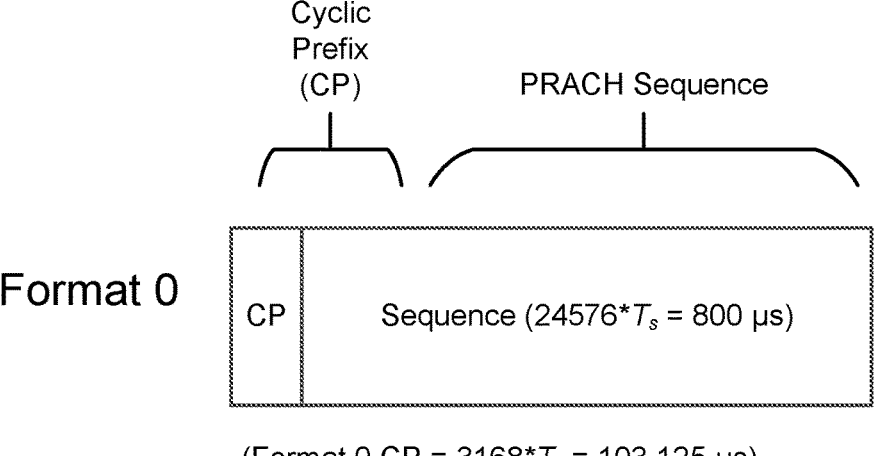
Format 0
(Format 0 CP = $3168*T_s$ = 103.125 µs)
Format 1
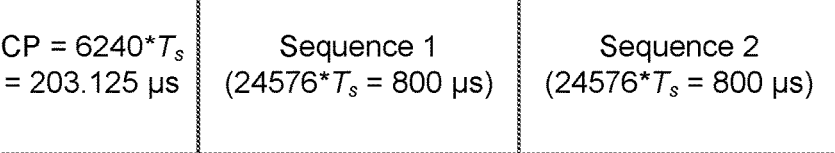
Format 2
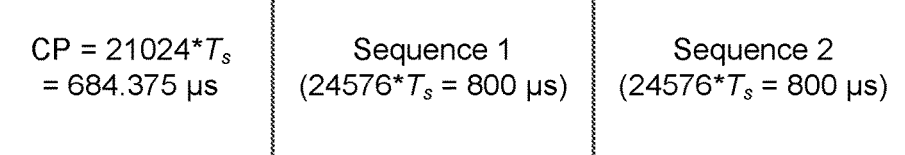
Format 3
FIG. 2

RAR Window Timing

RAR w/Guard

MAC RAR Protocol Data Unit (PDU)

MAC RAR Protocol Data Unit (PDU) Header Format

Uplink Doppler Shift [Hz] and 1-Way Propagation Delay [µs]

- Fs　　3840 samples/ms (30.72 Msps/8)
- step　　25 µs or 96 samples
- accu　　100 µs or 384 samples
- dist　　800 µs or 3072 samples
- save　　875 µs or 3360 samples
- W　　500 µs or 1920 samples
- R　　10 ms/W
- S　　90 ('Length of Format 3'/step + 1 before + 1 after)
- U　　30
- Q　　20
- J　　17

Delayed Auto-Correlation Output of a PRACH with Config Index 51

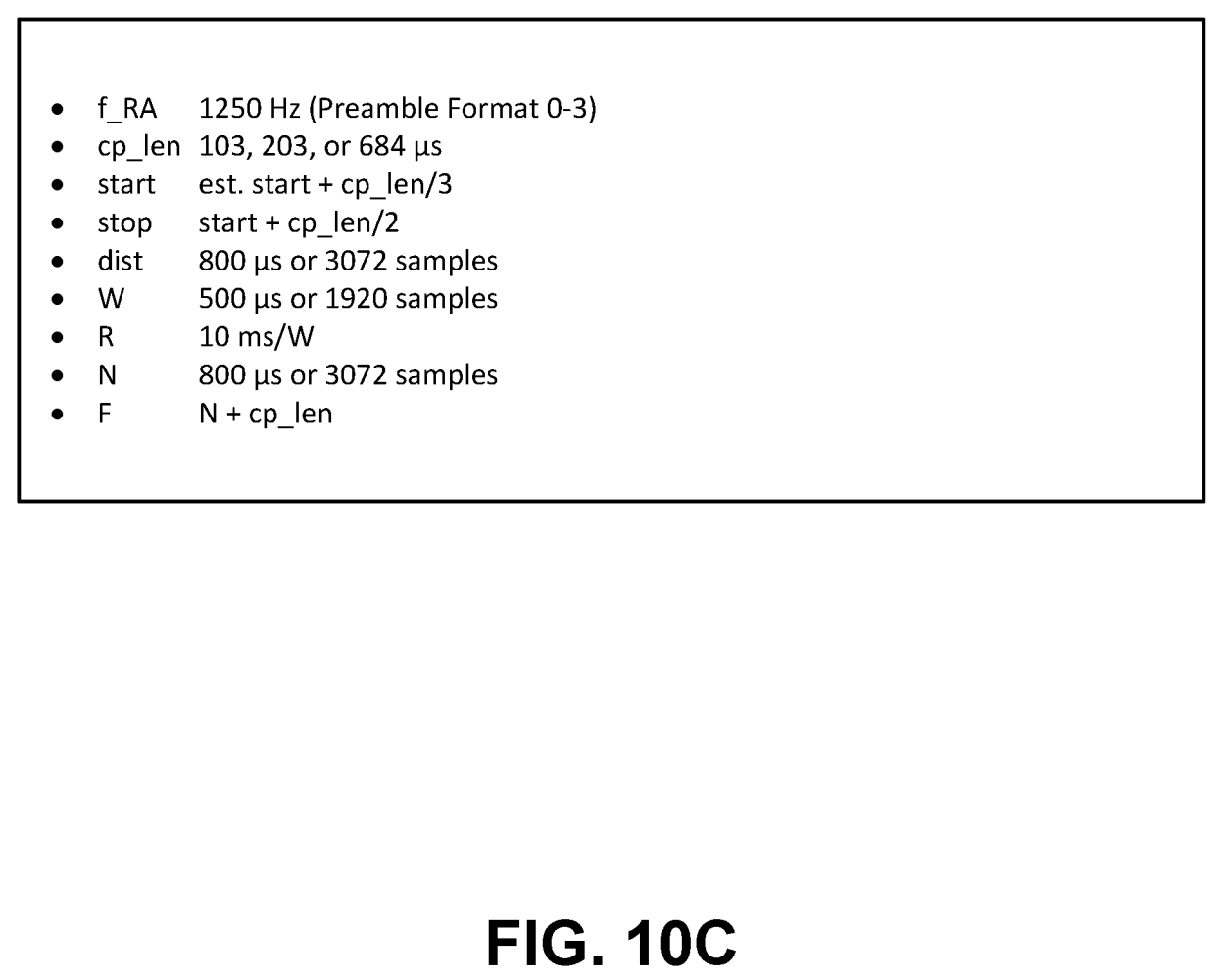

- f_RA    1250 Hz (Preamble Format 0-3)
- cp_len  103, 203, or 684 µs
- start   est. start + cp_len/3
- stop    start + cp_len/2
- dist    800 µs or 3072 samples
- W       500 µs or 1920 samples
- R       10 ms/W
- N       800 µs or 3072 samples
- F       N + cp_len

FIG. 10C

NCO Based on Look-up Table

NCO Output with Spurs

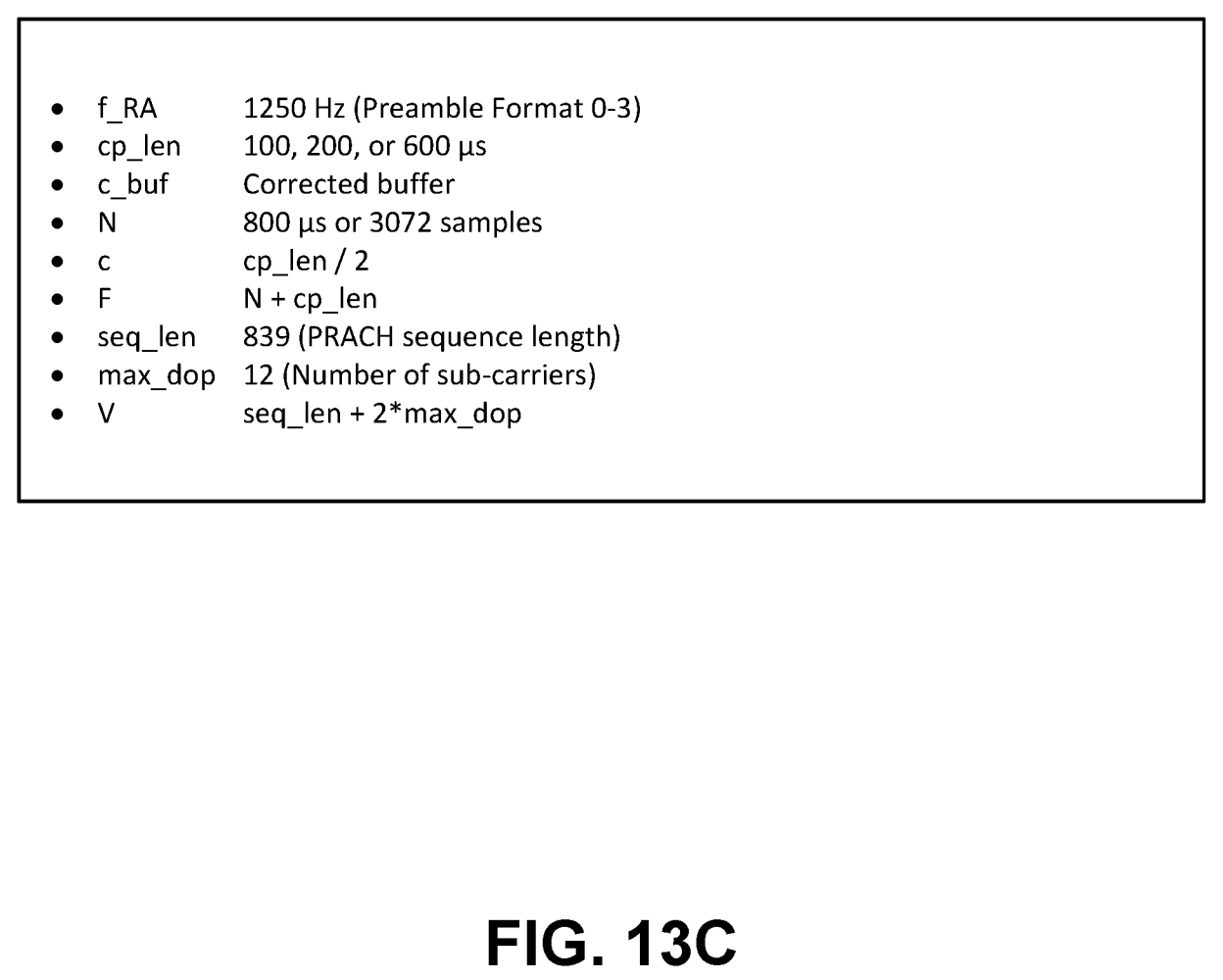

- f_RA      1250 Hz (Preamble Format 0-3)
- cp_len    100, 200, or 600 μs
- c_buf     Corrected buffer
- N         800 μs or 3072 samples
- c         cp_len / 2
- F         N + cp_len
- seq_len   839 (PRACH sequence length)
- max_dop   12 (Number of sub-carriers)
- V         seq_len + 2*max_dop

FIG. 13C

Cross-correlation with a PRACH reference

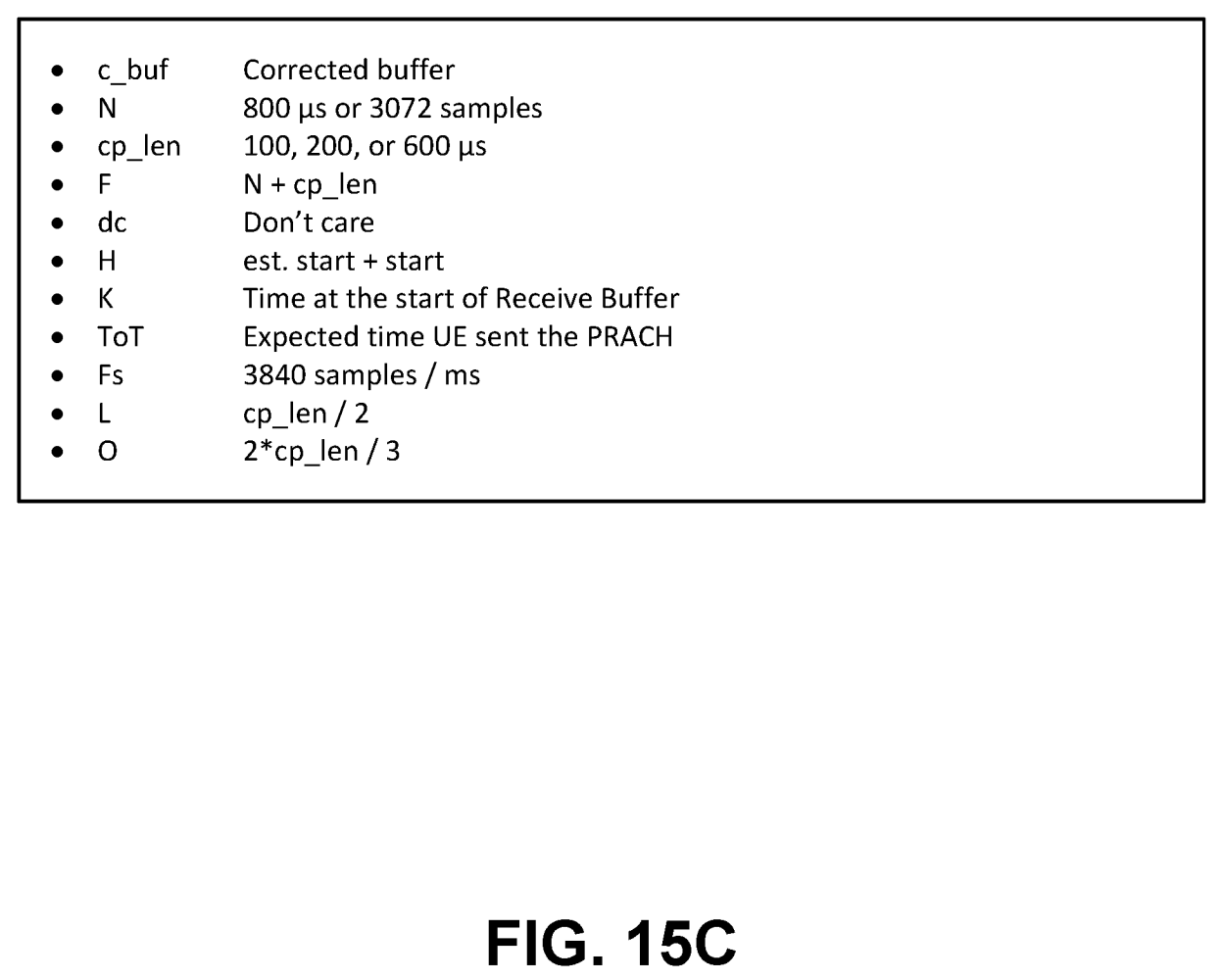

- c_buf    Corrected buffer
- N    800 μs or 3072 samples
- cp_len    100, 200, or 600 μs
- F    N + cp_len
- dc    Don't care
- H    est. start + start
- K    Time at the start of Receive Buffer
- ToT    Expected time UE sent the PRACH
- Fs    3840 samples / ms
- L    cp_len / 2
- O    2*cp_len / 3

FIG. 15C

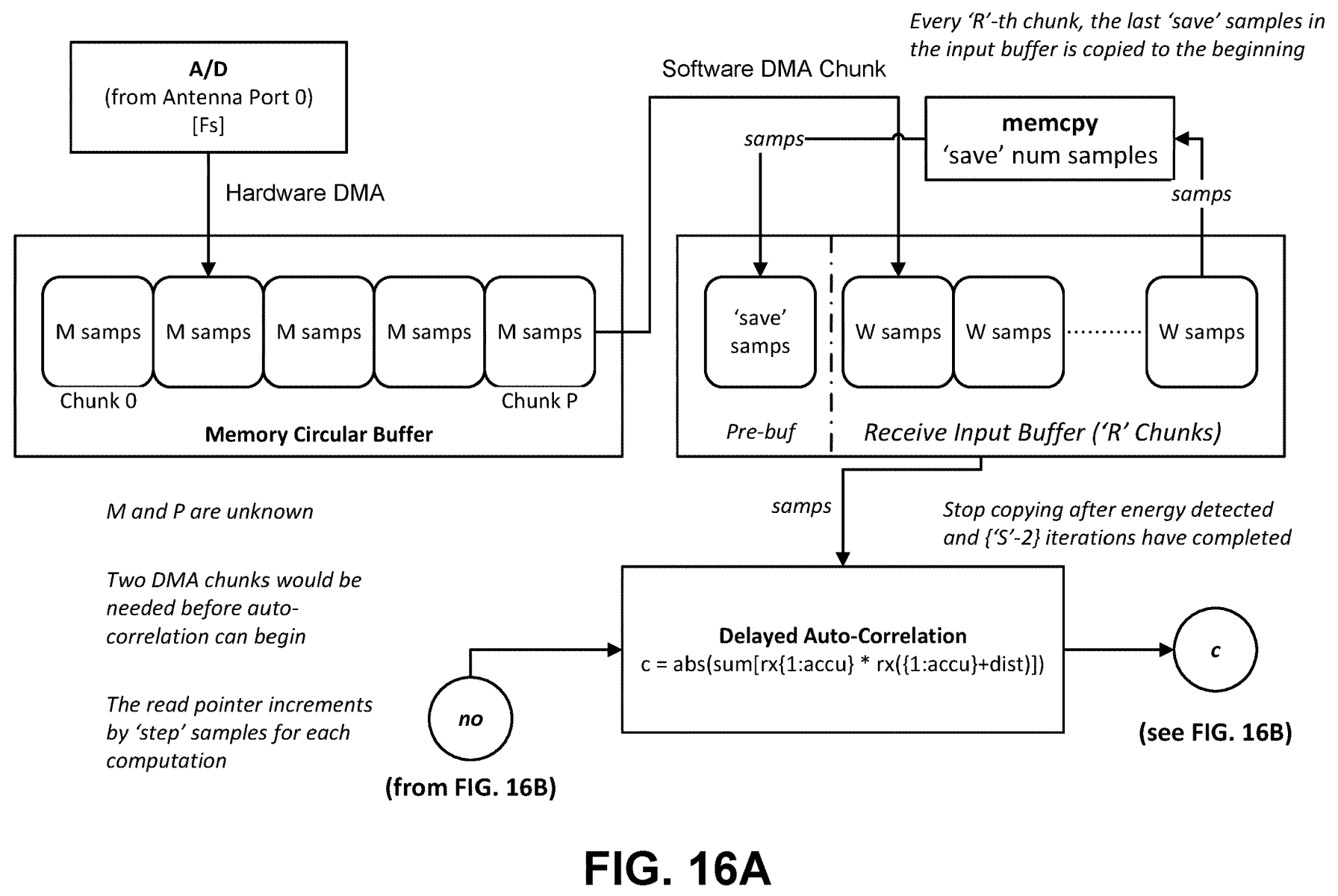

*Every 'R'-th chunk, the last 'save' samples in the input buffer is copied to the beginning* memcpy 'save' num samples

Software DMA Chunk

W samps ......... W samps | W samps | W samps

*Receive Input Buffer ('R' Chunks)* samps

'save' samps

*Pre-buf* samps

*Stop copying after energy detected and ('S'-2) iterations have completed* c (see FIG. 16B)

Delayed Auto-Correlation c = abs(sum[rx{1:accu} * rx({1:accu}+dist)])

A/D
(from Antenna Port 0)
[Fs]

Hardware DMA

M samps | M samps | M samps | M samps | M samps | M samps

Chunk 0                                          Chunk P

Memory Circular Buffer

*M and P are unknown*

*Two DMA chunks would be needed before auto-correlation can begin*

*The read pointer increments by 'step' samples for each computation* no (from FIG. 16B)

FIG. 16A

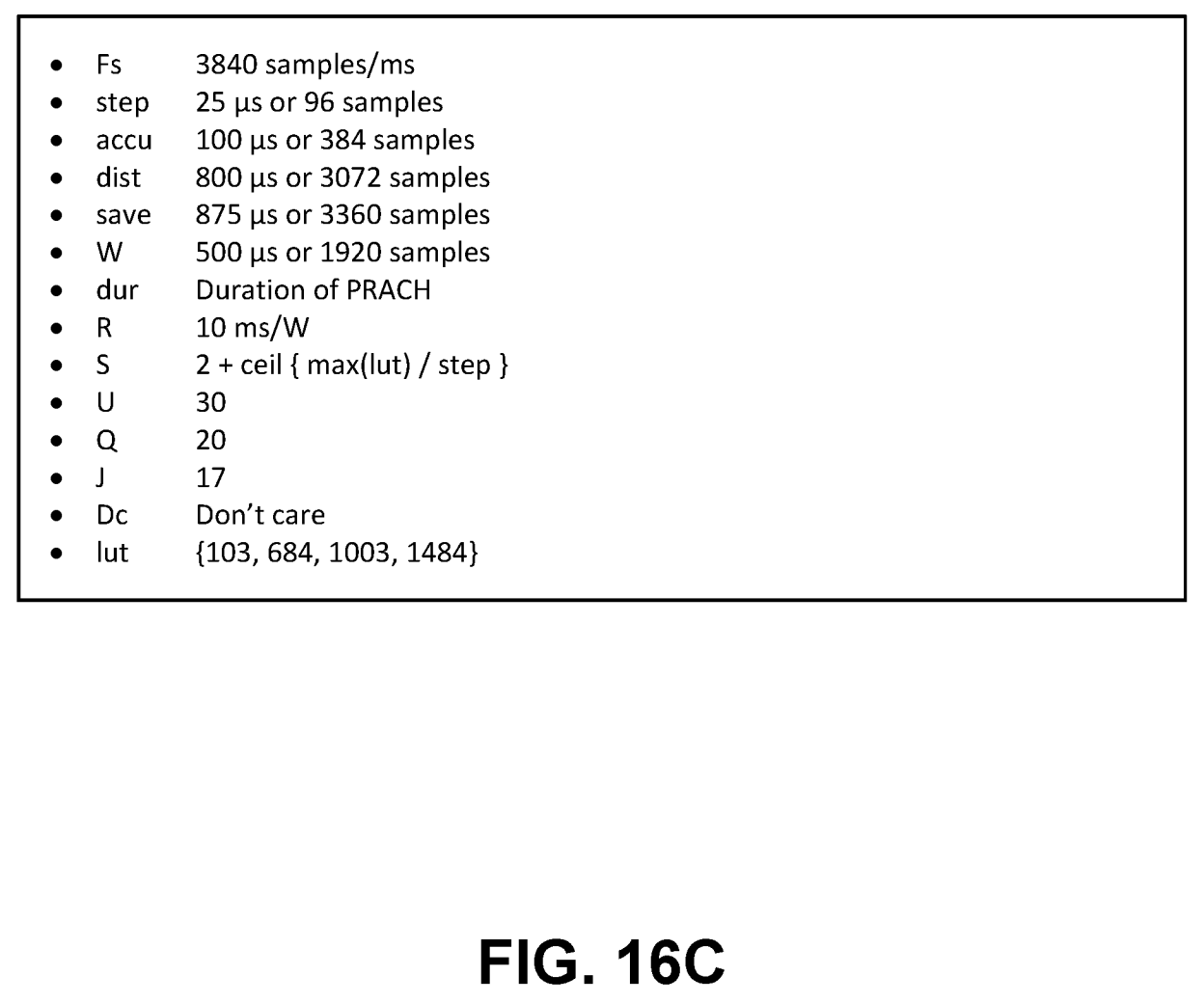

- Fs    3840 samples/ms
- step    25 μs or 96 samples
- accu    100 μs or 384 samples
- dist    800 μs or 3072 samples
- save    875 μs or 3360 samples
- W    500 μs or 1920 samples
- dur    Duration of PRACH
- R    10 ms/W
- S    $2 + \text{ceil} \{ \max(\text{lut}) / \text{step} \}$
- U    30
- Q    20
- J    17
- Dc    Don't care
- lut    {103, 684, 1003, 1484}

FIG. 16C

Delayed PRACH auto-correlation on received samples

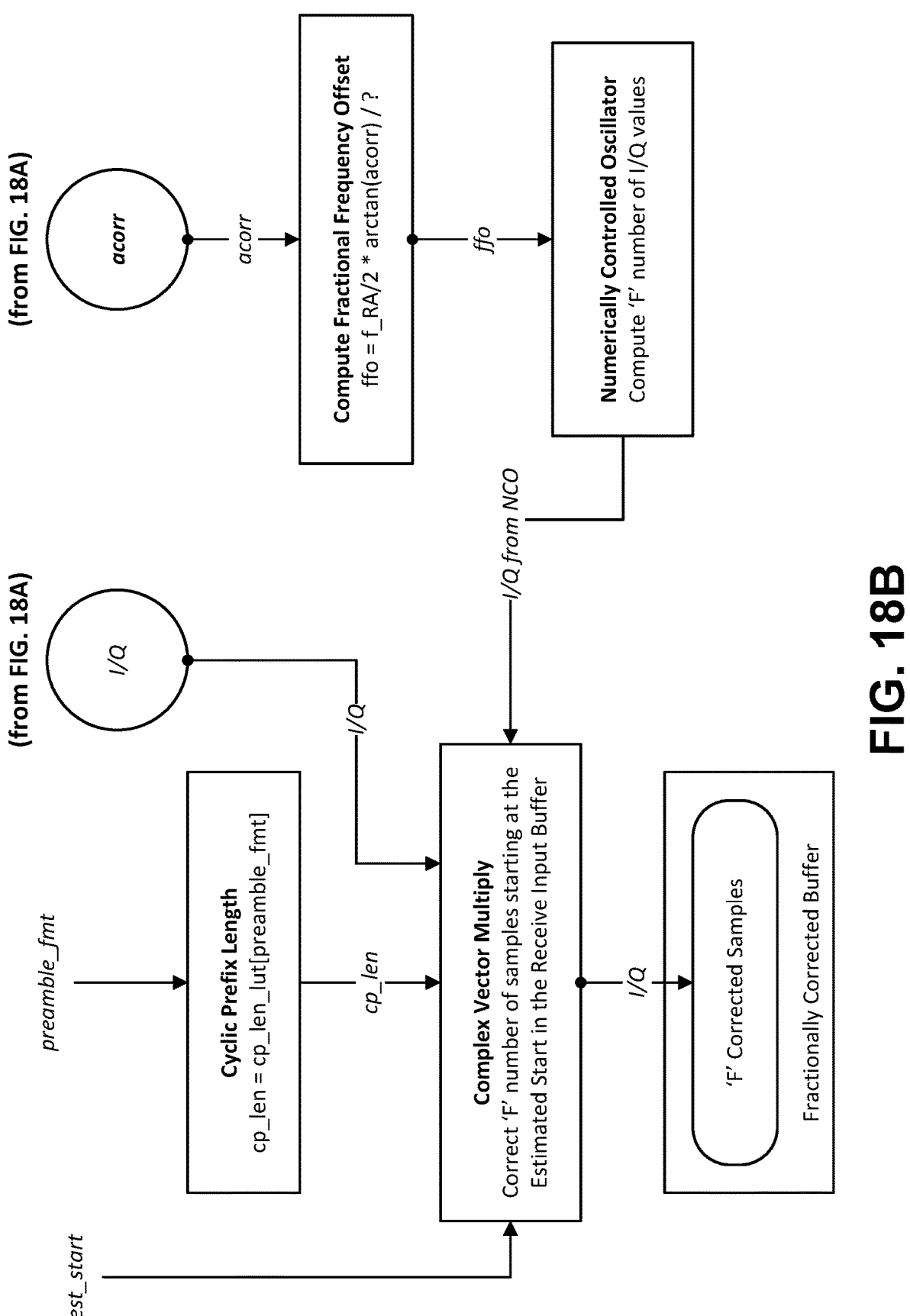

(from FIG. 18A)

acorr acorr

Compute Fractional Frequency Offset
ffo = f_RA/2 * arctan(acorr) / ?

ffo

Numerically Controlled Oscillator
Compute 'F' number of I/Q values

I/Q from NCO (from FIG. 18A)

I/Q

I/Q preamble_fmt

Cyclic Prefix Length
cp_len = cp_len_lut[preamble_fmt]

cp_len

Complex Vector Multiply
Correct 'F' number of samples starting at the
Estimated Start in the Receive Input Buffer

I/Q

'F' Corrected Samples

Fractionally Corrected Buffer est_start

FIG. 18B

- f_RA     1250 Hz (Preamble Format 0-3)
- cp_len_lut {103, 684, 203, 684} μs
- start     est. start + cp_len/3
- stop     start + cp_len/2
- dist     800 μs or 3072 samples
- W     500 μs or 1920 samples
- R     10 ms/W
- N     800 μs or 3072 samples
- F     N + cp_len (from FIG. 19A)

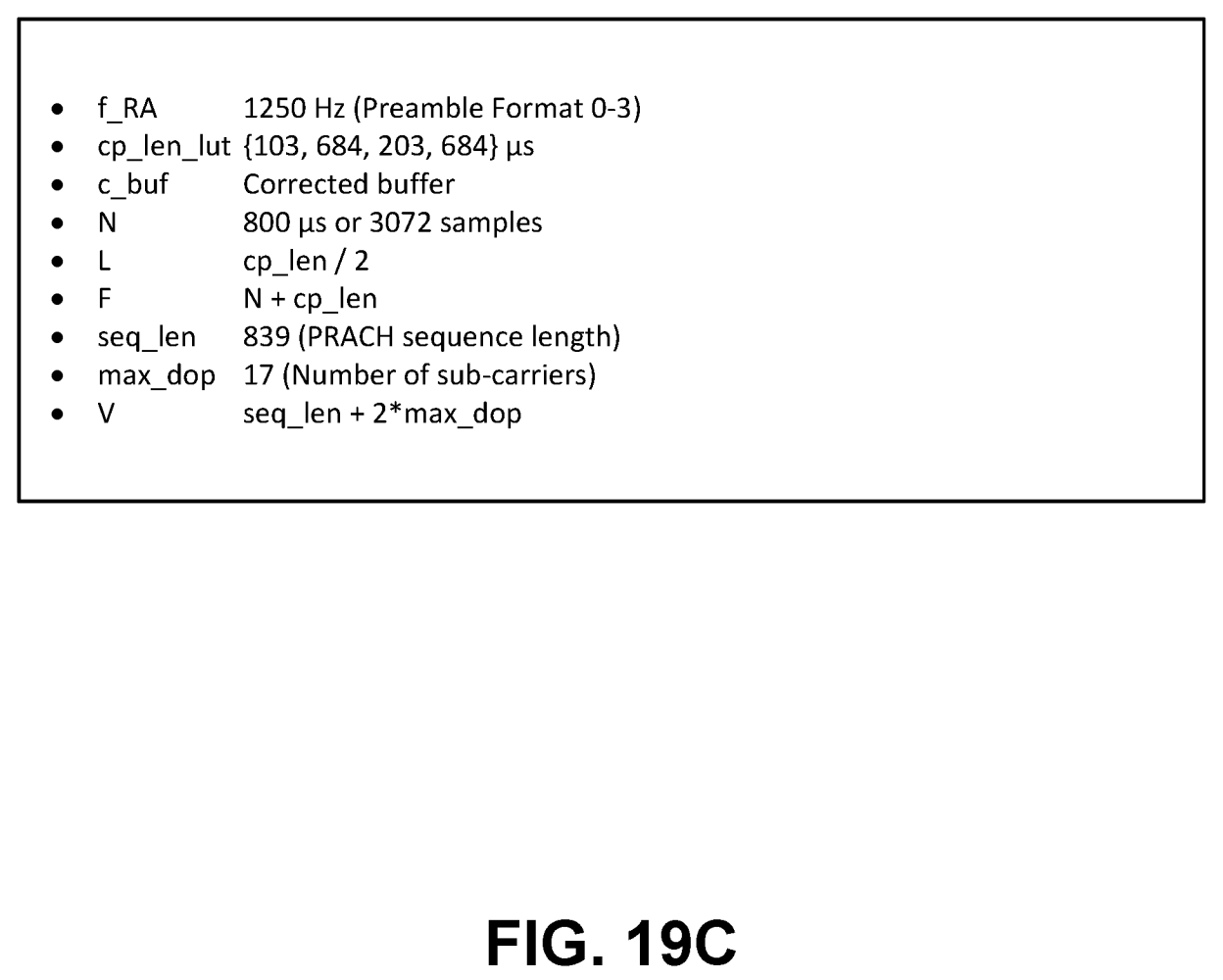

- f_RA            1250 Hz (Preamble Format 0-3)
- cp_len_lut  {103, 684, 203, 684} μs
- c_buf          Corrected buffer
- N               800 μs or 3072 samples
- L                cp_len / 2
- F                N + cp_len
- seq_len       839 (PRACH sequence length)
- max_dop    17 (Number of sub-carriers)
- V                seq_len + 2*max_dop

FIG. 19C

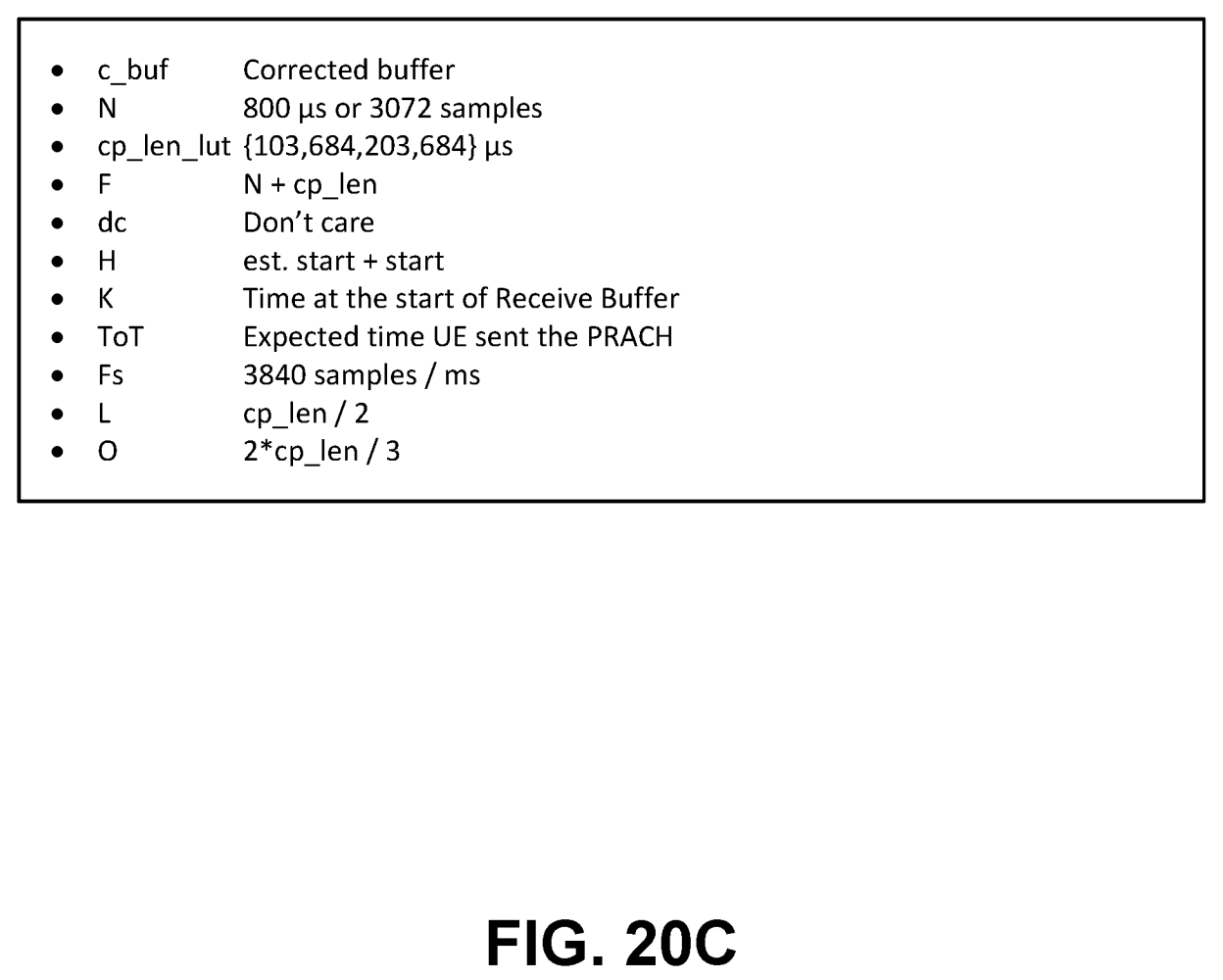

- c_buf     Corrected buffer
- N     800 μs or 3072 samples
- cp_len_lut     {103,684,203,684} μs
- F     N + cp_len
- dc     Don't care
- H     est. start + start
- K     Time at the start of Receive Buffer
- ToT     Expected time UE sent the PRACH
- Fs     3840 samples / ms
- L     cp_len / 2
- O     2*cp_len / 3

FIG. 20C

- Fs     3840 samples/ms
- cp     5.2 µs or 20 samples
- dst     66.67 µs or 256 samples
- W     500 µs or 1920 samples
- P     {cp+dst} samples
- ξ     TBD
- ax     0 to cp+1

FIG. 22C

Frequency Offset Estimator (PRIOR ART)

RECEIVER-BASED COMPUTATION OF TRANSMITTER PARAMETERS AND STATE FOR COMMUNICATIONS BEYOND DESIGN RANGES OF A CELLULAR NETWORK PROTOCOL

CROSS-REFERENCES TO PRIORITY AND RELATED APPLICATIONS

This application is continuation-in-part of U.S. application Ser. No. 17/387,974 filed Jul. 28, 2021, entitled, "Receiver-Based Computation of Transmitter Parameters and State for Communications Beyond Design Ranges of a Cellular Network Protocol," which is a non-provisional of, and claims the benefit of and priority from, U.S. Provisional Patent Application No. 63/057,756 filed Jul. 28, 2020, entitled "Cellular Receiver with Enhanced Doppler and Propagation Delay Capability."

The following applications are related and may be referenced herein:

1) U.S. Pat. No. 10,084,535, issued Sep. 25, 2018, entitled "Method and Apparatus for Handling Communications between Spacecraft Operating in an Orbital Environment and Terrestrial Telecommunications Devices That Use Terrestrial Base Station Communications" (hereinafter "Speidel I");

2) U.S. Pat. No. 10,742,311, issued Aug. 11, 2020, entitled "Simplified Inter-Satellite Link Communications Using Orbital Plane Crossing to Optimize Inter-Satellite Data Transfers" (hereinafter "Speidel II"); and 3) U.S. Provisional Patent Application No. 62/490,298 filed Apr. 26, 2017, entitled "Method for Communications between Base Stations Operating in an Orbital Environment and Ground-Based Telecommunications Devices" (hereinafter "Speidel III").

U.S. patent application Ser. No. 17/274,374, filed Mar. 8, 2021, entitled "Cellular Core Network and radio Access Network Infrastructure and Management in Space" (hereinafter "Speidel IV").

The entire disclosures of applications/patents recited above are hereby incorporated by reference, as if set forth in full in this document, for all purposes.

FIELD

The present disclosure generally relates to cellular telecommunications generally and more particularly to receivers determining transmitter parameters and state for configuring receiver-transmitter communications according to a cellular network protocol.

BACKGROUND

Communications protocols allow for distributed creation and operation of devices that can compatibly communicate. In a cellular telecommunications network, devices that conform to the protocol or protocols in use in such networks can typically intercommunicate easily. For example, the 3rd Generation Partnership Project ("3GPP") is an organization that coordinates telecommunications standard development organizations such as ARIB, ATIS, CCSA, ETSI, TSDSI, TTA, TTC and generates protocol specifications often referred to as "3GPP technologies". A mobile device that is compliant with a protocol in use can connect to a network that is reachable and it may be that other protocol-compliant devices on that network can intercommunicate. A mobile device, such as a mobile telephone, smartphone, data terminal, etc. might be constructed to comply with one or more protocols, such as 2G protocols (e.g. GSM, GPRS, EDGE, etc.), 3G protocols (e.g. UMTS, etc.), 4G protocols (e.g. LTE, etc.), and 5G protocols (e.g. NR, NB-IoT, etc.).

In a typical terrestrial cellular telecommunications network, a plurality of mobile devices communicates with a plurality of telecommunications infrastructure elements. Telecommunications infrastructure might comprise hardware that could include, but not be limited to, towers, antennas, radios, transceivers, digital signal processors, electrical cabinets, servers, computers, etc. This telecommunications infrastructure is typically organized by functionality and connects together as an integrated system to manage telecommunications traffic amount the various mobile devices which is serves. This integrated system may comprise one, or more, networks and networks themselves are typically designed to also connect to each other through a variety of interfaces and protocols. Some of these protocols and interfaces may include, but are not limited to TCP/IP, ISDN, SS7, etc. A terrestrial cellular network, and their functionalities, might be used in the context of a typical LTE cellular network, however, the structure and functionality behind this type of network could be used for other terrestrial cellular networks, such as a GSM, CDMA, EDGE, UMTS, etc. network.

Often a protocol will specify acceptable ranges for variation, such as frequency variations from a predetermined frequency, timing variations from a predetermined time window, code variations and allowable errors, and the like. For example, a protocol might specify that a device is to transmit at a frequency, F, and another device should support receiving signals within a frequency band, $F_{min}$ to $F_{max}$, that includes the specified frequency F and that the receiving device does not need to process received signals outside that frequency band and can treat such signals as noise. Given that, it would be expected that devices that are protocol-compliant would expect that a signal sent at frequency F that might shift in frequency in flight but remain between $F_{min}$ and $F_{max}$, would be correctly received. As a result, robust devices are often designed so that they are protocol-compliant.

In part, protocol compliance directs design of devices based on expected conditions. For example, a terrestrial mobile telephone device might be constructed to comply with a protocol that allows for communication with cellular telephone towers that are within 35 kilometers of the terrestrial mobile telephone device and so the terrestrial mobile telephone device would be constructed to handle variations in signal delays between 0 and around 117 microseconds (the time delay for a signal to travel around 35 kilometers). Problems can arise when communication needs to occur over a longer distance than what the protocol specifies and what the device is constructed or programmed for.

As one example, it might be desirable to communicate with a terrestrial mobile telephone device from a base station in Earth orbit without having to modify the terrestrial mobile telephone device. Since the base station must be further than 35 kilometers to stay in orbit and must be travelling relatively fast relative to the terrestrial mobile telephone device to stay in orbit, the base station should account for time delays, Doppler shifts, signal powers, etc. that would be outside the specifications of the protocols in use. One approach is to modify the terrestrial mobile telephone device to accommodate satellite communications, but often this is impractical or economically infeasible.

Speidel I describes various solutions to provide for communications between an orbital base station and a terrestrial telecommunications device that use terrestrial base station communications protocols, where it appears to the terrestrial telecommunications device that the orbital base station is a terrestrial base station, thus obviating the need for modification of the hardware and protocols used by the terrestrial telecommunications device. For example, the orbital base station might shift a signal in frequency to account for Doppler shifts due to satellite orbital velocity and might time a transmission such that the time-of-flight delay does not cause the transmission to be outside a window specified by the protocol. Of course, it is not possible for an orbital base station to send a signal so that the time-of-flight delay is less than the speed of light propagation over the distance between the orbital base station and the terrestrial telecommunications, but the orbital base station can time the transmission to a subsequent transmission slot such that it is received timely but in a later slot.

For an orbital base station to be able to adjust timing, frequency, etc. to appear correct to the terrestrial device, the orbital base station needs to know, or at least estimate, parameters and/or state of the terrestrial device, such as where it is relative to the orbital base station and how fast their relative movement is. Since an orbital base station typically has an ability to determine its own position and velocity (or more generally, its position, its first derivative of position, and possibly higher derivatives), if the terrestrial device provides its location and velocity, the orbital base station could compute the adjustments that would be needed. A problem arises in that terrestrial devices, such as mobile telephones constructed according to some terrestrial telecommunications protocols, do not normally need to provide their position and the protocols do not normally include that. There are some protocols, such as those associated with emergency services, wherein a device communicates its present location, but such protocols often only operate after a communications link is established between the device and a base station.

Thus, if would be desirable if an orbital base station (or other base station that operates outside of normal conditions of terrestrial base stations) had a reliable mechanism and process for determining parameters and/or state of a terrestrial device sufficient to enable the base station to receive communications from the terrestrial device and establish a communications link according to some protocol for which the terrestrial device is constructed, even when the base station is operating outside conditions for which the terrestrial device is constructed.

SUMMARY

Methods and apparatus are described in which, among other things, a base station in a cellular network that is communicating with mobile devices, or attempting to, while the base station is under conditions that are outside some assumptions made by protocols used by the mobile devices can modify base station communications so that communications with the mobile devices appear to those mobile devices to be with a base station that is within the assumptions. In order to determine modifications needed, the base station will determine a mobile device's location, parameters, state, etc. from communications from those mobile devices and use those determinations to modify the base station communications. More generally, the base station determines conditions of the channel between the base station and a mobile device, including relations between the base station and the mobile device.

A telecommunications receiver can be adapted to communicate with mobile devices that operate according to a protocol where the telecommunications receiver operates outside of expected ranges for the protocol but modifies its communications with mobile devices to appear to those mobile devices as being within the expected ranges. To determine what modifications to make to transmissions, the telecommunication receiver processes signals from mobile devices to determine where a communications channel is relative to the expected ranges and uses that information to modify transmissions to mobile devices. The expected ranges might relate to maximum distance between telecommunications receiver and a mobile device, maximum relative velocity, power etc. Determining a relative velocity, and therefore a Doppler shift, can be done by determining a fractional frequency offset, determining an expected subchannel, and determining an integer frequency offset based on the expected subchannel carrier frequency and the measured carrier frequency.

In a specific example, a base station receives a transmission from a mobile device wherein the transmission is according to a predetermined protocol and from what was received and what is prescribed by the protocol, the base station might determine a distance between the base station and the mobile device, a relative velocity, a variance of local oscillators, channel noise, interference, and other conditions. In response, the base station will transmit a signal to the mobile device that is modified, as needed, so that when that signal is received by the mobile device, it is consistent with the protocol. The base station might be outside some assumptions made by the protocols, such as where the protocols assume a base station-to-mobile device distance of less than 100 km and a relative velocity of less than 1,000 km/hour but the base station is more than 300 km away and has a relative velocity of more than 10,000 km/hour, as might be required for orbital base stations communicating with mobile devices not specifically configured for satellite communications.

A telecommunications receiver, as might be launched into orbit as part of a space vehicle or satellite, might be adapted to communicate with mobile devices on Earth that are adapted to communicate according to a communications protocol, wherein the communications protocol includes constraints as to a relative distance between the telecommunications receiver and the mobile device and relative velocity of the telecommunications receiver to the mobile device, and wherein a deployment of the telecommunications receiver, in orbit or otherwise, is such that the telecommunications receiver will be further from the mobile device than a maximum distance specified by the communications protocol and will be moving relative to the mobile device at more than a maximum relative velocity specified by the communications protocol, a method is provided for processing received signals received by the telecommunications receiver to handle communications with the mobile device that appear to the mobile device to compliant with the communications protocol. The method might comprise receiving a transmission from the mobile device according to the communications protocol, sampling the transmission to derive an array of samples, determining, at least in part from the array of samples, the relative distance between the telecommunications receiver and the mobile device, determining, at least in part from the array of samples, the relative velocity of the telecommunications receiver to the mobile device, generating a response to the transmission, wherein the response is compliant with the communications protocol, modifying the response to form a modified response, wherein modification is based on a first adjustment corresponding to a first measure of how much the relative distance exceeds the maximum distance and a second adjustment corresponding to a second measure of how much the relative velocity exceeds the maximum relative velocity, and sending the modified response from the telecommunications receiver to the mobile device such that the modified response, when received by the mobile device, appears to be compliant with the communications protocol.

Determining the relative velocity might be down by a Doppler shift indicated in the array of samples. Determining the Doppler shift might be done by determining a nominal carrier frequency, determining a fractional frequency offset from the array of samples, generating an array of corrected samples from the array of samples and the fractional frequency offset, determining an integer frequency offset from the array of corrected samples, and computing the Doppler shift from the fractional frequency offset, the integer frequency offset, and the nominal carrier frequency.

Determining the fractional frequency offset might comprise performing a delayed auto-correlation and identifying an angle corresponding to a complex number output of the delayed auto-correlation. Generating the array of corrected samples might comprise a complex multiplication of the array of samples by an output of a numerically controlled oscillator tuned based on the complex number output and a subcarrier spacing. Some or all of these variations might be used individually or in combination.

In other embodiments, a telecommunications receiver is adapted to communicate with mobile devices that are adapted to communicate according to a communications protocol, wherein the communications protocol includes a first constraint as to a first condition and an operating state of the telecommunications receiver is outside the first constraint, and a method and apparatus is provided for processing received signals received by the telecommunications receiver to handle communications with a mobile device that appears to the mobile device to be within the first constraint. There might be multiple conditions and corresponding constraints, such as a constraint on a distance, a relative velocity, power, noise levels, etc.

A method might comprise receiving a transmission from the mobile device according to the communications protocol, determining, at least in part from the transmission, a first state of communications with the mobile device, computing a relationship between the first constraint and the first state, generating a response to the transmission, wherein the response is compliant with the communications protocol, and modifying the response to form a modified response, wherein modification is based on the relationship and is configured to have a received signal at the mobile device of the response appear to be compliant with the communications protocol, at least when sending the response to the mobile device given the first state would appear to be, to the mobile device, outside of the first constraint and inconsistent with the communications protocol.

The first constraint might be a maximum relative velocity, the first state might correspond to a relative velocity, the relationship might be an indication of whether the relative velocity exceeds the maximum relative velocity, and the modification to form the modified response might be a frequency shift countering an estimated Doppler shift that the relative velocity will impose on the modified response to receiving that the mobile device.

Determining the estimated Doppler shift might be done by determining a nominal carrier frequency, determining a fractional frequency offset from an array of samples that sample the transmission from the mobile device, generating an array of corrected samples from the array of samples and the fractional frequency offset, determining an integer frequency offset from the array of corrected samples, and estimating the estimated Doppler shift from the fractional frequency offset, the integer frequency offset, and the nominal carrier frequency. Determining the fractional frequency offset might comprise performing a delayed auto-correlation and identifying an angle corresponding to a complex number output of the delayed auto-correlation. The modified response might be generated from an array of corrected samples derived from the array of samples by performing a complex multiplication of the array of samples by an output of a numerically controlled oscillator tuned based on the complex number output and a subcarrier spacing.

Various signal processing steps might be implemented as program code, hardware modules, other modules, or a combination thereof. Thus, a computer system for generating one or more signals might comprise at least one processor and a computer-readable medium that stores instructions, wherein the instructions, when executed by the at least one processor, causes the computer system to perform various functions described herein.

A non-transitory computer-readable storage medium may be provided that stores instructions, which when executed by at least one processor of a computer system, causes the computer system to carry out one or more of the functions described herein as well as various combinations of less than all of the functions described herein. A carrier medium might carry signals that are generated using one or more functions described herein.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 1 illustrates a PRACH Configuration Index Table, according to various embodiments.

FIG. 2 illustrates structures of four preambles, according to various embodiments.

FIG. 8, comprising

FIG. 10, comprising FIG. 10A, FIG. 10B, and FIG. 10C, illustrates an estimated start module, according to various embodiments.

FIG. 13, comprising FIG. 13A, FIG. 13B, and FIG. 13C, illustrates an example of an integer frequency offset module, according to various embodiments.

FIG. 15, comprising FIG. 15A, FIG. 15B, and FIG. 15C, illustrates an example of a time offset module, according to various embodiments.

FIG. 16, comprising FIG. 16A, FIG. 16B, and FIG. 16C, illustrates a first module of a contention-based PRACH receiver, according to various embodiments.

FIG. 18, comprising FIG. 18A, FIG. 18B, and FIG. 18C, illustrates a fractional frequency offset ("FFO") module for a contention-based PRACH receiver, according to various embodiments.

FIG. 19, comprising FIG. 19A, FIG. 19B, and FIG. 19C, illustrates an integer frequency offset ("IFO") module, according to various embodiments.

FIG. 20, comprising FIG. 20A, FIG. 20B, and FIG. 20C, illustrates an example of a time offset module, according to various embodiments.

FIG. 22, comprising FIG. 22A, FIG. 22B, and FIG. 22C, illustrates an example of an offset tracking module of a PUSCH receiver, according to various embodiments.

DETAILED DESCRIPTION

Figure 3:
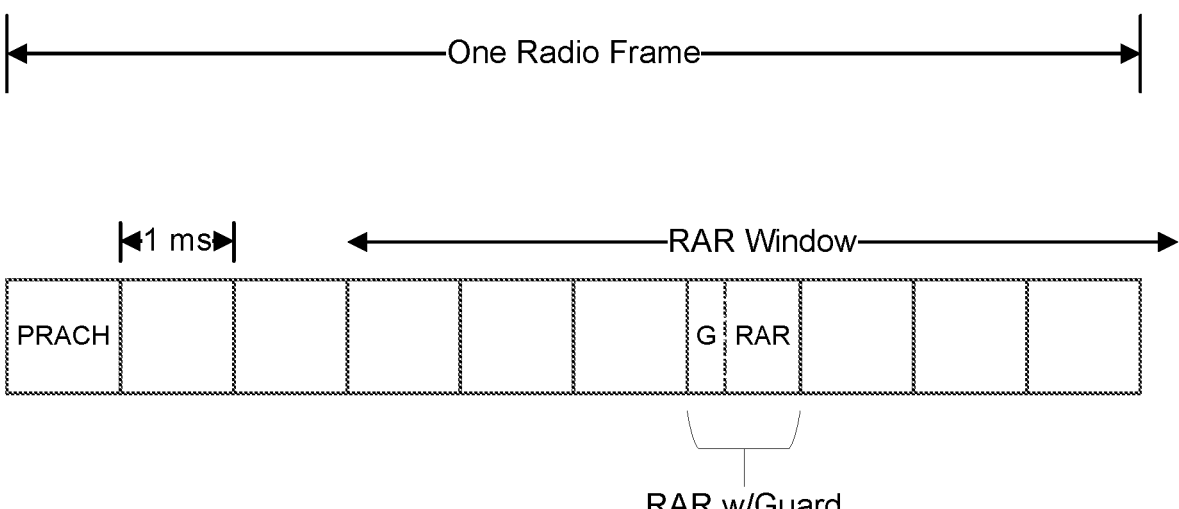
FIG. 3 illustrates timing of a RAR window, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a typical wireless telecommunications network, some devices are mobile devices that send and receive signals wirelessly to and from base stations that also send and receive signals wirelessly but also have wired backhaul channels as might be used to connect those mobile devices with other resources, such as resources available over and Internet connection. While many of the descriptions herein, mobile devices are described as connecting to base stations, it should be understood that the mobile devices need not be mobile when in use. In some protocols, a mobile device is referred to as a "mobile station" ("MS"), a "user equipment" ("UE"), or the like, and a base station is referred to as a "base transceiver station" ("BTS"), an "evolved node B" ("eNB"), a "5G node B" ("gNB"), or the like.

Without any intent to limit the scope of this description, for clarity of exposition, wireless communication will be explained as being between a mobile device and a base station. In some implementations, a base station might not directly connect to a wired backhaul but might be an intermediary. For example, an orbital base station might have wireless channels to communicate with mobile devices and also have another wireless channel for communicating with a dedicated ground station that might in turn connect to a wired network. There might also be satellite-to-satellite channels. Satellites and ground stations can be purpose-built to communicate among themselves as designed, but as explained herein, a base station might need to communicate with a mobile device that is not necessarily purpose-built to communicate with that base station. But one example of that is a mobile device that expects a terrestrial base station separated by a limited distance and a relative velocity below a certain speed but that is establishing a communications link with a base station that is further than that limited distance and moving faster than that speed. Examples of such base stations include a base station located on a space vehicle, e.g., a low-Earth orbit ("LEO") satellite such as those disclosed in Speidel I, Speidel II, Speidel III, and Speidel IV.

In a typical wireless telecommunications network, mobile devices and base stations might be constructed, programmed, and/or adapted to receive, transmit, and/or process signals, possibly organized along a network stack that might be organized according to layers. It should be understood that construction, programming, and/or adaptation could be implemented using specialized hardware, special-purpose hardware, firmware, and/or software. For example, where a module is described as performing a particular function, it could be that a device having the module is a device with a general-purpose processor that executes a set of program instructions that cause the general-purpose processor to perform the particular function. It also could be that the device includes an FPGA or other hardware that receives inputs and provides outputs and performs the particular function.

One such network player is the physical layer, which in wireless communications can involve over-the-air transmission of radio frequency signals. Signals received by a receiver are not going to be identical in all aspects to signals transmitted by a transmitter position some distance away from the receiver. For example, the received signal will be a delay diversion of the transmitted signal, may have a frequency shift, might include added noise, or other changes, some of which are well-known in the art of wireless transmission.

Typically, protocols are designed to account for some of the changes that occur in transmission (e.g., Doppler shift and propagation delay). As an example, in an LTE standard, devices are expected to deal with some delay, such as the delay due to a certain propagation distance, and deal with some Doppler shifts. An example might be that a protocol requires that a device deal with propagation delays due to transmitter-to-receiver distances of up to 100 km and Doppler shifts due to relative transmitter-to-receiver velocity of up to 200 kilometers per hour (kph). As explained herein, a base station—such as an orbital base station—that is necessarily outside those bounds might nonetheless handle protocol-compliant communications by considering various conditions.

For example, a base station might operate outside the Doppler shifts and propagation delays of what a typical frequency-division multiple-access ("FDMA"), time-division multiple-access ("TDMA"), orthogonal frequency-division multiple-access ("OFDMA"), or the like, protocol is designed to handle.

Example Protocols and Limits

An orthogonal frequency-division multiple-access protocol, such as the OFDM protocol described by 3GPP LTE, provides for some time and frequency shifts between the mobile device and base station but sometimes those can be out of the allowed variations.

The frequency offset of a signal between a mobile device and a base station might be due to variations of the oscillator used in the transmitter to generate the transmitted signal and the oscillator used in the receiver to clock the received signal. The frequency offset of the signal will also include a Doppler shift when there is a relative velocity between the mobile device and the base station. The frequency offset due to oscillator variations is typically taking into account in circuit design. For example, a base station clock might be designed to have and accuracy of 0.05 parts per million (0.05 ppm). In the 2.6 GHz e-UTRA band 7, a carrier frequency offset of +/−0.05 ppm means that the carrier frequency can be anywhere within a 260 Hz bandwidth just due to clock drift. The 3GPP LTE protocol uses a subcarrier spacing of 1250 Hz for some of its channels (e.g., a Physical Random Access Channel or "PRACH"), so drifts of +/−130 Hz are not a problem.

The 3GPP LTE protocol also accounts for persons carrying mobile devices in a fast-moving car or on board a high-speed train. For example, if a mobile device is moving relative to the ground at 200 kph or less, the resulting Doppler shift at a fixed terrestrial base station when communicating on a 2.6 GHz band will be 481.53 Hz, well within the 3GPP LTE PRACH subcarrier spacing of 1250 Hz. On the other hand, if the base station is an orbital base station with a velocity of 28,000 kph relative to the mobile device, the Doppler shift when communicating on a 2.6 GHz band will be 67,454.07 Hz, well beyond a subcarrier spacing of 1250 Hz. Other examples of Doppler shifts can be computed using well-known formulas for given relative velocities and relative velocities can be computed using well-known orbital formulas. In one example, the orbital velocity imparts a Doppler frequency shift of +/−15 kHz in cellular bands greater than 1 GHz and that might be a shift of over +/−12 PRACH sub-carriers. Higher frequencies would have even higher Doppler shifts.

One aspect of the LTE protocol prescribes that communications happen relative to specific radio frames and subframes. In such a protocol, time periods are in units of Ts with Ts=1/30,720,000 second, where one radio frame has a duration, $T_f$, where $T_f$=307,200*Ts=10 milliseconds, each radio frame is divided into twenty slots, numbered from "0" to "19", having a duration of 15,360*Ts each, and the radio frame is divided into ten subframes each comprising two adjacent slots (e.g., the n-th subframe comprises slots 2 n and 2 n+1). Uplink transmission and downlink transmissions can be simultaneous in that a radio frame could have ten uplink subframes and ten downlink subframes by using separate frequency channels for uplink and downlink using frequency division duplexing ("FDD"). Thus, in order to communicate with LTE mobile devices, the base station should send and listen at the right frequencies and at the right times and those right frequencies and right times should be such that the base station adjusts them as needed so that the mobile device sends and receives within allocated spectra and times. While the LTE protocol is used here as an example, it should be understood that similar issues and constraints occur with other protocols.

Simplified Explanation of an LTE Protocol

A high-level explanation of some details of a specific LTE protocol might be useful for understanding constraints that occur with wireless protocols, so such an introduction is provided here, with the understanding that the disclosure need not be limited to this particular protocol.

In some protocols, each device only transmits at a predetermined time. In a protocol that allows for devices to start communicating at any time, two devices might communicate at the same time on the same frequency and lead to a collision. A protocol might allow for a device to attempt to establish communication at any time but after some negotiation, settle into negotiated portions of a shared channel (such as negotiated time slots in a TDMA network, a negotiated frequency range in an FDMA network, a negotiated code sequence in a code-division multiple-access ("CDMA") network, etc. As used herein, a PRACH is a random-access channel ("RACH") at the physical network layer of a wireless network and a PRACH can be used for link setup and data transmission.

While a transmission in a PRACH might happen at any time, for the LTE protocol described herein, there are certain requirements for transmissions on the PRACH and thus there are certain corresponding expectations of LTE protocol receivers. Prior to a PRACH transmission, a transmitting device obtains system configuration details that might be included in a master information block ("MIB") and/or a system information block ("SIB", such as SIB1 and SIB2). The system configuration details might include (1) a PRACH Configuration Index (possibly broadcast within the SIB2), and (2) a Response Window Size (possibly broadcast within the SIB2 or in an RRC Connection Reconfiguration message).

FIG. 1 illustrates a PRACH Configuration Index Table. The PRACH Configuration Index shown in the table might be representable as a 6-bit value and be used by devices to agree on a preamble format, a system frame number, and a subframe number. As indicated there in the table, when a transmitter and receiver agree on a PRACH Configuration Index, they each know which preamble format to use, which system frame numbers to use, and which subframe numbers to use. The four possible preambles, 0 through 3, can accommodate different cell sizes. The PRACH Configuration Index specifies the System Frame Number (SFN) and the subframes during which the random-access preamble can be transmitted.

FIG. 2 illustrates structures of the four preambles. Following a transmission of a PRACH random-access preamble over the PRACH channel, with the random-access preamble comprising a cyclic prefix ("CP") followed by one or more sequences-depending on the preamble format, a receiver will receive and process the PRACH message to determine transmitter parameters and state, and then will reply with a Random Access Response ("RAR") message. This process can be used to synchronize timing between the transmitter and receiver.

The random-access preamble might be treated as an OFDM symbol and the cyclic prefix might be a repetition of the end of the sequence of the random-access preamble. For example, for preamble format 0, the random-access preamble would have a 100 μs cyclic prefix that is a copy of the last 100 μs of the 800 μs random-access preamble sequence. A receiver might discard samples of the cyclic prefix samples, but the cyclic prefix still can serve some purposes, such as providing a guard interval to eliminate inter-symbol interference ("ISI") between one symbol and the prior symbol, and/or used in linear convolution of a frequency-selective multipath channel modeled as circular convolution, since the cyclic prefix repeats the end of the symbol. This may transform to the frequency domain via a discrete Fourier transform (DFT). This approach accommodates simple frequency domain processing, such as channel estimation and equalization. A cyclic prefix is preferably at least as long as the length of the multipath channel.

In an LTE protocol, for the random-access preamble, there might be 839 subcarriers with a subcarrier spacing of 1250 Hz, for a total of 1.04875 MHz. With 15 kHz guard bands on either side of the random-access preamble, a total of 1.07875 MHz is used, that is, six resource blocks. Since subframes have a duration of where 30,720*Ts, a random-access preamble occupies one, two, or three subframes in the time domain. Each subframe might include one random access preamble within each subframe. Multiple mobile devices using the same preamble resource can be differentiated by their preamble sequences.

A random-access process comprising sending a random-access preamble from a transmitter to a receiver might be used in various instances and some of those random-access processes might be done with a contention-based random-access process while others might be done with a contention-free random-access process. Example random-access processes include:

(1) Making a transition from an RRC Idle mode to an RRC Connected mode (2) Completing an intra-system handover (3) Handling the arrival of uplink or downlink data while a mobile device is in a non-synchronized RRC Connected mode state, and/or (4) Re-establishing an RRC connection.

Processes 1, 2, 3, and 4 might be done using a contention-based random-access process, whereas processes 2 and 3 might be done using a contention-free random-access process. The contention-based process can be used where there is unpredictable latency, but where low latency is required the contention-free random-access process might be used.

For the random-access preamble, the sequence might be selected from one of two groups of preamble sequences and there might be up to 64 preamble sequences that could be used, where one group of sequences is for small packets or for large packets in poor radio conditions and the other group is for other conditions.

In preparing for an uplink data transfer, a base station might allocate Physical Uplink Shared Channel ("PUSCH") resources. To indicate the resources needed, the mobile device might select a random-access preamble based from one of the two groups based on the size of the uplink packet to be sent once the link is established and/or based on radio conditions. A preamble sequence might be selected at random from within the selected group.

A typical contention-based random-access process might include these steps:

(1) Transmitter sends a preamble sequence to receiver.

(2) Receiver responds to the transmitter with a Random Access Response ("RAR"), which might include details such as a UL Grant, a timing advance value, and a temporary C-RNTI value.

(3) The transmitter receives the RAR and responds to the receiver with a connection request, possibly including a mobile device random value, a TMSI value, and an establishment cause value.

(4) The receiver responds to the transmitter with a contention resolution message that includes a C-RNTI value to replace the temporary C-RNTI value.

In the case where a mobile device initiates a process, the mobile device is the transmitter and the base station is the receiver for the above-described process.

The contention-based random-access process might not provide guarantees for low latency, so when low latency is desired, the contention-free random-access process can be used in cases of intra-system handover and the arrival of downlink data.

A typical contention-free random-access process might include these steps:

(1) Base station sends the mobile device a random-access preamble assignment.

(2) Mobile device responds to the base station with a random-access preamble.

(3) The base station sends the mobile device a RAR.

In either case, the base station can obtain information about mobile device state, parameters (e.g., distance, relative velocity, noise level, power, etc.) and adjust the base station transmissions so that when received at the mobile device the appear to the mobile device to be compliant with a protocol for which the mobile device is adapted or programmed. As explained in detail herein, various methods can be used by the base station to determine the parameters needed to do so. For example, the base station can determine a frequency shift, perhaps by determining a fractional frequency shift and then an integer frequency shift and determine a time-of-flight delay or a distance to the mobile device.

Random Access Response ("RAR") Examples

After the mobile device transmits the PRACH preamble to the base station, the mobile device listens for a response on the Physical Downlink Shared Channel ("PDSCH"). The LTE protocol specifies a time domain window in which to expect a response, the RAR window, relative to the sending of the PRACH preamble.

FIG. 3 illustrates timing of a RAR window. In the LTE protocol, the timing of the PRACH preamble defines a radio frame and the RAR window starts during the third subframe of the radio frame following the preamble, as shown in FIG. 3. The duration of the RAR window is expressed in subframes and the number of subframes is predetermined by the transmitter node and the receiver node. The RAR window size might be 2, 3, 4, 5, 6, 7, 8, or 10 subframes.

The mobile device checks each subframe within the search window for a PDCCH whose CRC bits have been scrambled by RA-RNTI. In case of FDD, there is a maximum of one set of resource blocks allocated to the PRACH within each subframe. Therefore, FDD PRACH preambles can be associated with RA-RNTI values of 1 to 10.

All mobile device using the same subframes for PRACH preamble transmission share the same RA-RNTI. These mobile devices are differentiated by their preamble sequence. Contention occurs if multiple mobile devices have selected the same preamble sequence for transmission during the same set of subframes.

Figure 4:
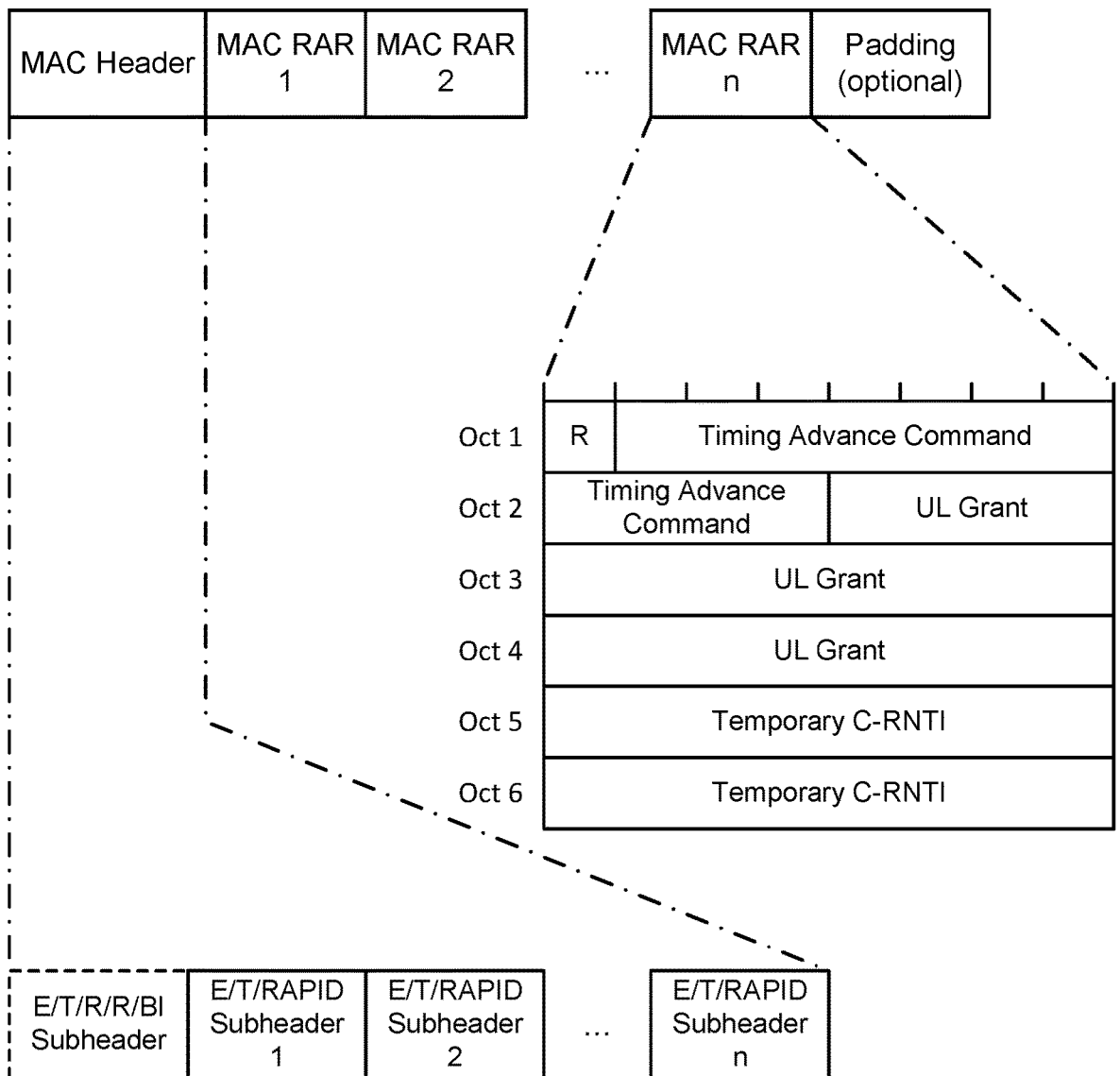
FIG. 4 illustrates an example structure of an RAR, according to various embodiments.

FIG. 4 illustrates an example structure of an RAR. As shown, the RAR comprises a header, which in turn comprises one or more subheaders, one or more RAR payloads, followed by optional padding. As illustrated in FIG. 4, a MAC RAR Protocol Data Unit (PDU) can be directed at multiple mobile devices. The RAR PDU includes one 8-bit E/T/RAPID subheader per device and one MAC RAR payload per device, and optionally one 8-bit E/T/R/R/BI subheader per MAC RAR.

Figure 5:
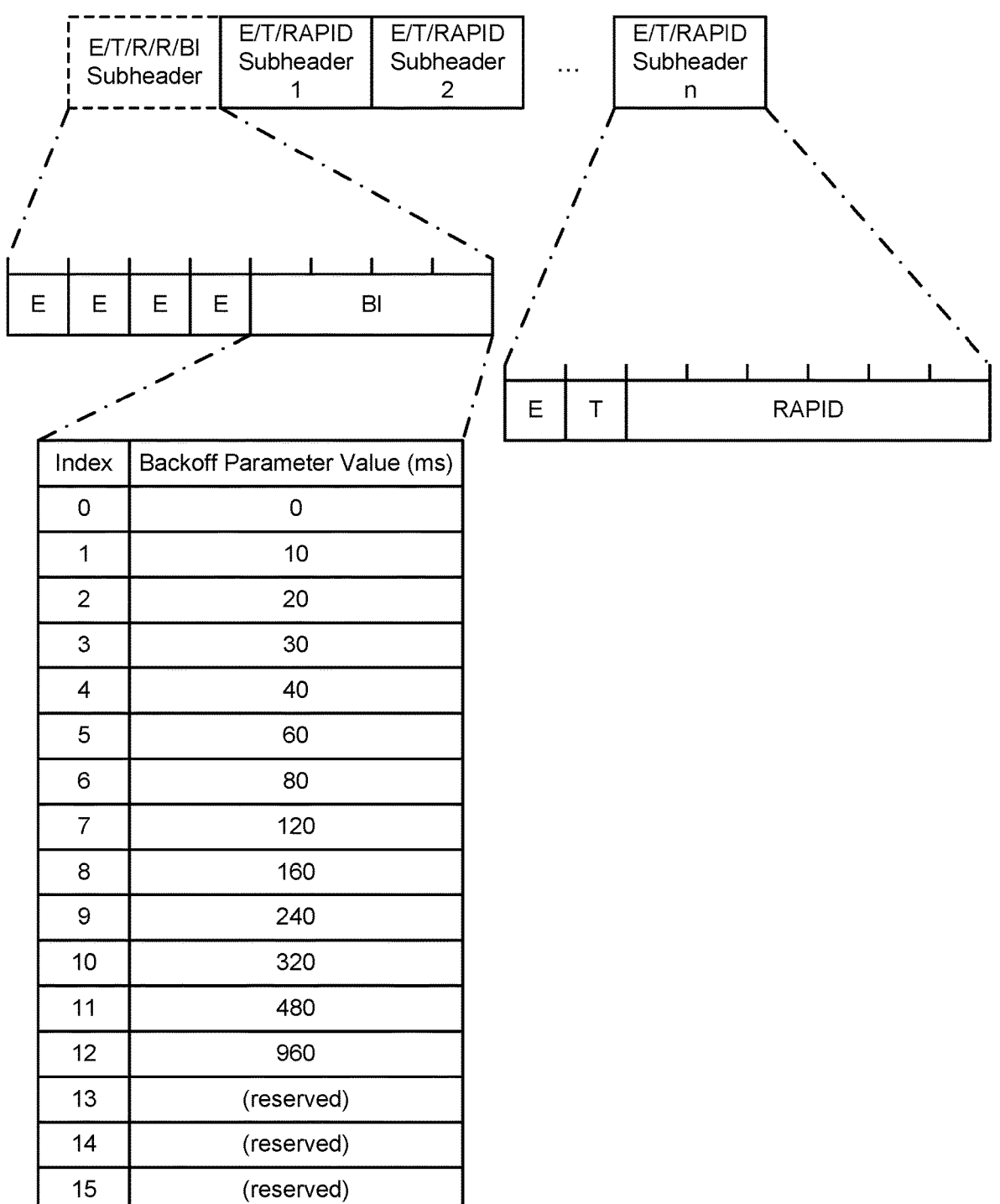
FIG. 5 illustrates an example of a MAC RAR Protocol Data Unit (PDU) header, according to various embodiments.

FIG. 5 illustrates an example of a MAC RAR Protocol Data Unit (PDU) header. When the base station is to define a back-off timer index (BI), one 8-bit E/T/R/R/BI subheader would be included in the RAR message and has the structure shown in FIG. 5. A back-off index would be used by a mobile device with a relevant RA-RNTI. The 4-bit back-off index represents particular back-off parameter values as indicated in FIG. 5.

An E/T/RAPID subheader is used to address a specific mobile device and has the structure shown in FIG. 5. A MAC RAR payload might have the structure shown in FIG. 5, wherein the MAC RAR payload comprises fields for:

(1) Timing Advance Information: This can be used to ensure that the subsequent mobile device transmissions are synchronized with other mobile device when arriving at the base station.

(2) Uplink Grant information: This can be used to allocate uplink resource blocks to the mobile device for transmission on the PUSCH. This allows the mobile device to transmit messages such as an RRC Connection Request message.

(3) A Temporary C-RNTI: This can be used as the C-RNTI after successful completion of a random-access process for RRC connection establishment and or RRC connection re-establishment.

Causes of Alterations in Signals

The physical PRACH radio wave is subject to various channel impairments and changes. The radio wave might need to travel between an orbital position and a terrestrial position, such as being separated by about 500 km. In that travel, the radio wave might be subject to additive white gaussian noise, carrier frequency offset, fractional frequency offset, integer frequency offset, residual frequency offset, Doppler shift, propagation delay, and Rician fading. For many of these effects, the amount of the effect might not be known to the base station and the base station will estimate those. For example, the base station will estimate the Doppler shift and carrier frequency offset, perhaps using techniques described herein.

Additive white Gaussian noise ("AWGN") is modeled using a basic noise model from information theory to mimic effects of many random processes that occur in nature. It is "additive" in that the signal is added to any noise that might be intrinsic to an information system. It is "white" in that it is assumed to have uniform power across a frequency band for the information system. It is "Gaussian" in that it is assumed to have a normal distribution in the time domain with an average time domain value of zero.

Carrier frequency offset ("CFO") is an offset of frequency due to local oscillator variations and other effects. The 3GPP LTE standard allows for maximum +/−0.1 ppm error in the local oscillators. At an example carrier frequency of 700 MHZ, this corresponds to a maximum carrier frequency offset of 70 Hz. Carrier frequency offset variations can result in CRC errors and NACK errors.

Figure 6:
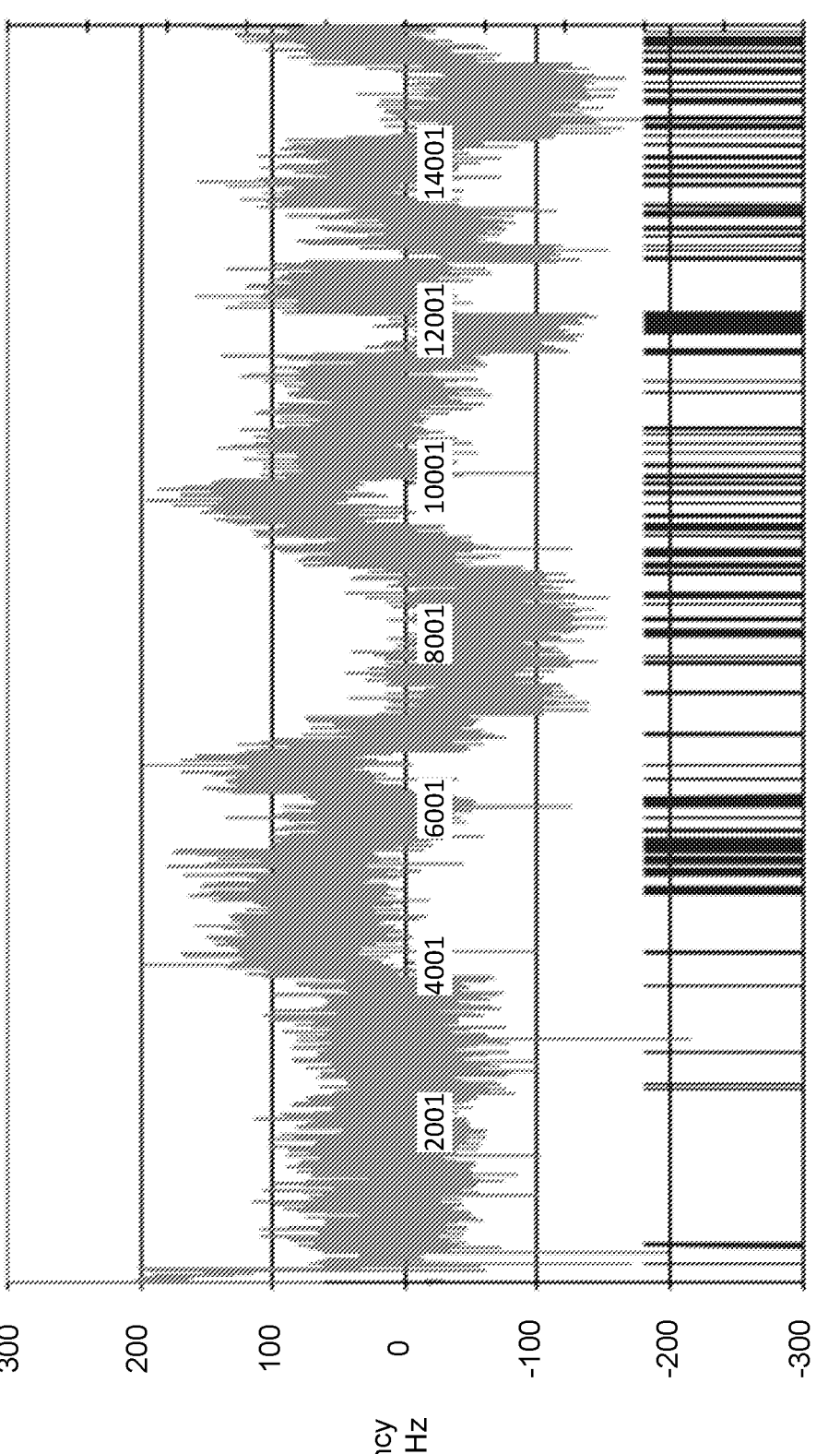
FIG. 6 illustrates some results of carrier frequency variances and NACK errors that resulted, according to various embodiments.

FIG. 6 illustrates some results of carrier frequency variances and NACK errors that resulted. In the plots shown in FIG. 6, time is along the x-axis. The upper signal corresponds to carrier frequency variance with the y-axis corresponding to frequency variances between −300 Hz and +300 Hz. The lower signal indicates the occurrence of NACK errors at times that correspond to changes in frequency errors of the upper signal.

Another signal consideration is Rician fading. Rician fading can be modeled like Rayleigh fading, except that in Rician fading a strong dominant component is present. The dominant wave can be a phasor sum of two or more dominant signals, e.g., the line-of-sight and a ground reflection. The dominant wave can also be subject to shadow attenuation, which is a popular assumption in the modelling of satellite channels.

Figure 7:
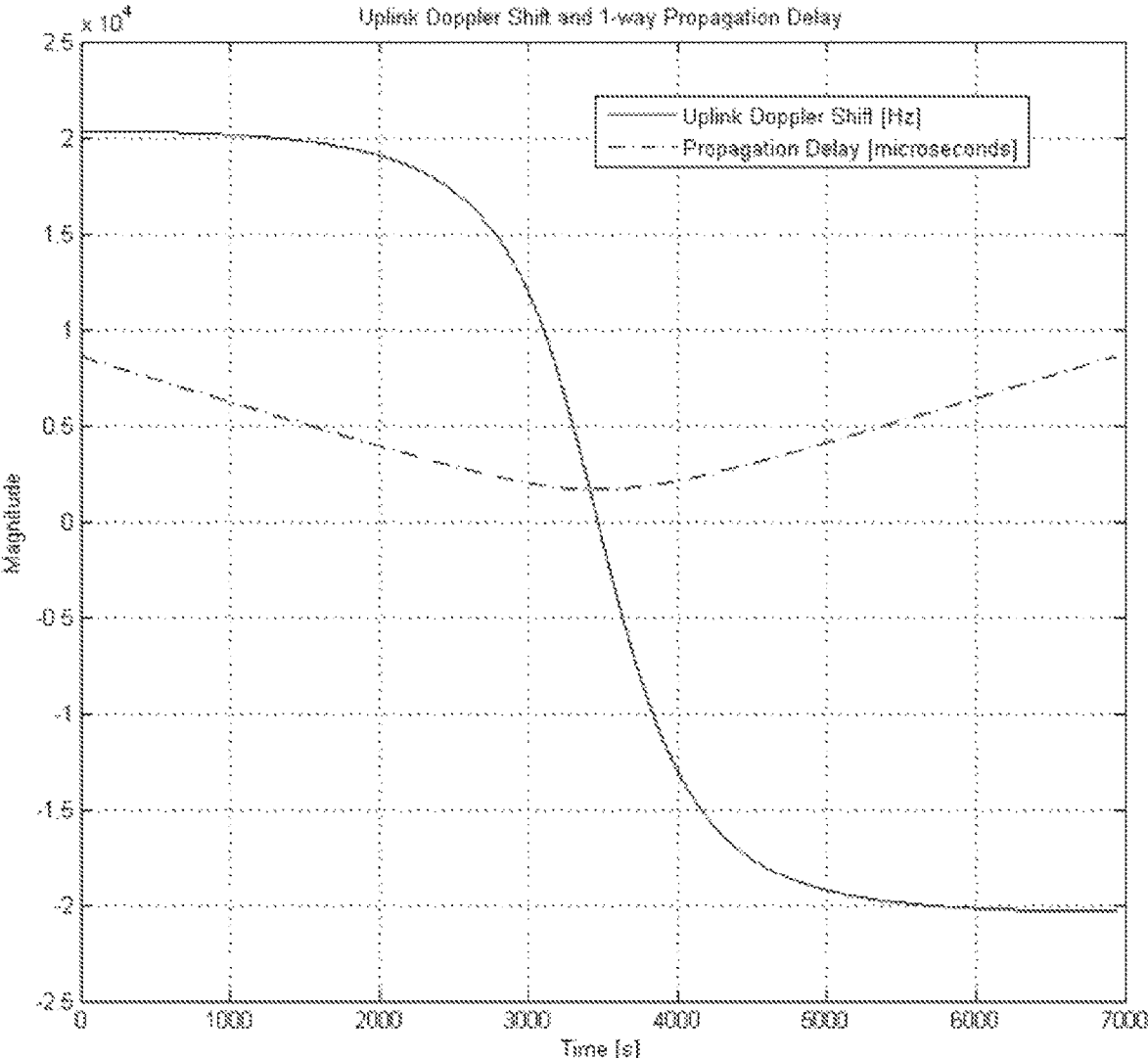
FIG. 7 illustrates how Doppler shift and propagation delay might vary over time, according to various embodiments.

FIG. 7 illustrates how Doppler shift and propagation delay might vary over time. The velocity of an orbiting space vehicle that contains a base station results in an observed Doppler shift by the base station. The distance between the mobile device and the base station results in a significant propagation delay.

As illustrated in FIG. 7 and by Equations 1 and 2, for orbital base stations, the Doppler shifts and propagation delays are well outside what would work for various telecommunications protocols without some signal modification at the base station or some reconfiguration of the mobile devices specifically for satellite communications. In the specific example of FIG. 7, plots are shown for a base station satellite that is orbiting at an altitude of 500 km and thus an orbital velocity of 27,360 km/hour. In the more general case, estimates of the frequency shift of signals between an orbital node and a stationary or slow-moving terrestrial node due to Doppler shift could be computed at the satellite or elsewhere and provided to the satellite.

For any given orbit, an altitude (constant, or varying as a function of time) and a velocity (varying in direction and, if altitude varies, then typically also varying as a function of time) can be computed using standard orbital mechanics, wherein the altitude and velocity are functions of the orbit height and eccentricity, and may be a function of other inputs as well for more complicated situations. As a result, an orbital base station can be programmed to be able to compute its own location, altitude, and velocity at a given time and therefore, the orbital base station could compute its velocity vector relative to a point on Earth's surface or other location where a mobile device might be, and could also compute a unit vector that points in the direction of a mobile device relative to a travel path of the orbital base station, and a distance from the orbital base station to the location of the mobile device.

Having this information, the orbital base station could compute its expected one-way propagation delay based on the magnitude of the distance from the location of an orbital base station (which is a function of time, its orbit height, and the orbital path and shape) to the location of the mobile device as shown in Equation 1, where $\|\vec{r}_{terr-sat}\|$ is the magnitude of a vector describing the position of a terrestrial device with respect to a satellite position and c is the speed of light. The vector magnitude is equivalent to the slant range.

$$\text{Delay} = \frac{\|\vec{r}_{terr-sat}\|}{c}$$ (Eqn. 1)

From its position in space, a satellite can compute (or be provided with) a unit vector, $\hat{r}_{unit}$, of length one describing the position of a point on Earth—where a mobile device might be—with respect to the satellite's position in space (which is in turn computable from its orbit height and shape). Also having the satellite's velocity vector and knowing a nominal frequency, the satellite can compute an estimate of a Doppler shift as in Equation 2, where $\vec{v}_{sat}$ is a velocity vector of the satellite (which is a function of its orbit height and shape, and time) and $\lambda$ is the wavelength of the wavelength of the originally transmitted signal frequency.

$$\text{Doppler} = \frac{\vec{v}_{sat} \cdot \hat{r}_{unit}}{\text{wavelength}} \qquad \text{(Eqn. 2)}$$

Thus, in the general case, the frequency shift of signals between an orbital node and a stationary or slow-moving terrestrial node due to Doppler shift could be computed from orbital details and also for the delay. This computation could be done at the satellite or on the ground and sent to the satellite. For fast-moving base stations and/or remote base stations that might not be in orbit but that might be out of the planned-for range for a protocol, these computations could be done to determine the estimated and/or expected delay and Doppler shift. There might be some movement of the mobile device, but often it is well within the planned-for range for the protocol.

Signal Processing Blocks for a PRACH Receiver

In light of the conditions described above, a base station might need to modify or configure its transmissions to a mobile station to account for these conditions. One such situation is where the mobile device sends a PRACH message and the base station is to respond to it to set up a communications link between the base station and the mobile device. Based on the protocols in use, the base station might need to perform various computations to determine how to adjust a response and to do so within the time limits specified by the protocol. This might require that the base station have signal processing blocks with sufficient speed and use fast memory buffers, such as using static random-access memory ("SRAM") instead of DDR external memory.

In this section, examples of signal processing blocks, which might be implemented in software, firmware, and/or hardware, for discerning conditions of a channel and a mobile device are described. Once those conditions are discerned and computed, modifications can be made at the base station. In subsections herein, the condition is described, methods and apparatus used by a base station to determine parameters representative of the condition, and modifications in response to the condition are described. Not all of the signal processing blocks need be used in all cases. For example, it might be that a base station determines a first condition and a second condition but determines that the first condition would not cause communications to be outside acceptable ranges for a given protocol and determines that the second condition would cause communications to be outside acceptable ranges for the protocol. In that case, the base station might only do the modification indicated for the second condition. In some instances, a base station might not check each condition.

The transmission from the mobile device might be in the form of a contention-free PRACH message, a contention-based PRACH message, a PUSCH message, or some other transmission. The conditions to be detected might include:

(1) Determining whether a threshold energy is present and, if so, determining an estimated start time for calculation and subsequent correction;

(2) Determining a fractional frequency offset estimation and correction;

(3) Determining an integer frequency offset estimation and correction;

(4) Determining a time offset calculation; and (5) Determining which configuration index the mobile device used when transmitting a PRACH (not needed for contention-free PRACH messages or other cases where the configuration index is already known).

Figure 8A:
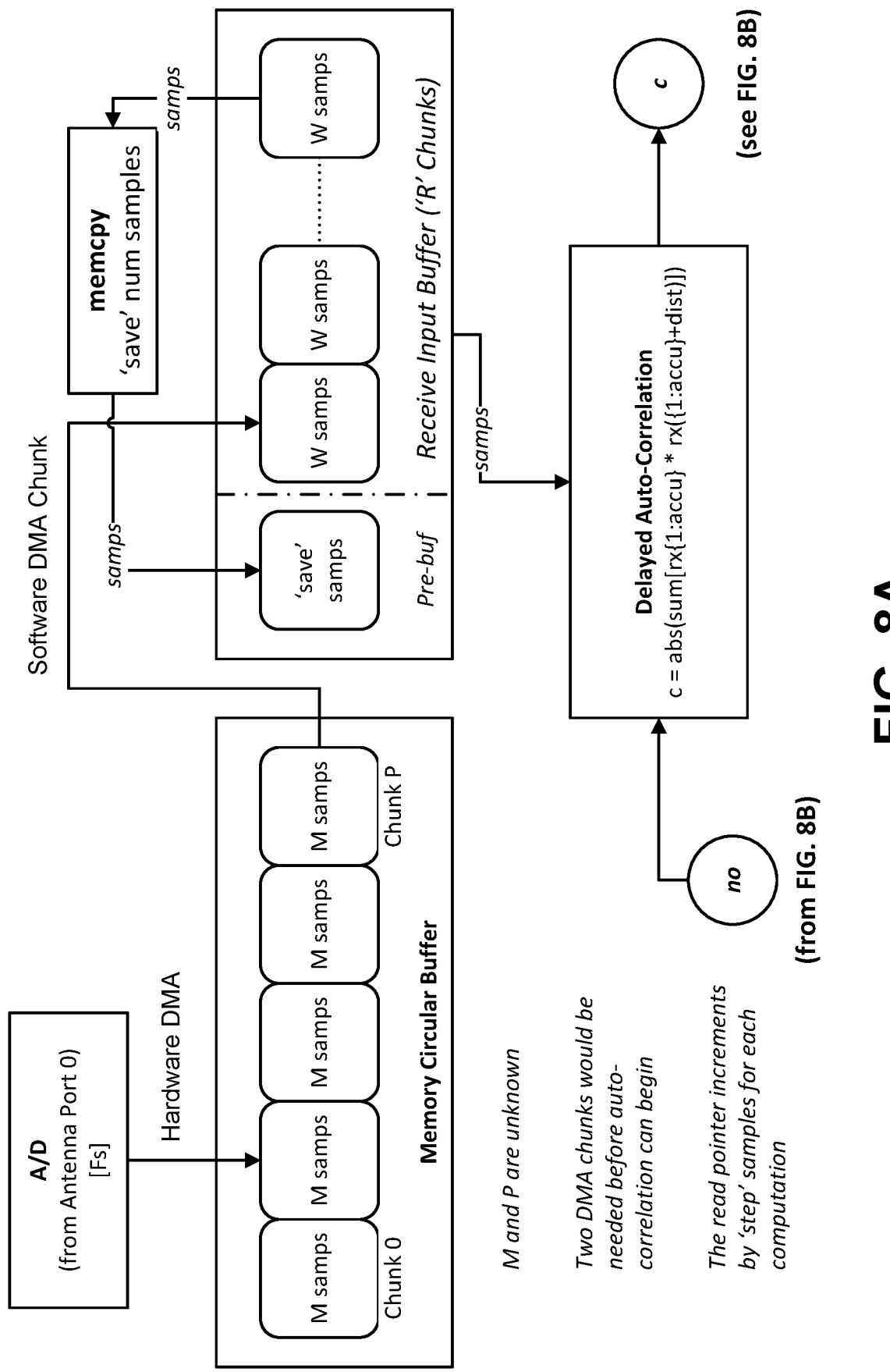
FIG. 8A, FIG. 8B, and FIG. 8C, is a block diagram of a signal processing block, or module, for computing an estimated start for a contention-free PRACH receiver, according to various embodiments.
Figure 8B:
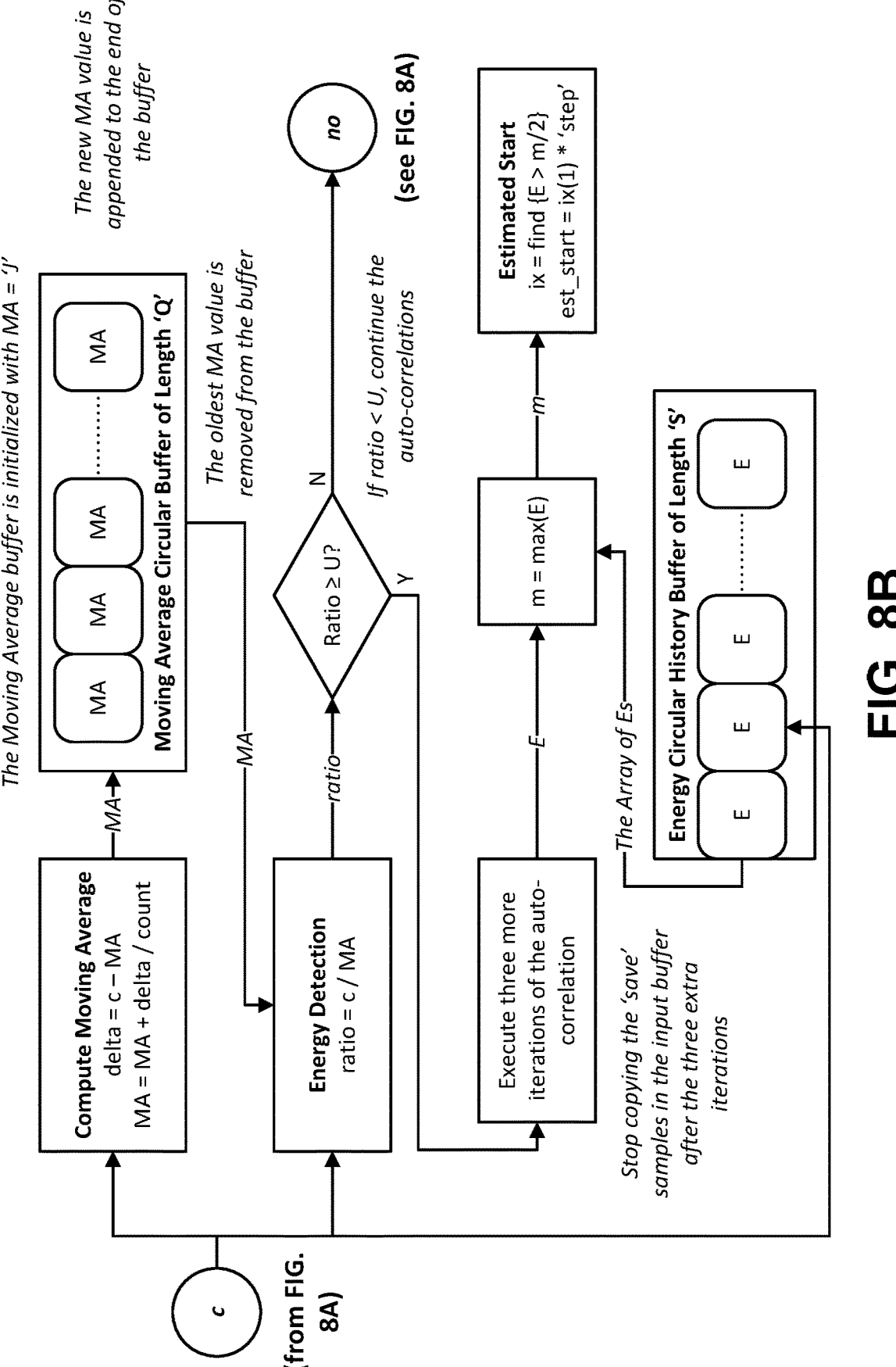
Figure 8C:

Other parameters can be determined from those, such as determining the length of the PRACH message and, from that, the preamble format by doing delayed auto-correlations. Once the Doppler shift and propagation delay are determined, a timing advance value can be computed for a RACH Response message 1. Contention-Free PRACH Receiver Signal Processing Blocks 1.a. Energy Detection and Estimated Start FIG. 8, comprising FIG. 8A, FIG. 8B, and FIG. 8C, is a block diagram of a signal processing block, or module, for computing an estimated start for a contention-free PRACH receiver. The elements of the estimated start module can be implemented as memory, hardware, and/or instructions performed by a processor.

1.a.1. DMA Input of I/Q Samples

The estimated start module processes I/Q samples from a DMA input. The estimated start module receives samples that originate from an antenna, such as "Antenna Port 0". The estimated start module can move those samples by hardware DMA transfers to a circular buffer in DDR memory. Next, software DMA can move chunks of 1,920 samples per transfer to a circular buffer in an internal SRAM called the "Receive Input Buffer." This buffer might be organized as 20 chunks and a pre-buffer of size of 3,360 samples. For every r-th chunk, the last "save" samples in the Receive Input Buffer is copied to the Pre-buf. Once we have carried out three iterations of correlations beyond detecting energy, there is no longer a need to copy the "save" samples. Thus, "save" is "dist" plus "accu" minus "step."

1.a.2. Delayed Auto-Correlation

After at least two DMA chunks have arrived in the Receive Input Buffer, the delayed auto-correlation is carried out by multiplying 384 I/Q samples, starting with the first sample after the pre-buffer, with the conjugate of 384 I/Q samples that arrived 800 μs earlier. The absolute value of the sum of the complex multiplications is stored in the circular Energy History Buffer. To compute the next value in the Energy History Buffer, the delayed auto-correlation is repeated but with a starting point shifted 96 samples, the correlation step size.

1.a.3. Moving Average

Each auto-correlation value is sent through a Moving Average process. A delta is computed by subtracting the new value with the previous Moving Average value. The delta is scaled and added to the previous Moving Average value to form a new Moving Average value. The new value is stored first in the circular Moving Average Buffer. The Moving Average Buffer is initialized with the number 17 before each PRACH reception. The number used for initialization may depend on the noise level.

1.a.4. Energy Detection in the Time Domain

Figure 9:
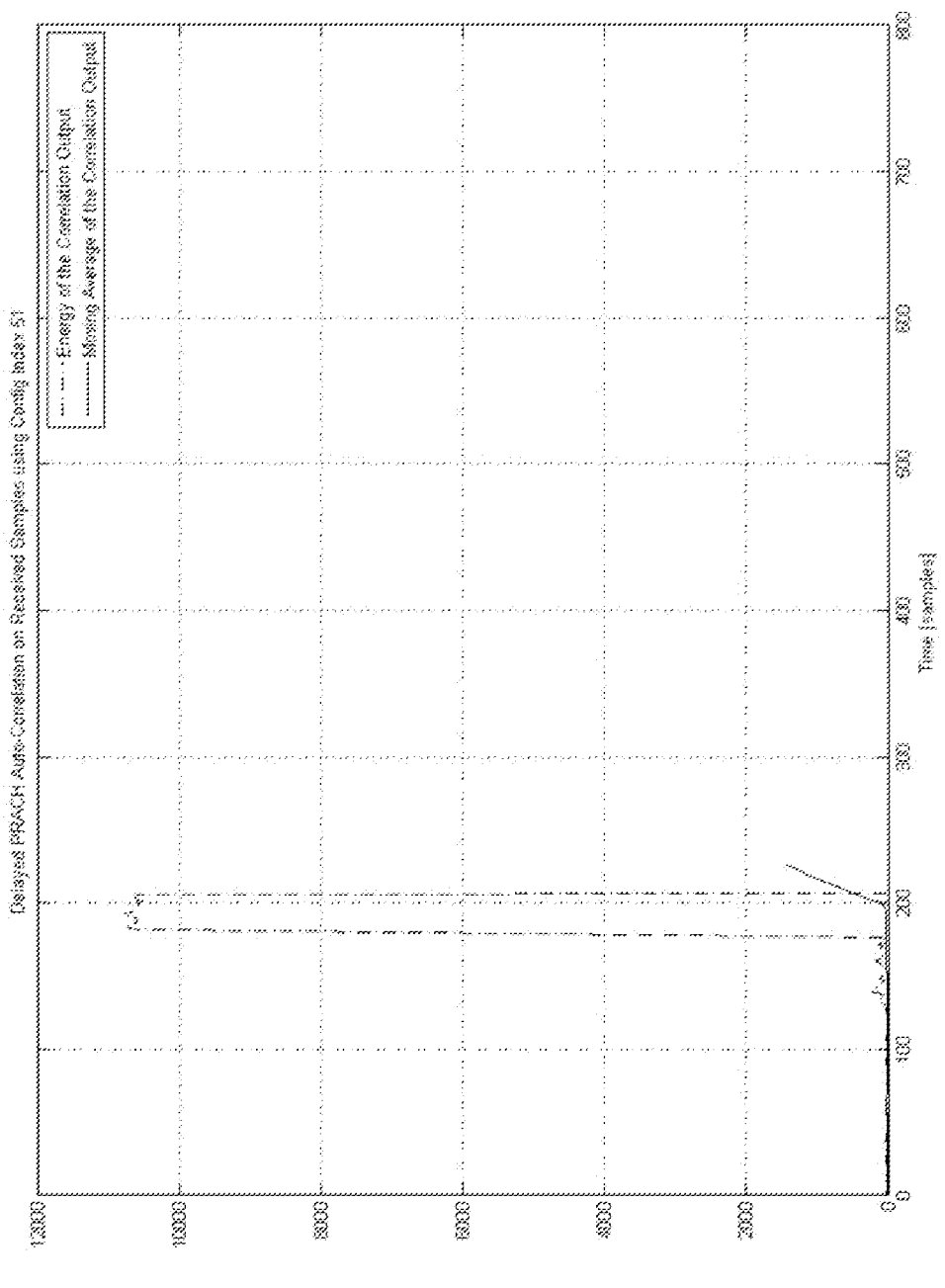
FIG. 9 shows the correlator output used to detect PRACH energy, according to various embodiments.

FIG. 9 shows the correlator output used to detect PRACH energy. To detect PRACH energy, a ratio is computed by taking the most recent auto-correlation value and divide it by the oldest Moving Average value. If the ratio is less than 30, the auto-correlations continue. If the ratio is greater than or equal to 30, three more iterations of the auto-correlation is carried out before the maximum value in the Energy History Buffer is determined.

1.a.5. Estimated start of PRACH

The estimated start module process finds the location of the first value in the Energy History Buffer that is greater than half the maximum value in the buffer and then multiplies the location by the step size (96) to get the estimated sample location of the start of the PRACH message.

1.b. Fractional Frequency Offset (FFO) and Correction

In a typical OFDM system, a receiver removes a fractional frequency offset before computing a DFT on the receiver input. By correcting the input for the fractional offset, the estimated start module effectively moves the energy of the signal to distinct frequency bins. Without this, energy would be present in between the bins and the signal would be smeared in the frequency domain.

Figure 10A:
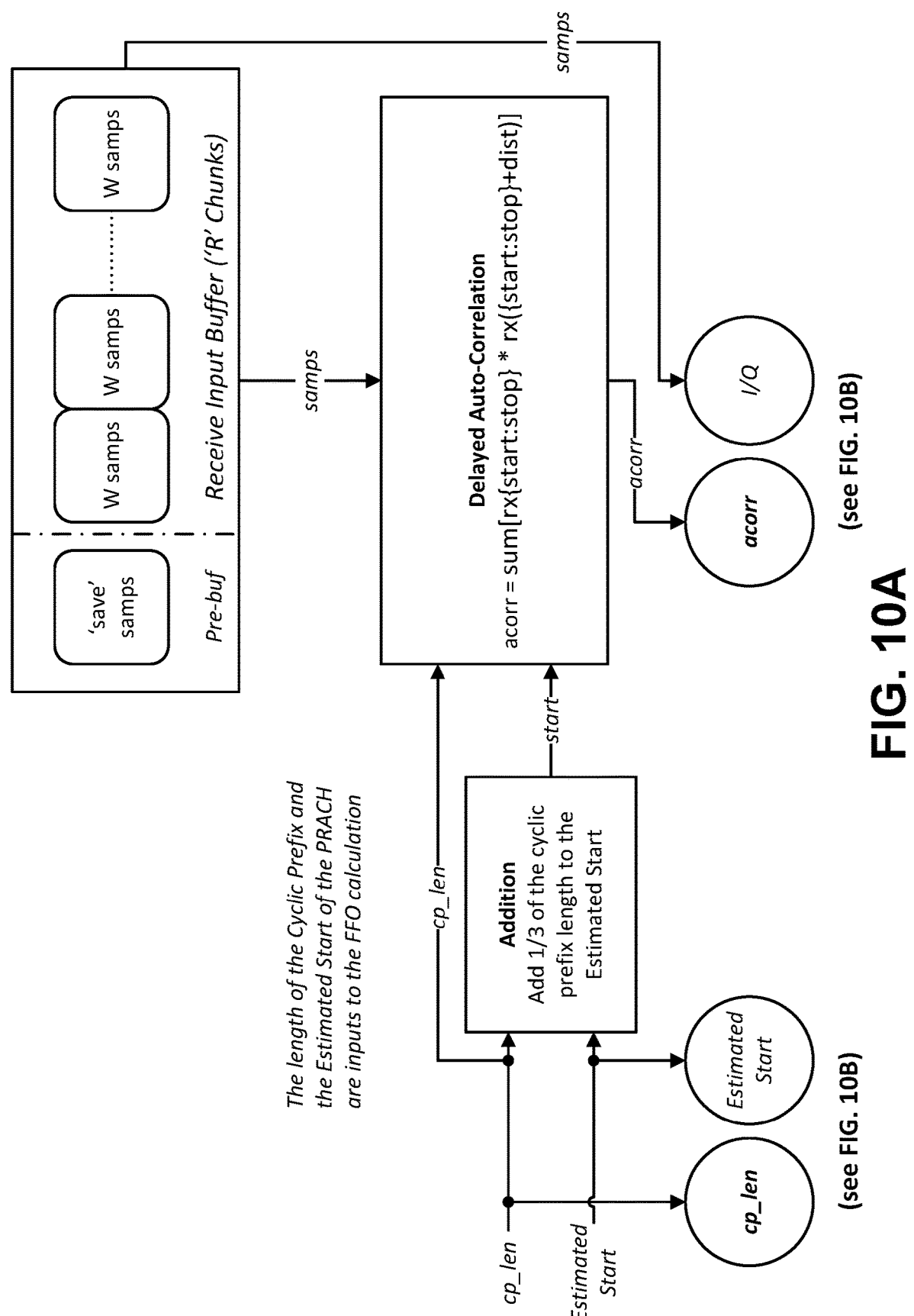
Figure 10B:
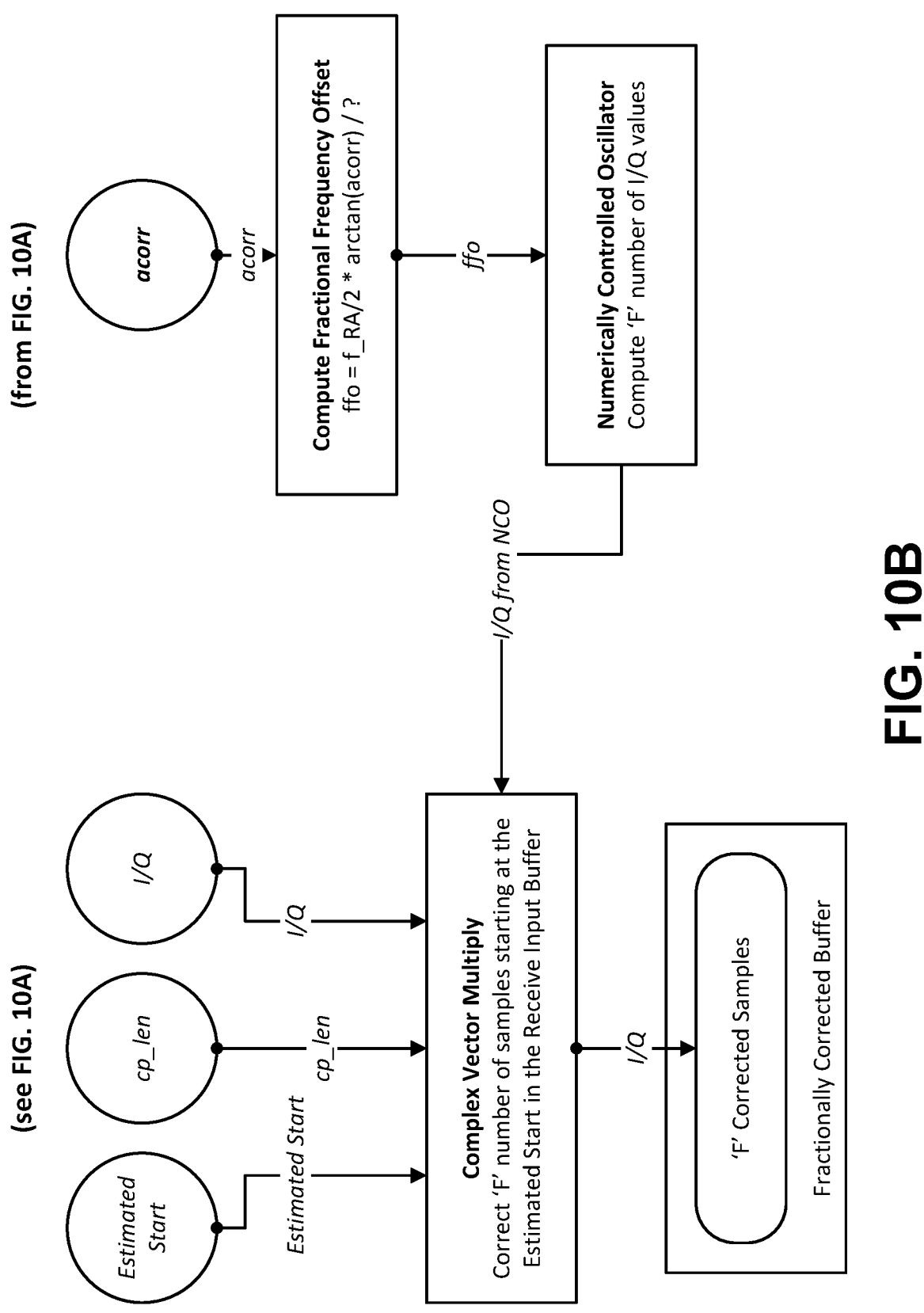

FIG. 10, comprising FIG. 10A, FIG. 10B, and FIG. 10C, illustrates how the estimated start module might determine a fractional frequency offset ("FFO") using the FFO correction module shown there and how incoming samples are corrected for the FFO. In many environments, a frequency offset is much smaller than subchannel widths, so there is no ambiguity as to what the full frequency offset is and an approach such as that shown in FIG. 27 might correct for frequency offset when the fractional frequency offset is small relative to the subchannel width. In such cases, one might directly compute a DFT and then do frequency domain PRACH correlations directly without having to first find the fractional offset. However, complications arise where the frequency offset is larger in comparison with conventional terrestrial protocol-based communications.

An approach to address this is to plan for frequency shifts that, when measured in units of subchannel width, are larger than one, i.e., a shift that is greater than a subchannel width. For example, suppose that the received signal is sent centered on a subchannel carrier but is received with a redshift of 11.95 times the subchannel width in part because a satellite receiver is travelling fast in the direction of a transmitting mobile device. If a receiver assumed that the relative velocity was low, that redshift might be interpreted as a minor blueshift of 0.05 times the subchannel width. Given that a receiver (and at times a transmitter) is in orbit and communication is with mobile devices that do not account for orbital velocities, the receiver will need to correctly interpret the shift as a redshift of around 11.95 for correct processing of the received signal (and for correctly pre-shifting its transmissions to counter that redshift).

One approach to determining a frequency shift greater than one is to just attempt to measure it directly. That can be complicated and might not be workable since a receiver has only so much time to compute the shift and formulate a response. Another approach is to first find the fractional frequency offset (FFO) from an array of samples of the received transmission and generate an array of corrected samples, which can then be processed using a DFT to get a frequency domain signal that is sufficiently reliable and may have fewer degrees of freedom.

From the array of corrected samples, or the frequency transform thereof, a receiver can quickly determine an integer frequency offset (IFO). As explained herein, with the FFO applied, the resulting signal will likely be well-defined within one subchannel and by comparing the energies of subchannels, the one most likely to contain the received signal can be compared to what subchannel the transmitter should have been using and the difference between those two, if any, would indicate the IFO.

A receiver can find the IFO by computing the energy of the frequency bins and then analyzing them to observe where they are centered. The amount they are off-center is a measurement of the IFO. After determining the IFO, the receiver can correct the array of corrected samples (that were corrected for FFO) to then correct for the determined IFO to recover a properly frequency shifted signal. The sum (or difference, depending on sign) of the FFO and the IFO could be used as an estimate for the Doppler shift and stored in memory for later use.

Given the FFO+IFO corrected samples, the receiver can reliably do time-domain PRACH cross-correlations to find the exact start of the PRACH. From that, the receiver can compute the propagation delay and then save that for future reference in the software system. Given the propagation delay, the receiver can store a timing advance value and can send that to the mobile device so that the mobile device correctly receives and transmits in its allocated slots, notwithstanding that the orbital base station might be further, and moving faster, than the protocol accounts for.

1.b.1. Delayed Auto-Correlation

First, the length of the cyclic prefix, in samples, is determined depending on which preamble format (see FIG. 2) that is being utilized. Next, one delayed auto-correlation is carried out by multiplying half the number of I/Q samples in the cyclic prefix, starting with the first sample after ⅓ of the length of the cyclic prefix from the estimated start, with the conjugate of I/Q samples that arrived 800 μs earlier. The sum of the complex multiply of the above samples is fed to the FFO computation.

An alternative to the summation of the output of multiple complex multiplies by the conjugate is to filter the individual complex multiply outputs through an IIR filter until the filter output has reached a certain level. This type of filtering can also provide a level of noise immunity.

1.b.2. Fractional Frequency Offset

Because of how cyclic prefixes are defined, samples separated in time by 800 μs from the cyclic prefix should have the same values. If there was no frequency offset, the result of multiplying by the conjugate should yield a real value with the imaginary part being zero. However, any frequency offset inherent in the system would cause the multiplication to have a nonzero imaginary part and hence a nonzero I/Q angle between $-x$ and $+x$ that is proportional to the fractional frequency offset in Hz (+/−half the sub-carrier spacing).

A fractional frequency offset module might compute this angle on a per sample pair basis (separated by 800 μs) but where there is also AWGN, the fractional frequency offset module might obtain some noise immunity by first summing the results of several complex multiplications with their conjugates before computing the angle.

The fractional frequency offset module might find the angle, in radians, from the complex number output by above delayed auto-correlation. Given a complex number as an input, an arctan( ) element can output an angle that corresponds to a radial representation of that complex number as a magnitude and an angle. By dividing the angle by x and multiplying by ½ of the sub-carrier spacing (1250/2=625 Hz), the fractional frequency offset module computes the fractional frequency offset in Hz.

1.b.3. Numerically Controlled Oscillator (NCO)

In order to correct the incoming samples for the fractional frequency offset, the receiver might multiply the samples by the output of a numerically controlled oscillator ("NCO"). The receiver can calculate an NCO output by computing $e^{\wedge}\{j*2*\pi*FFO*k/F_s\}$, where "F" is the number of samples to be corrected, "k" is a sample index running from 0 to F−1 and $F_s$ is the sample rate (e.g., 3.84 million samples per second). Conversions between complex numbers, their exponential representations, and corresponding angles can be done using math library functions, such as to convert a complex number z=x+jy to a magnitude and angle using $e^{jz}=e^{x}*(\cos(y)+j*\sin(y))$ with math functions such as float sin f(float arg) and float cos f(float arg). NCO outputs might also be precomputed and stored in a look-up table ("LUT").

Figure 11:
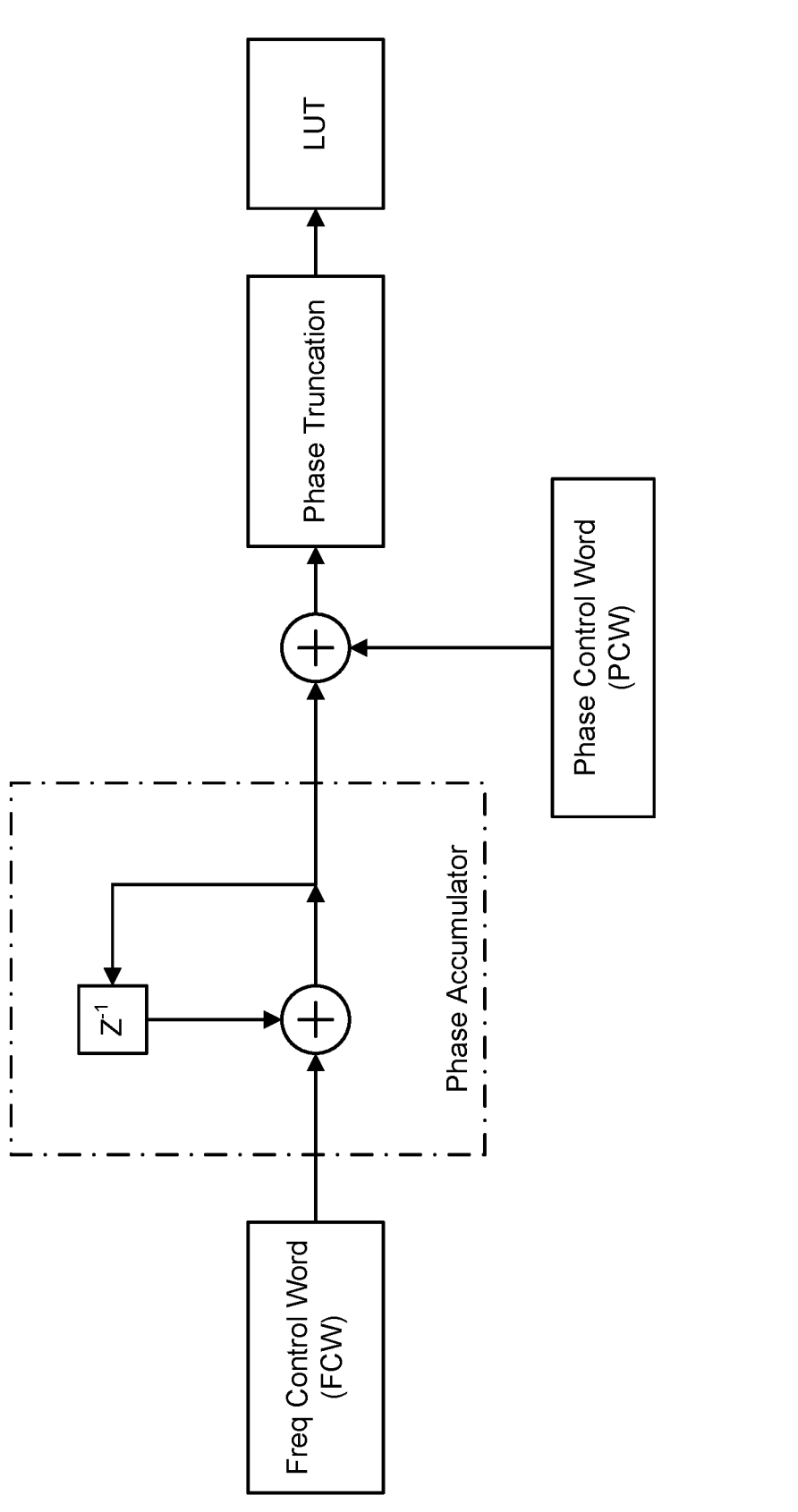
FIG. 11 illustrates an NCO based on a look-up table, according to various embodiments.

FIG. 11 illustrates an NCO based on a look-up table. The LUT approach might result in spurs that are highly undesirable as they would produce additional correcting waves.

Figure 12:
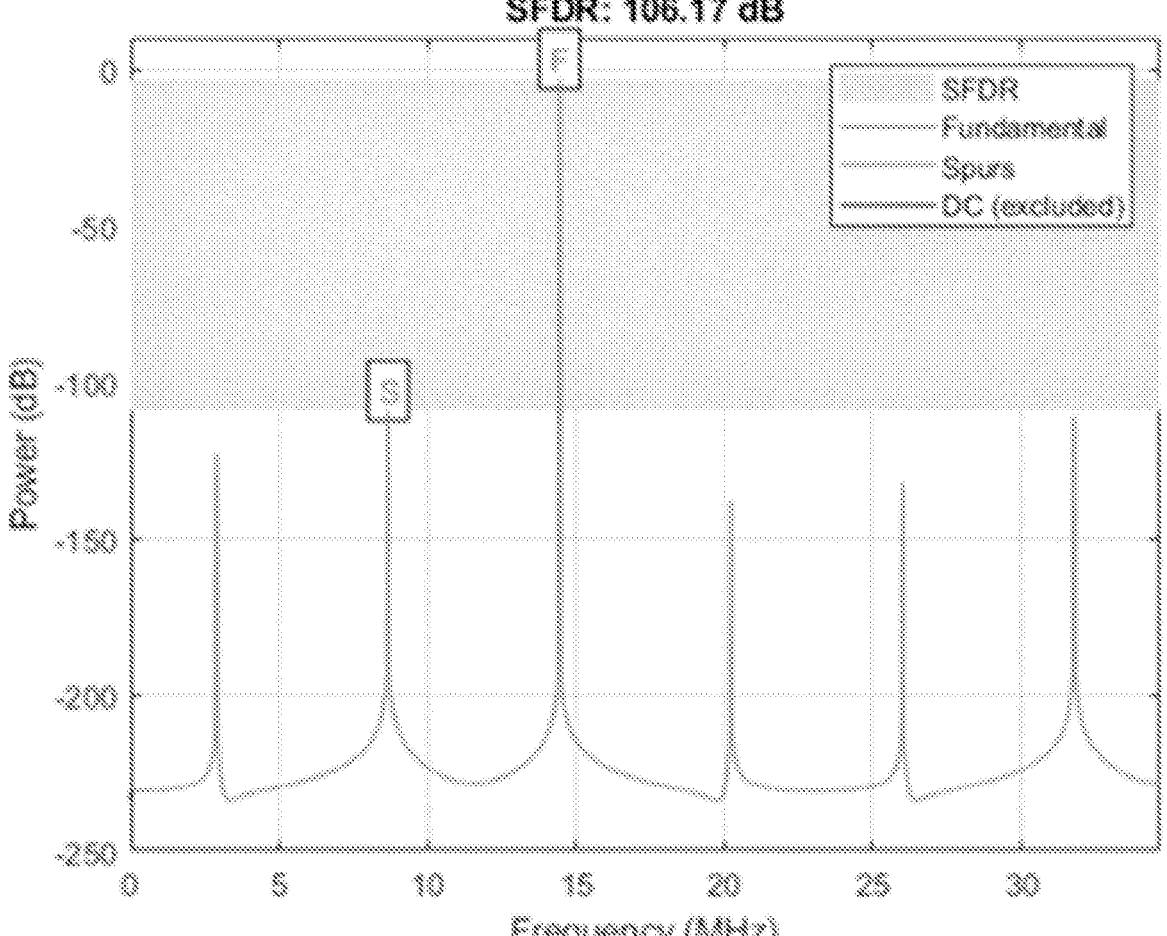
FIG. 12 illustrates such spurs, according to various embodiments.

FIG. 12 illustrates such spurs. A spurious-free dynamic range ("SFDR") is a measurement in dB on the difference between a desired NCO output (shown as the "F" peak) and a strongest spur (shown as the "S" peak), represented by the upper band in the plot of FIG. 12. There are other methods that could be used that use more complex arrangements of look-up tables. A math library function pwelch( ) could be used to analyze the NCO output and measure the SFDR.

1.b.4. Correction of the Fractional Frequency Offset

The fractional frequency offset module might start at the estimated start indicated by the Receive Input Buffer, and to do a complex multiply with the NCO output. Correcting a number of samples corresponding to the length of the expected PRACH is often sufficient. In case of Preamble Format 2 and 3, 800 μs worth of samples can be reduced from the total number of PRACH samples. The result of the complex multiplications can be stored in the Corrected Buffer.

1.c. Integer Frequency Offset (IFO) and Correction

The difference in velocity between the mobile device on Earth and the base station in space will give rise to an observed Doppler shift, possibly in the range [+15 kHz; −15 kHz]. This corresponds to an offset of max +/−12 sub-carriers in the frequency domain for some protocols. The 839 PRACH frequency bins are aligned to the OFDM sub-carriers because of the correction of the fractional frequency offset described above. Therefore, the integer value of the Doppler shift can be found by searching for location of those 839 bins. By observing the number of frequency bins that the PRACH is offset in the frequency domain, and integer frequency offset module can determine a measurement of the Doppler shift.

Figure 13A:
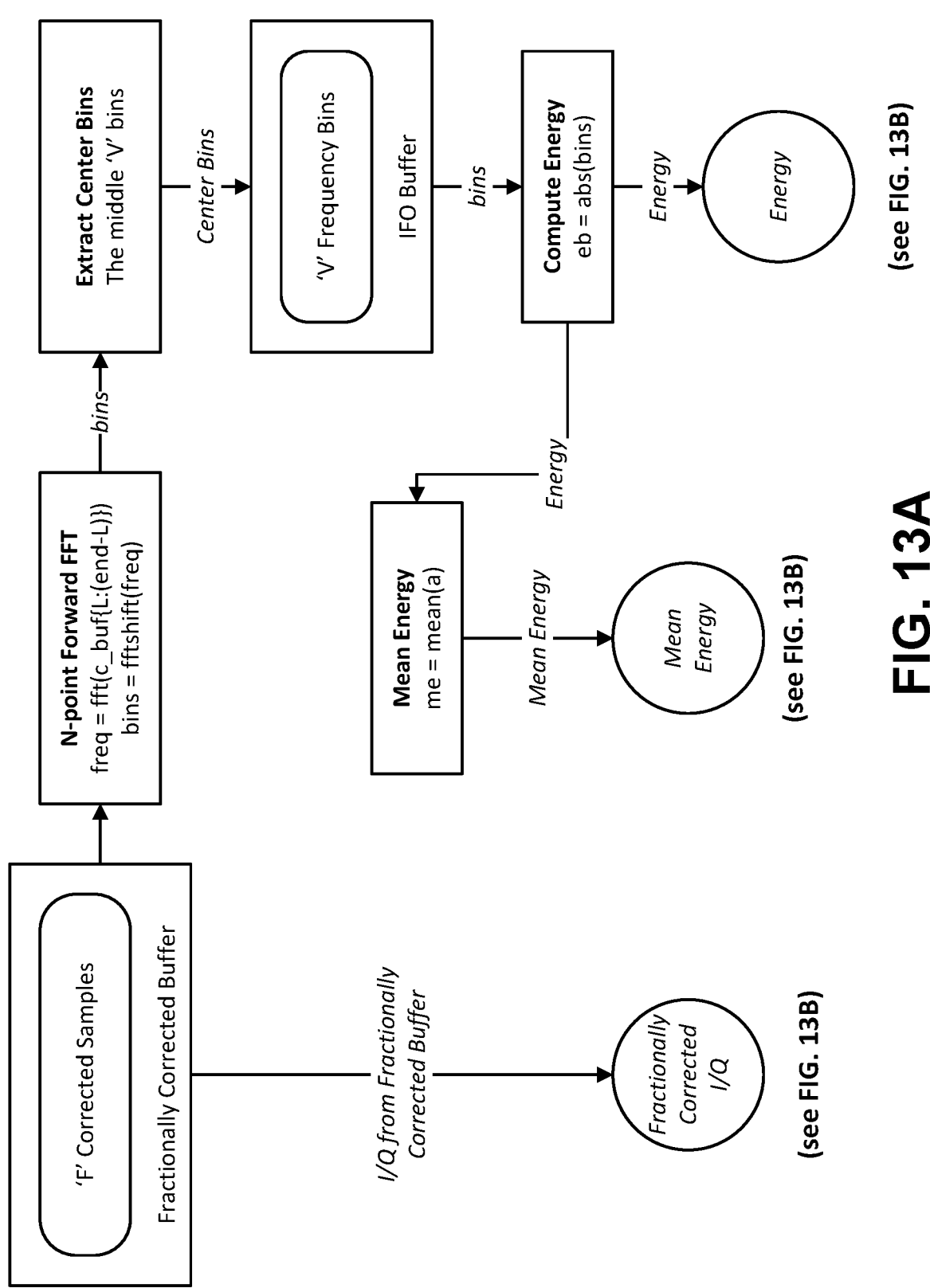
Figure 13B:
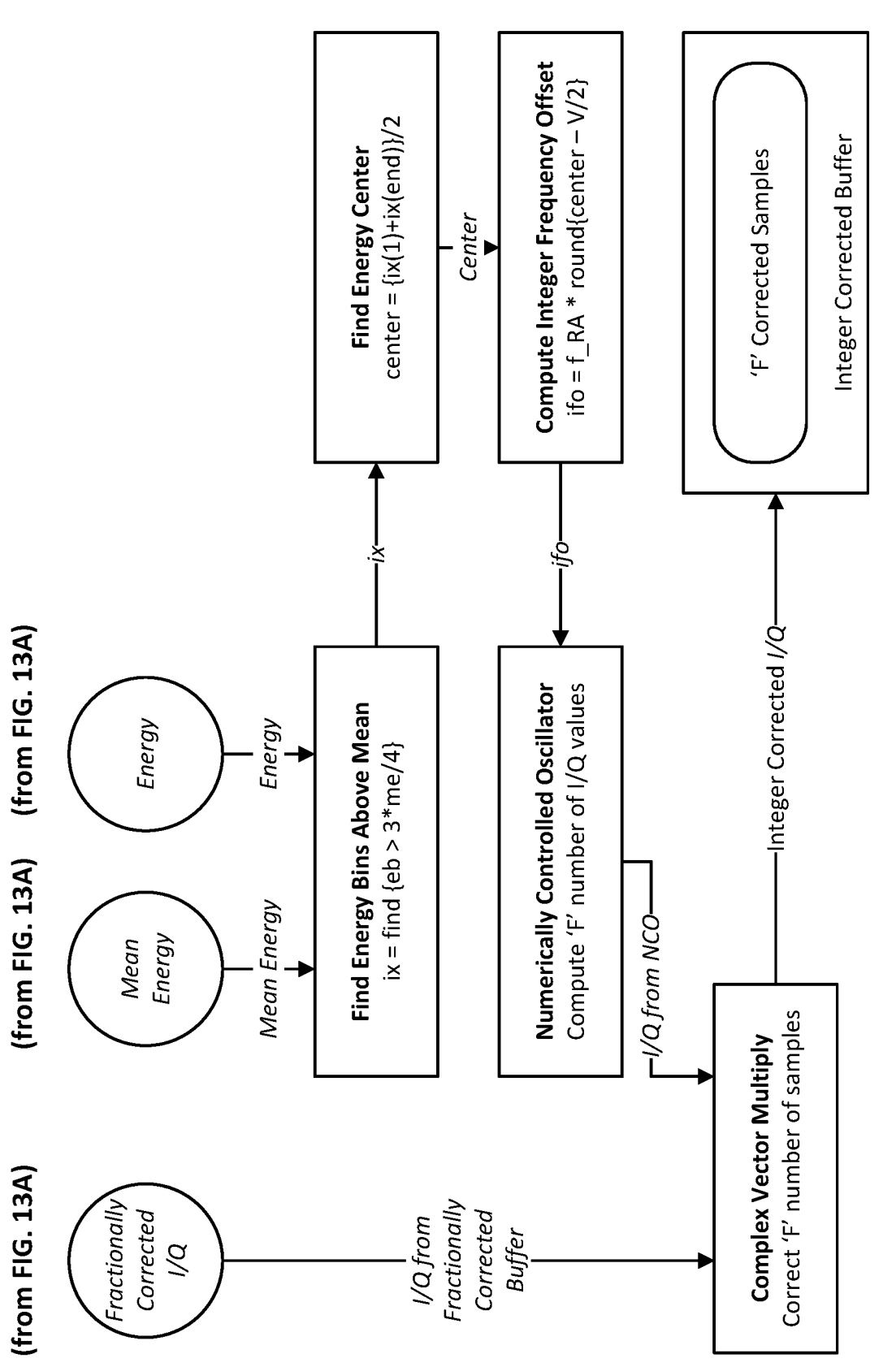

FIG. 13, comprising FIG. 13A, FIG. 13B, and FIG. 13C, illustrates an example of an integer frequency offset module that can determine an integer frequency offset and determine how to correct samples for the IFO.

1.c.1. DFT

A first step in the search for the location of the 839 bins is to take an DFT starting half way into the cyclic prefix from the start of the Corrected Buffer. The size of the DFT is 3072, which corresponds to 800 μs. This will make sure that the DFT is taken on samples within the received PRACH, regardless of the preamble format. Next, an FFT-shift type operation is carried out on the DFT output in order for the output to be centered around DC in memory. After that, the middle "V" bins at the output of the FFT-shift operation are copied to the IFO Buffer, where V=839+2*12. The number 12 is due to the possibility of a +/−12 sub-carrier Doppler shift. In other variations, a different number might be used and can be computed by considering the maximum Doppler shift in a given situation, the carrier frequencies, and the carrier frequency spacing.

1.c.2. Energy Detection in the Frequency Domain

The absolute value of the bins in the IFO buffer is computed as a measurement of the energy at each frequency. Next, the mean energy of all bins is computed. The next step is to find the location of all bins with an energy that is greater than ¾ of the mean energy level. Using the first and the last of those locations, the integer frequency offset module can calculate the center of the received PRACH in the frequency domain. In other variations, a threshold other than three quarters of the mean energy level might be used. By subtracting V/2 from the computed center and multiplying by the sub-carrier spacing, the integer frequency offset module can find the IFO.

1.c.3. Correction of the Integer Frequency Offset

The final step in correcting the received samples for the Doppler shift is to program the NCO with the IFO and multiply the content of the Corrected Buffer with the output of the NCO.

1.d. Time Offset (TO)

As mentioned above, there is a propagation delay between the mobile device and the base station, also known as the Time Offset. OFDM systems in general are very sensitive to time offsets. Therefore, the time offset needs to be determined to determine what sample is the start of a subframe and naturally, which subframe in the radio frame is being sampled. Since the frequency offset has been removed from the samples in the Corrected Buffer, the receiver can cross-correlate with 800 μs worth of samples from a pre-computed PRACH in memory that corresponds to the PRACH Configuration Index specified by base station.

Figure 14:
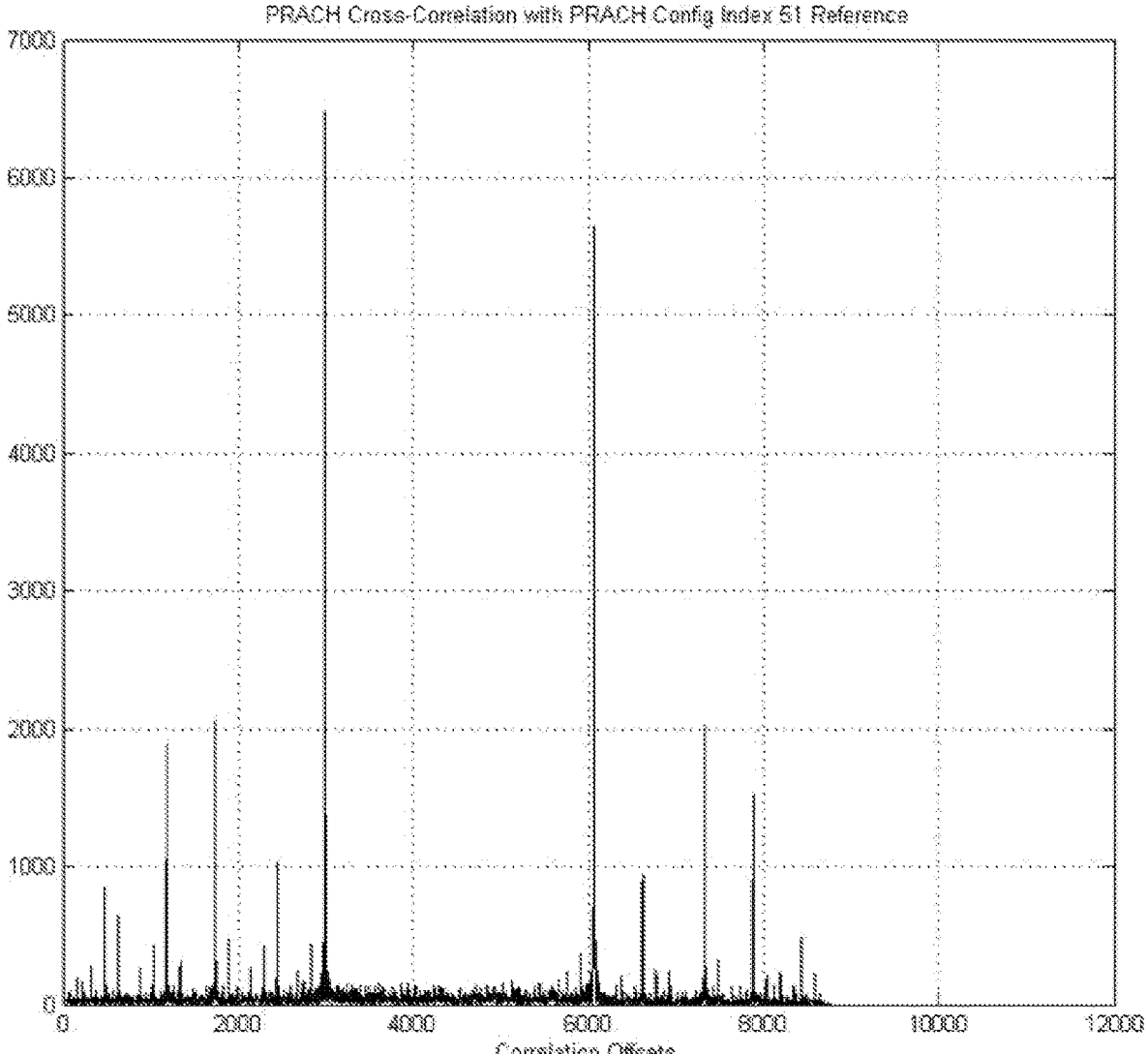
FIG. 14 shows an example of such a cross-correlation output, according to various embodiments.

FIG. 14 shows an example of such a cross-correlation output. Using this technique, the receiver can find the boundary where the cyclic prefix ends. Since the receiver knows the length of the cyclic prefix and what sample in the Receive Input Buffer corresponds with the first sample in the Corrected Buffer, the receiver also knows what sample the PRACH starts at in the Receive Input Buffer and hence the time offset.

Figure 15A:
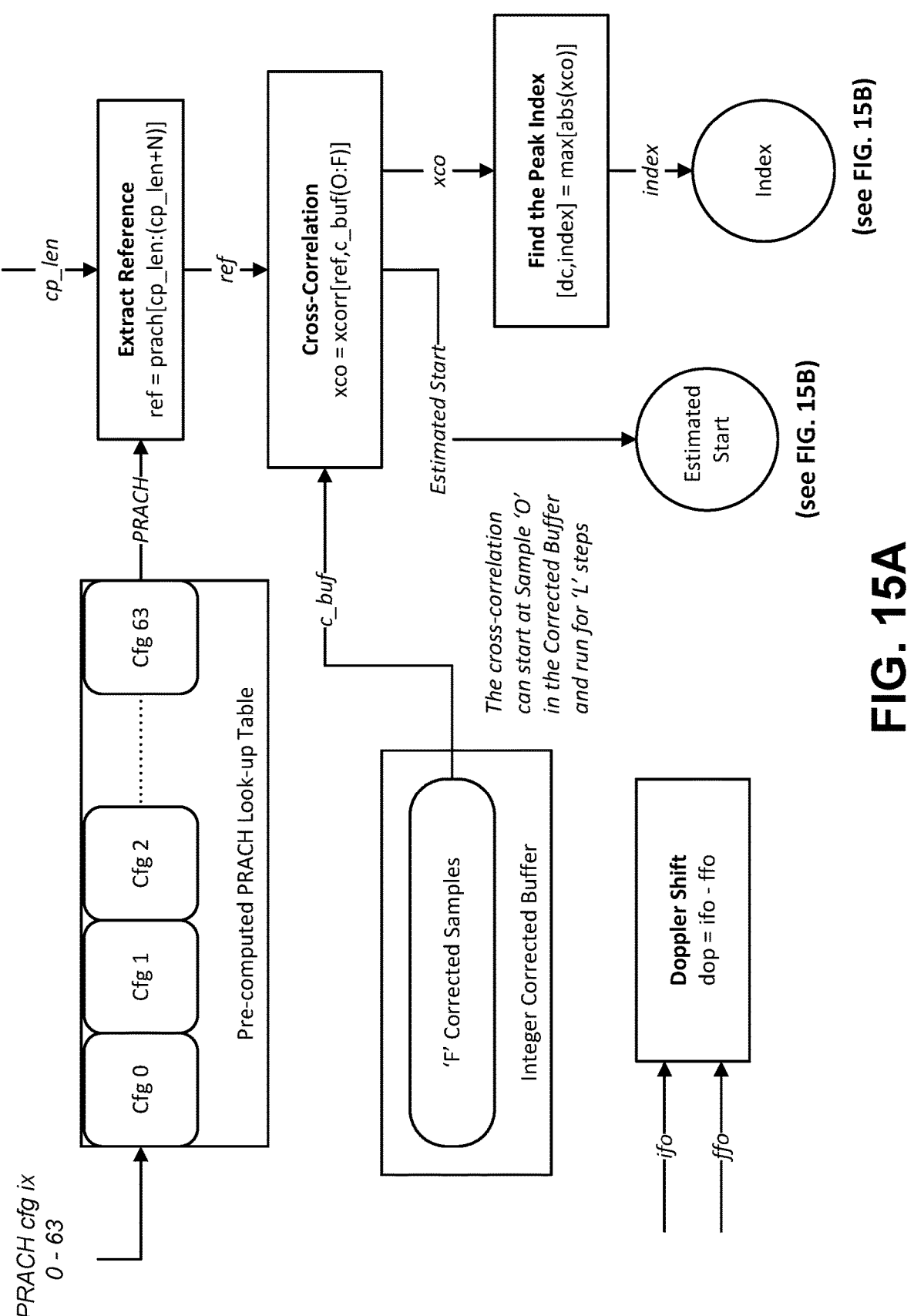
Figure 15B:
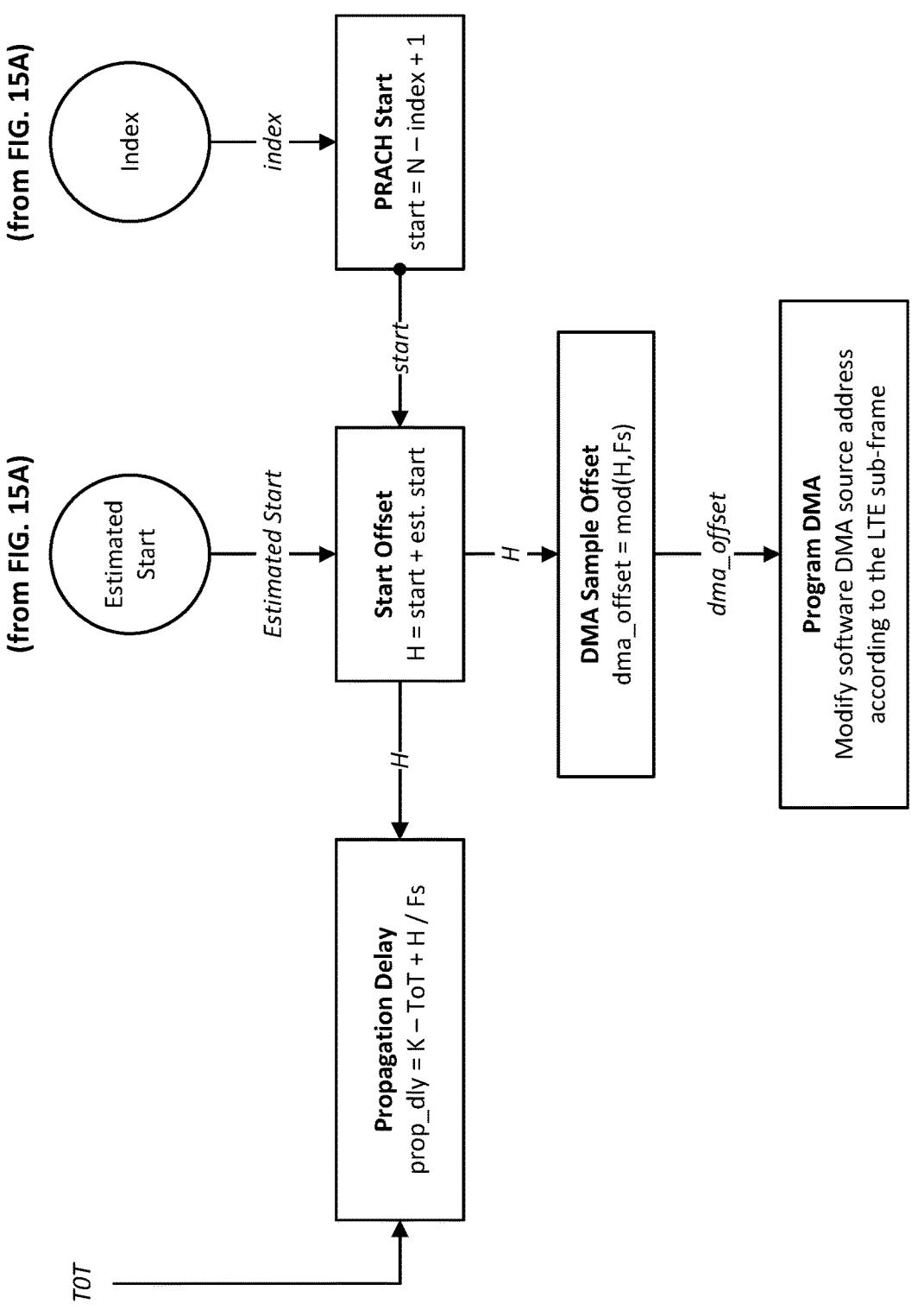

FIG. 15, comprising FIG. 15A, FIG. 15B, and FIG. 15C, illustrates an example of a time offset module and how the time offset is determined. The time offset module can determine the Doppler shift, propagation delay, and DMA offset.

1.d.1. Cross-Correlation

The PRACH Configuration Index indicates what PRACH to expect from the mobile device. The time offset module can pre-compute the PRACH in memory since the configuration is known. Starting ⅔ (or some other fraction) into the Corrected Buffer, the time offset module can cross-correlate with 800 μs worth of samples from the expected PRACH in memory using reference samples after the cyclic prefix. This cross-correlation can be repeated a little more than ⅓ (or some other fraction) of the cyclic prefix length advancing one sample in the Corrected Buffer for each step.

1.d.2. Finding the Peak

By taking the absolute value of the cross-correlation output and then finding the location of the strongest peak, the time offset module can compute the exact sample where the PRACH starts in the Corrected Buffer. Since the time offset module knows what sample in the Receive Input Buffer is associated with the first sample in the Corrected Buffer, the time offset module also knows where the PRACH starts in the Receive Input Buffer. The processing for propagation delay and DMA sample offset is common for both the contention-free PRACH and the contention-based PRACH cases and can be processed as described herein.

2. Contention-Based PRACH Receiver

2.a. Energy and Preamble Format Detection

Figure 16B:
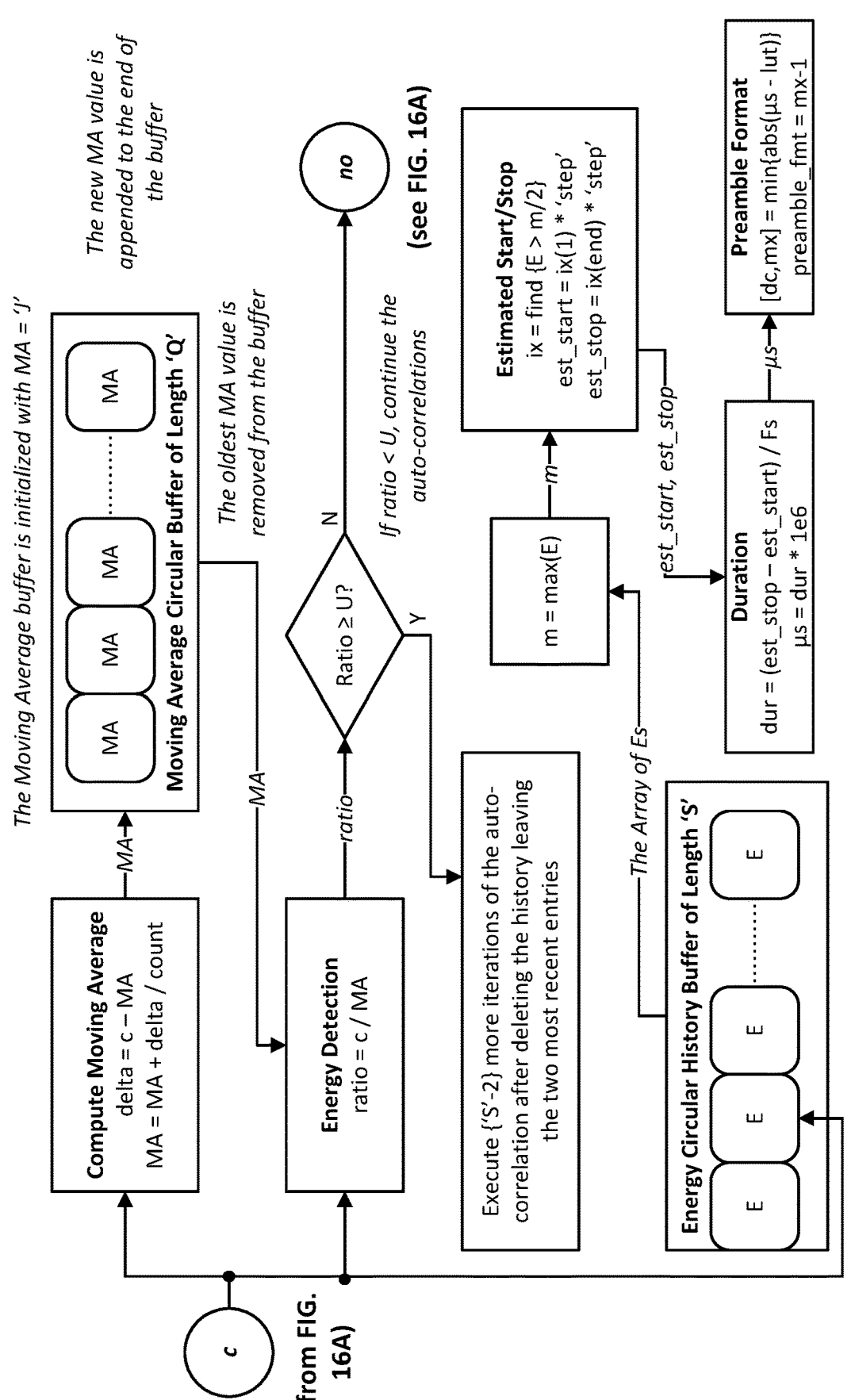

FIG. 16, comprising FIG. 16A, FIG. 16B, and FIG. 16C, illustrates a first module of a contention-based PRACH receiver and how an estimated start and the preamble format is determined.

2.a.1. DMA Input of I/Q samples

In the first module, the input of I/Q samples might be handled the same as for the contention-free PRACH receiver except that the copying of "save" samples only terminates after the {"S"–2} extra iterations of the auto-correlation has been completed.

2.a.2. Energy Detection

The size of the circular Energy History Buffer is larger in the case of contention-based PRACH compared to contention-free PRACH. The size is large enough to hold computed energy values to cover correlation results for the longest preamble format (Format 3) plus one extra result before and after. Once the Energy Detection ratio has been achieved, the delayed auto-correlation continues to generate output until the Energy History Buffer is full. The number of entries in the buffer is reset to two when energy is detected. This way the first module will capture correlation output for all four possible preamble formats; from the rising to the falling edge.

Figure 17:
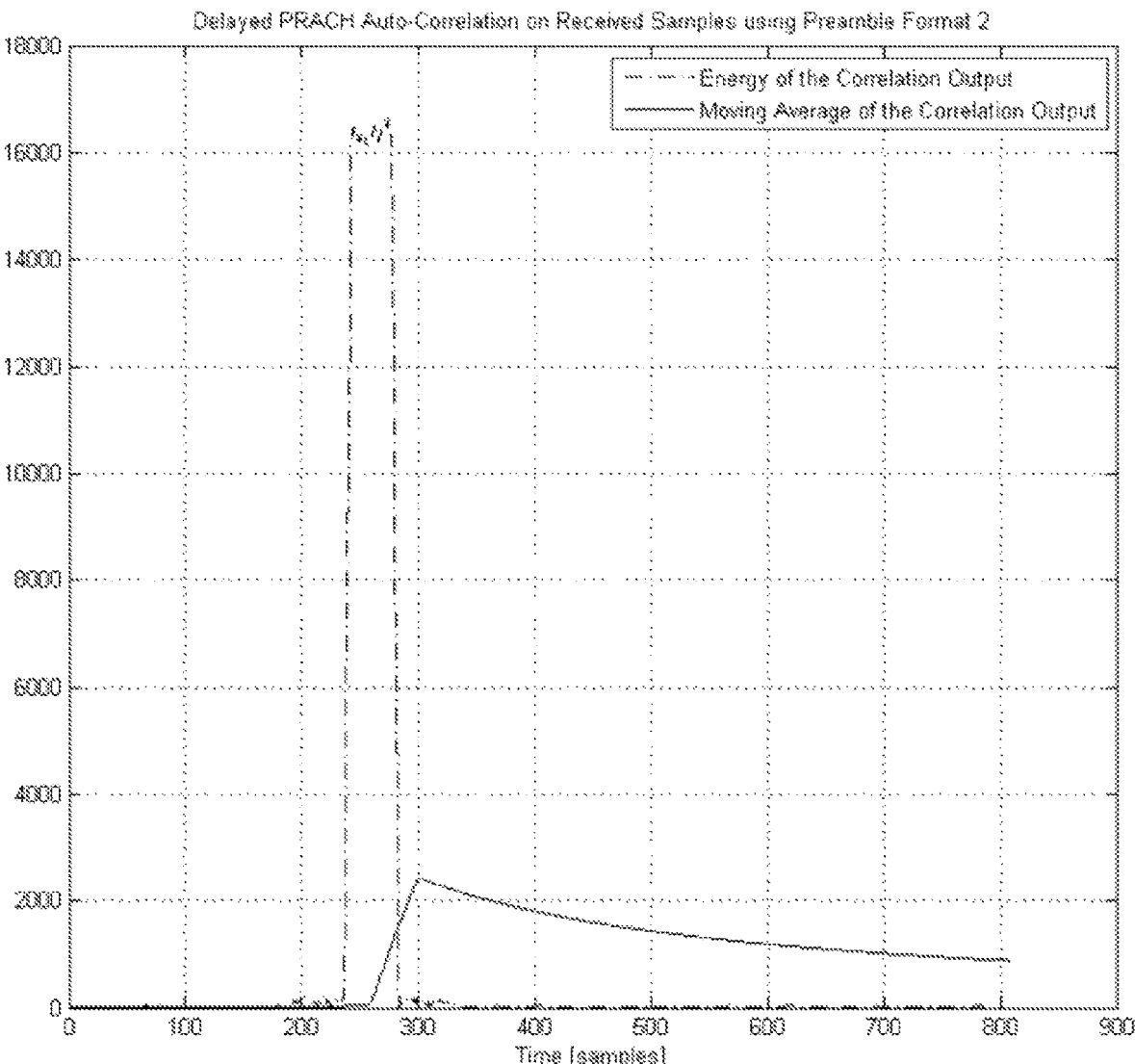
FIG. 17 illustrates an example of correlation outputs in case of a contention-based PRACH message, according to various embodiments.

FIG. 17 illustrates an example of correlation outputs in case of a contention-based PRACH message using preamble format 2.

2.a.3. Duration [µs]

Once the Energy Buffer is full, the maximum energy value is determined. Next, the locations of the energy values that are greater than one half of the max value are found. The locations of the first and the last energy value above one half of the max is used to determine a duration in microseconds by scaling by the step size and dividing by the sample rate.

2.a.4. Estimated Start

The estimated start of the PRACH can be determined as the location of the first energy value above one half of the max multiplied by the step size (96 samples). Other thresholds might be used instead.

2.a.5. Determination of the Preamble Format

A look-up table containing four correlation energy durations and back-off parameters corresponding to preamble formats 0-3 can be pre-computed and stored in memory. The durations for preamble formats 0, 1, 2, and 3 might be 103.125 µs, 684.375 µs, 1003.125 µs, and 1484.375 µs, respectively. For the latter two, formats 2 and 3, the back-off parameters account for the first sequence's 800 µs duration.

By taking the absolute value of the difference between the energy duration of the received PRACH and the four entries in the look-up table and then finding the entry that is the least different from the received PRACH, the first module can determine what preamble format that the mobile device used when transmitting the PRACH.

2.b. Fractional Frequency Offset and Correction

Figure 18A:
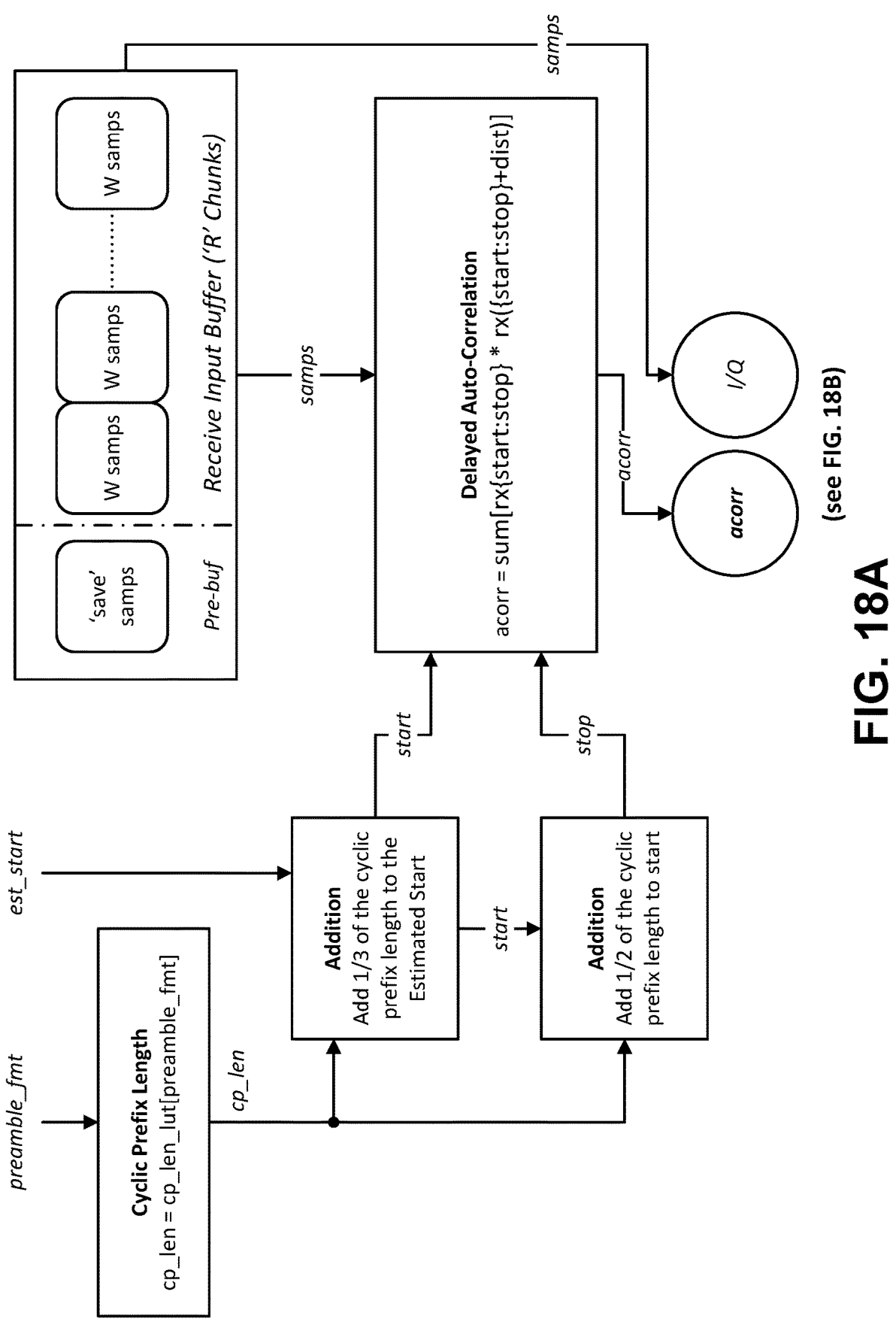
Figure 18C:

FIG. 18, comprising FIG. 18A, FIG. 18B, and FIG. 18C, illustrates a fractional frequency offset ("FFO") module for a contention-based PRACH receiver and calculation and correction for the FFO. Note that the preamble format is an input to a look-up table containing the length of the cyclic prefix. Otherwise, the processing is the same as in the contention-free case.

2.c. Integer Frequency Offset and Correction

Figure 19A:
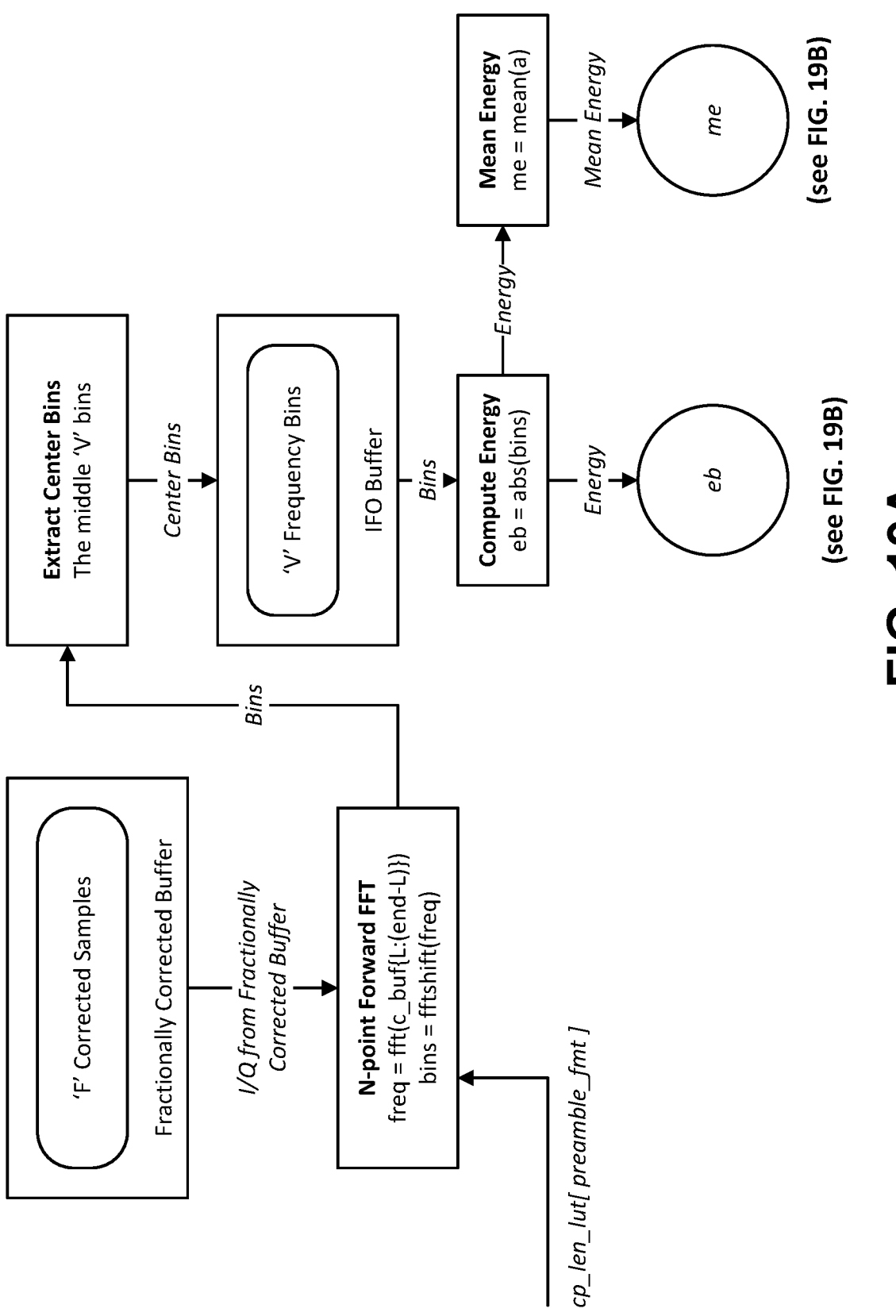
Figure 19B:
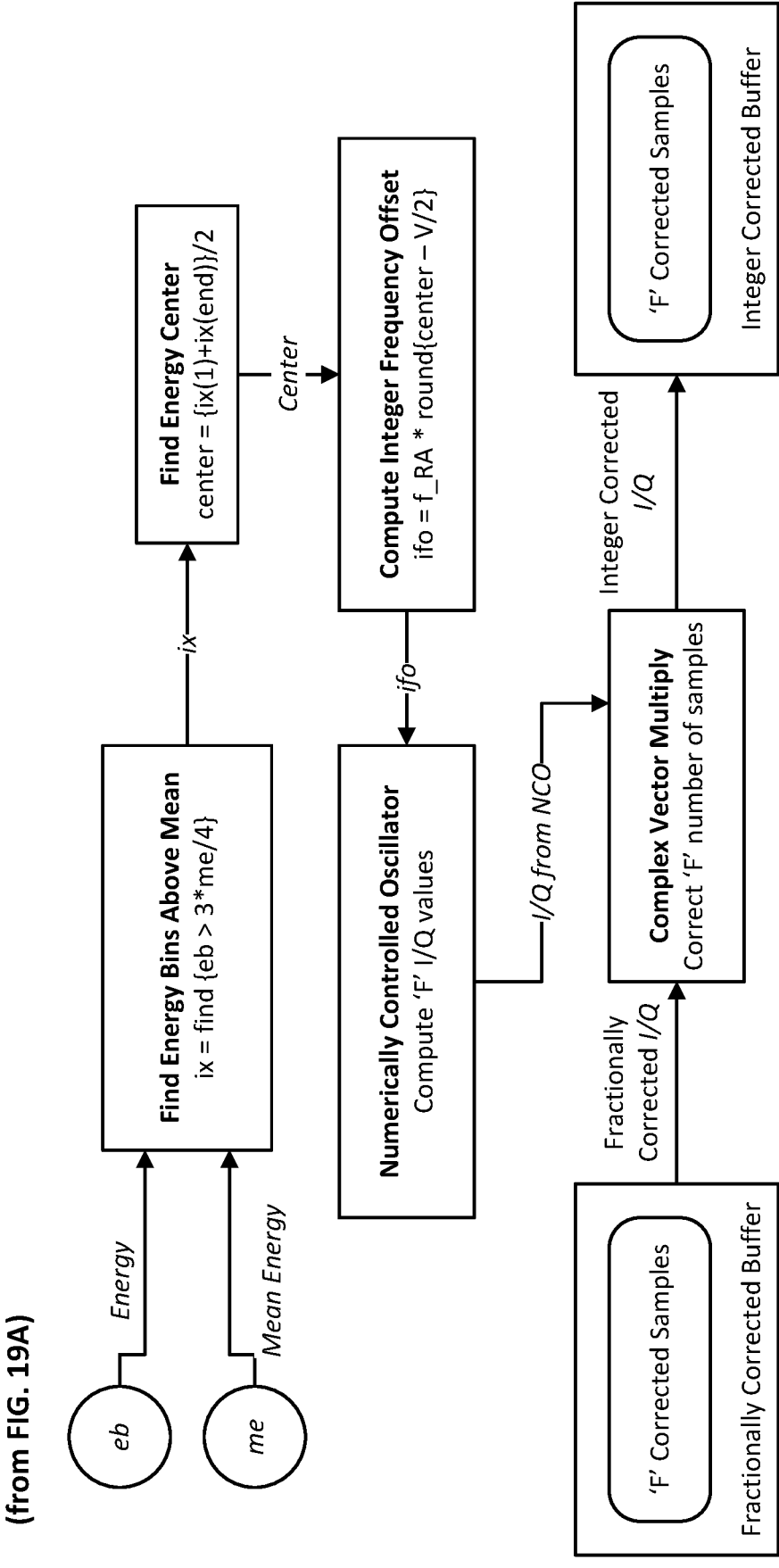

FIG. 19, comprising FIG. 19A, FIG. 19B, and FIG. 19C, illustrates an integer frequency offset ("IFO") module for a contention-based PRACH receiver and calculation and correction for the IFO. Note that the preamble format is an input to a look-up table containing the length of the cyclic prefix. Otherwise, the processing is the same as in the contention-free case.

2.d. Time Offset

Figure 20A:
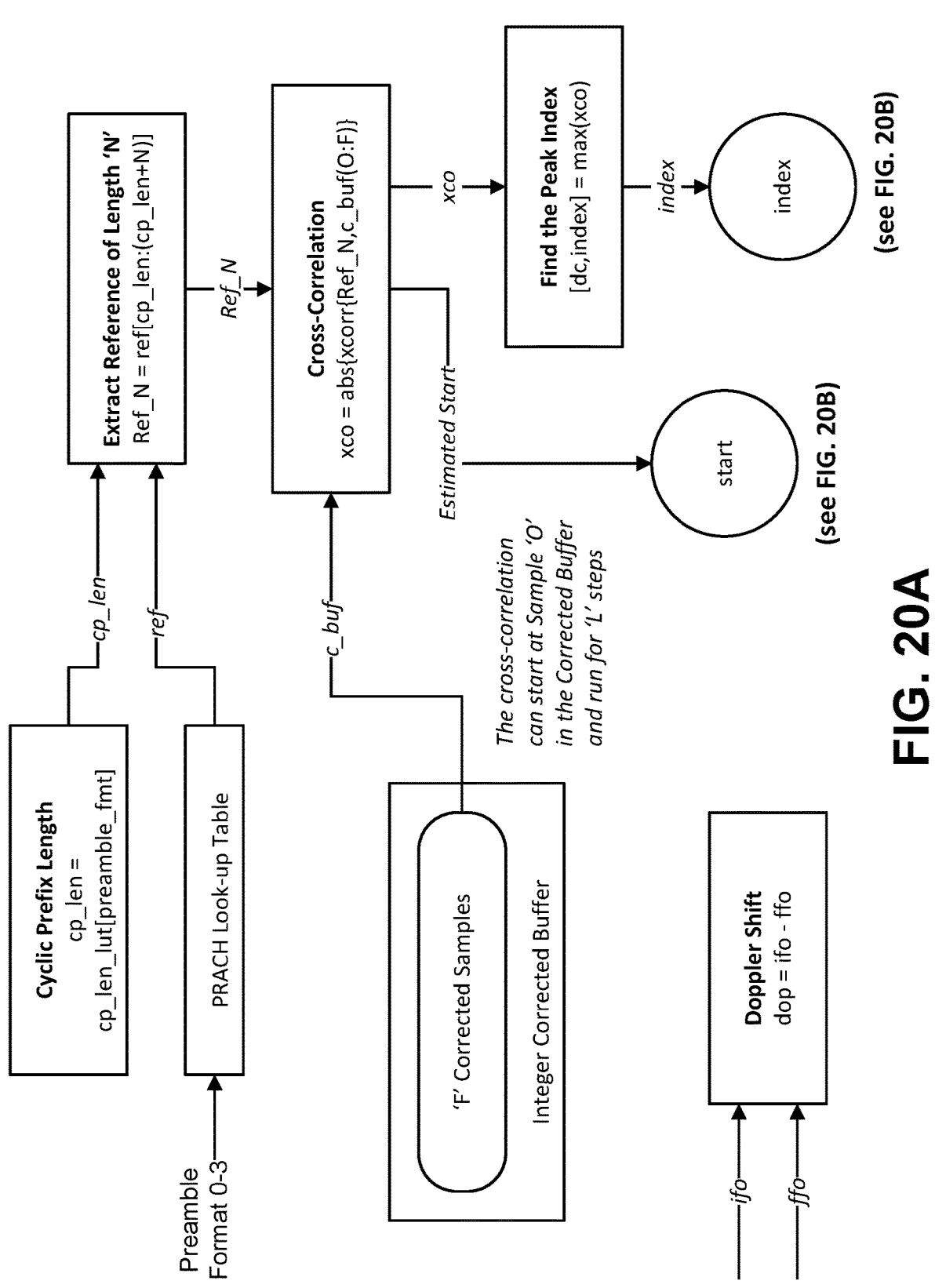
Figure 20B:
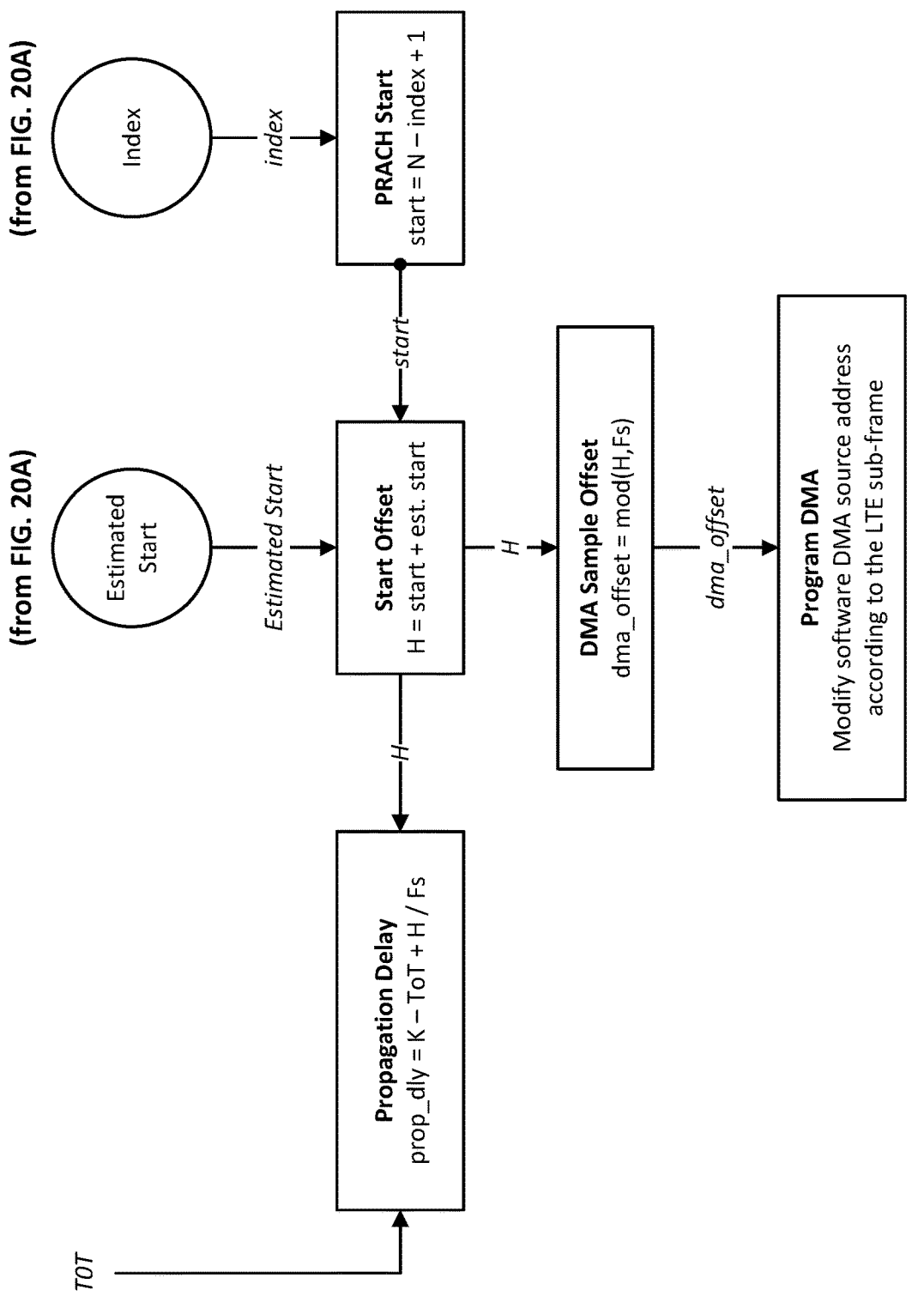

FIG. 20, comprising FIG. 20A, FIG. 20B, and FIG. 20C, illustrates an example of a time offset module and how the time offset is determined for a contention-based PRACH receiver. The time offset module can determine the Doppler shift, propagation delay, and the DMA offset. Note that the preamble format is an input to a look-up table containing the length of the cyclic prefix.

In the case of a contention-based PRACH reception, the base station likely does not know the exact PRACH that was used by the mobile device. Therefore, as a reference for the cross-correlation, the time offset module uses the PRACH message corresponding to configuration index 0, 16, 32 or 48. The index is computed by multiplying the detected preamble format (0, 1, 2 or 3) by the number 16. Otherwise, the processing is the same as in the contention-free case.

2.e. Doppler Shift

To compute the Doppler shift, the receiver the FFO to the IFO. In some uses, where the integer frequency offset is rounded up from the actual frequency offset, the Doppler shift is the integer frequency offset minus the fractional frequency offset.

2.f. Propagation Delay

The Propagation Delay is determined by the difference in the actual and the expected Time-of-Arrival of the PRACH.

2.f.1. DMA Sample Offset

From the start of the PRACH, the receiver can determine the subframe alignment and hence can modify the read pointer of the software DMA to align to the radio frame boundary taking into account the Timing Advance.

2.f.2. Timing Advance

The timing advance can be represented by value in the range 0 to 1282 that allows the base station to tell the mobile device to start transmitting earlier than it currently does. The base station can transmit the timing advance value to the mobile device in the RAR message as illustrated in FIG. 4.

Figure 21:
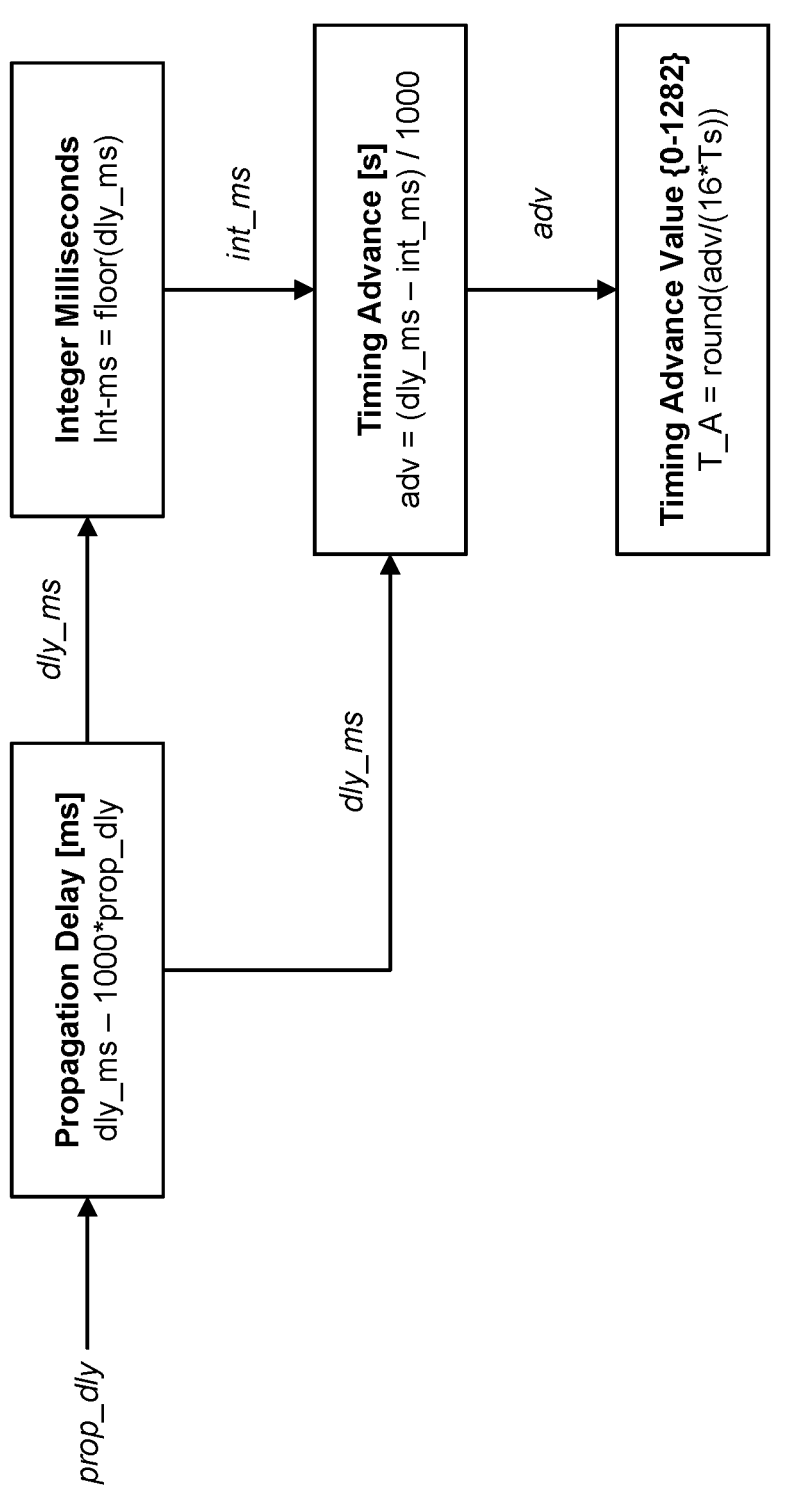
FIG. 21 illustrates the time offset module might compute the timing advance, according to various embodiments.

FIG. 21 illustrates the time offset module might compute the timing advance that is to be conveyed to the mobile device. In FIG. 21, $T_s=1/30,720,000$ second, the default sample period in the LTE protocol, T_A is an 11-bit timing advance value to be transmitted in the RA message and RA is the RACH Response from the base station to the mobile device.

2.f.3. Residual Frequency Offset, Channel Estimation and Tracking

Even after compensating for the FFO and the IFO, a Residual Frequency Offset (RFO) remains. Over time, the RFO grows significant enough that decoding of received OFDM symbols can be rendered impossible. Furthermore, due to the high velocity of a space vehicle, a time offset or sample offset can develop even though timing was adjusted during PRACH reception. Regardless of the velocity of the space vehicle, a receiver should estimate and track the channel due to Rician fading. This estimation/tracking can be done using the Demodulation Reference Signal (DMRS).

3. PUSCH Time/Frequency Offset Tracking

When a PUSCH transmission arrives, the receiver uses the cyclic prefix of the PUSCH in combination with an orbital model in order to tune the time and frequency offsets before further processing of the received signal.

Figure 22A:
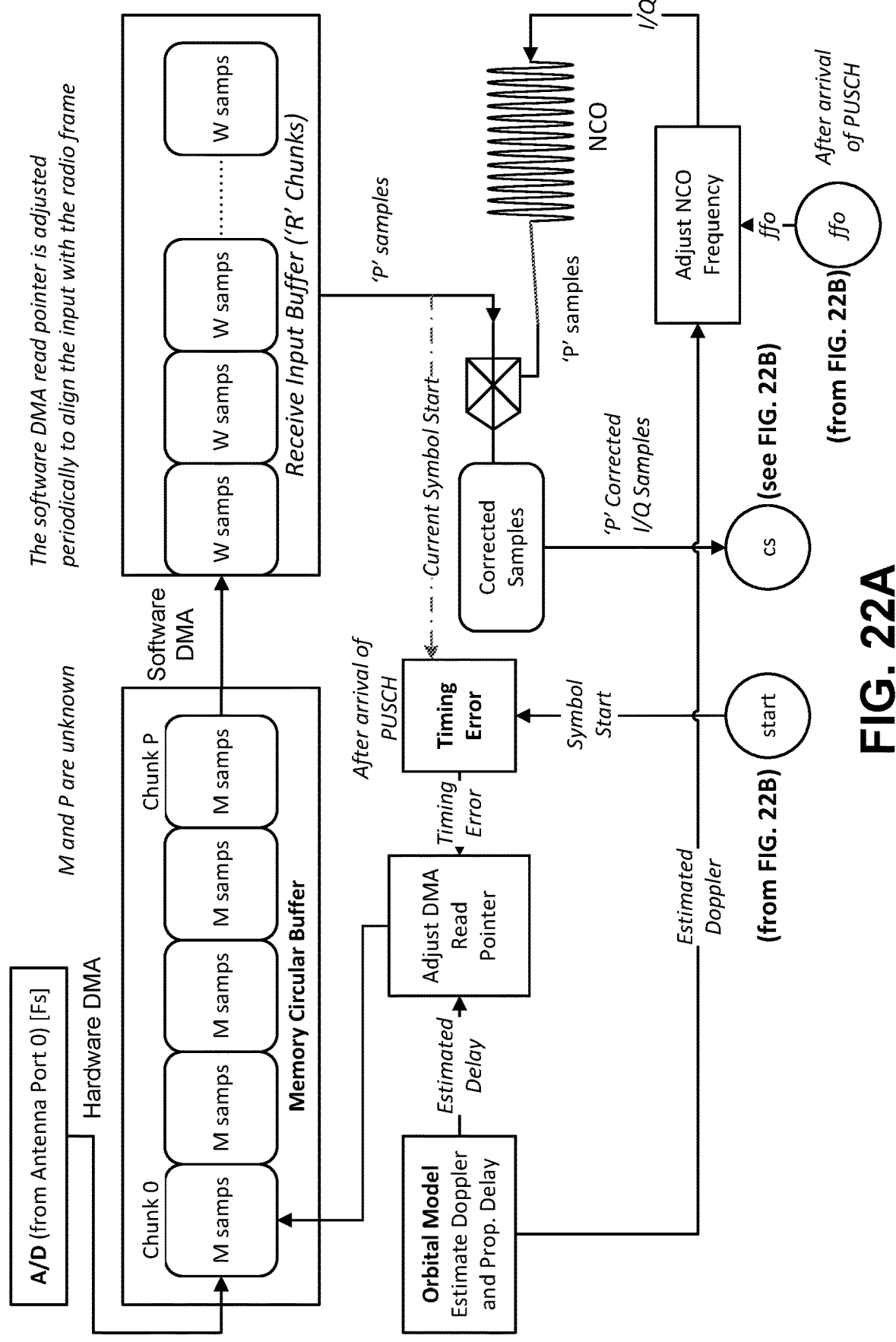
Figure 22B:
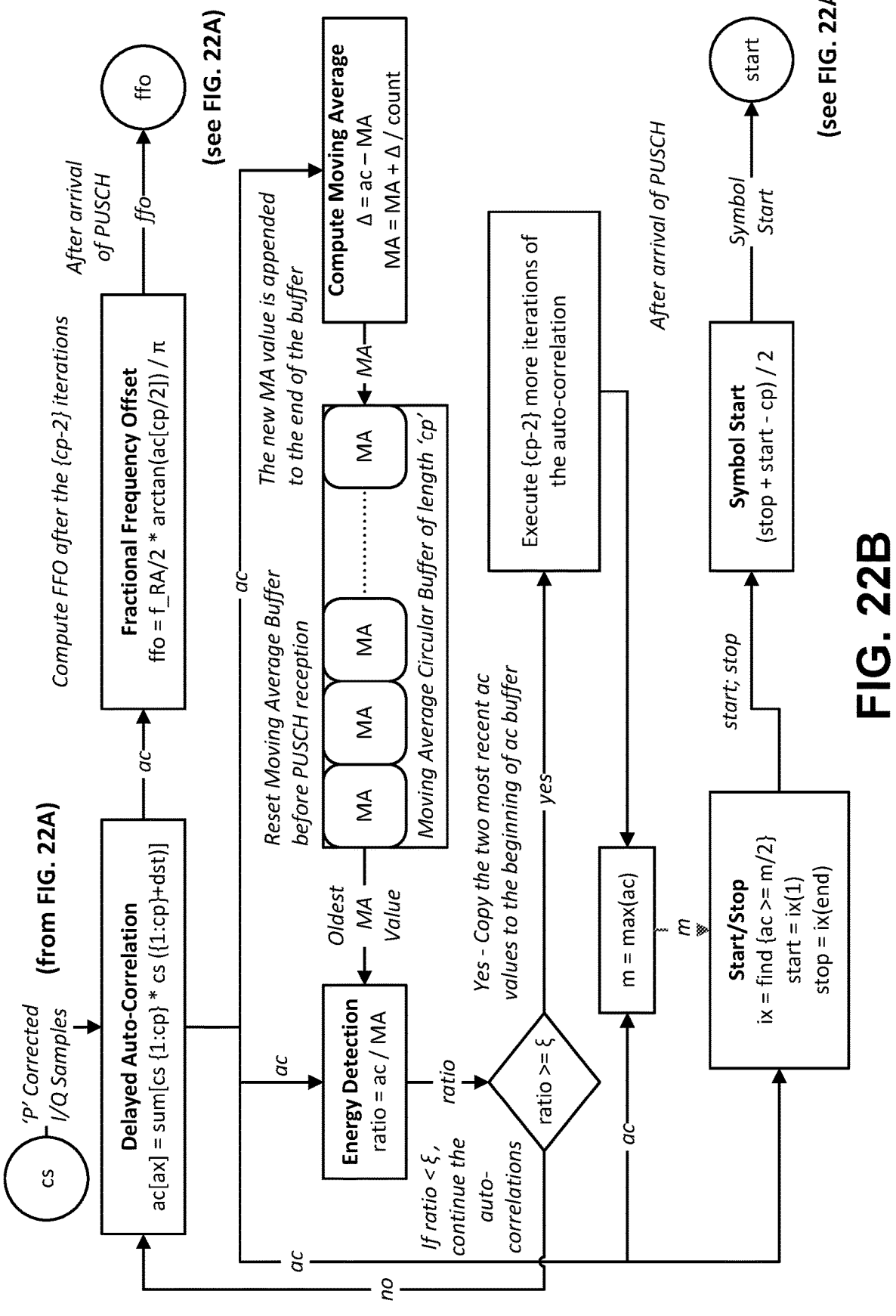
Figure 22C:
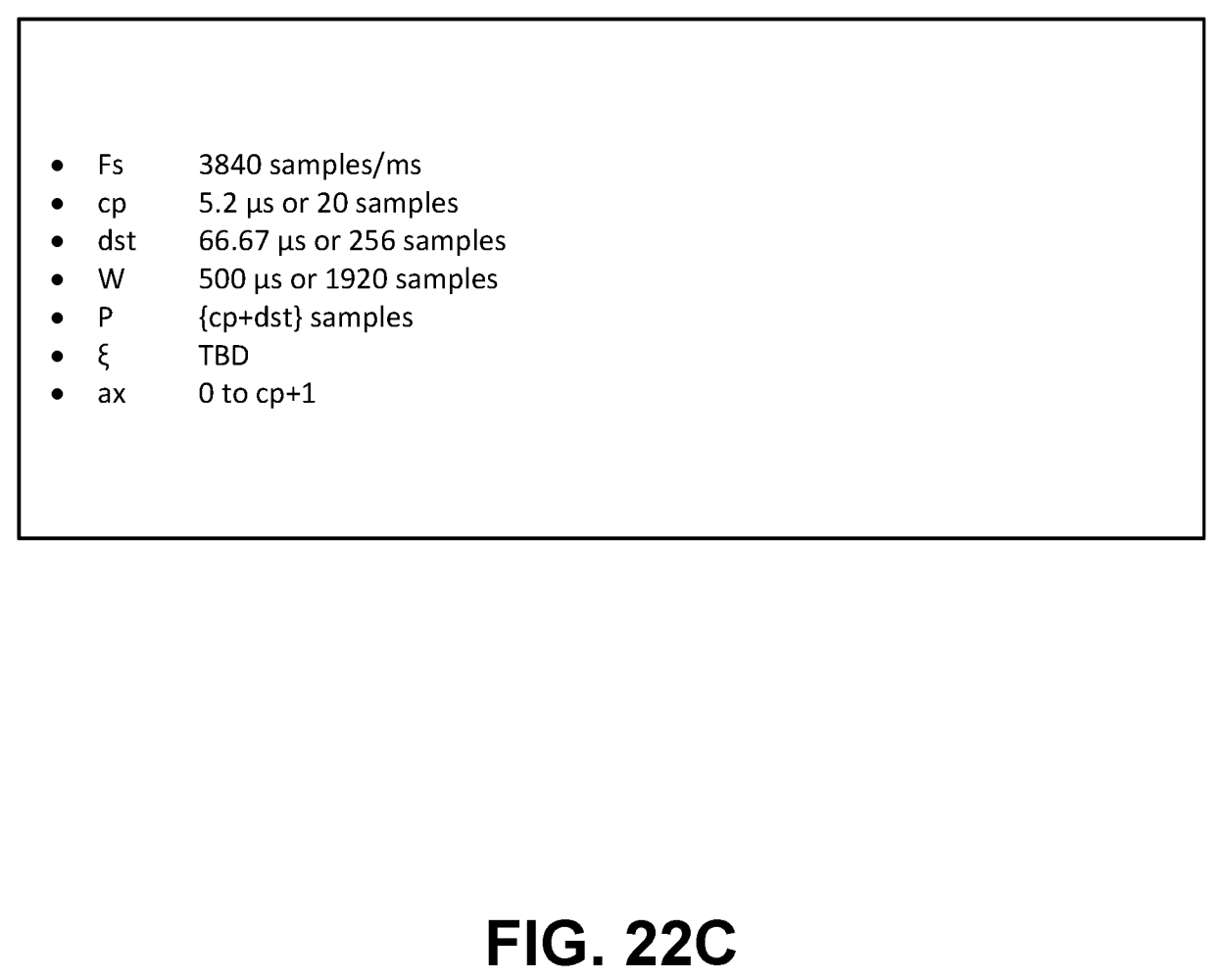

FIG. 22, comprising FIG. 22A, FIG. 22B, and FIG. 22C, illustrates an example of an offset tracking module of a PUSCH receiver for determining time offset and frequency offset based on receipt of a PUSCH message.

The offset tracking module might determine the length of the PUSCH message cyclic prefix for processing. In a normal PUSCH channel message, the cyclic prefix for Symbol 0 is 5.2 μs and for Symbols 1-6 is 4.7 μs. In an extended PUSCH channel message, the cyclic prefix for Symbols 0-6 is 16.7 μs. In each case, the cyclic prefix is a copy of the last portion of the message, e.g., the last 4.7 μs, 5.2 μs, or 16.7 μs.

Before a PUSCH transmission arrives, the receiver can use an orbital model to estimate the Doppler shift and the time of arrival of the PUSCH message so that processing starts within a few samples of the cyclic prefix. This can be done by adjusting a software DMA read pointer. Similarly, the frequency of the NCO can be adjusted according to the estimated Doppler shift.

The antenna samples come in via hardware DMA to memory. A software DMA can bring the samples to a Receive Input Buffer in the internal memory for signal processing operations, such as corrections based on the NCO.

Before the samples are processed, they are corrected for the frequency offset, where the Doppler shift is typically the largest contributor. A complex multiply operation is used to multiply a chunk of samples by the NCO output. The result is stored in the Corrected Buffer.

Since the timing estimate from the Orbital Model might not be exact, the receiver can do delayed auto-correlations on the received PUSCH signal to find a rising edge and a falling edge. The center between the two might be as a best estimate.

A Moving Average of the delayed Auto-Correlation can be used to detect PUSCH energy by comparing delayed Moving Average values with correlation outputs.

When the receiver detects a rise in the absolute value of the correlation output, it can deem that the arrival of the PUSCH message. After that, the receiver can continue the correlations until it has values that cover the length of the cyclic prefix. The strongest correlation value is then determined.

To find the symbol start, the receiver might the rising edge and the falling edge of the correlation output. One method of finding those is to find all correlation outputs above half of the maximum value and then add the position of the first and the last and subtract the length of the cyclic prefix. The receiver can then multiply the result by one half to arrive at the symbol start. Next, the detected symbol start is compared with the most recent start estimate and the software DMA read pointer is updated accordingly.

To compute the fractional frequency offset, the center value of the correlation outputs is taken to find the I/Q angle using the arctan function. After dividing by x and multiplying by half of the subcarrier spacing, the receiver calculates the fractional frequency offset value, ffo. The next step is to adjust the NCO frequency with the ffo value and correct all samples in the Input Receive Buffer starting with the first sample after the cyclic prefix that belongs to the first OFDM symbol of the PUSCH.

Figure 23:
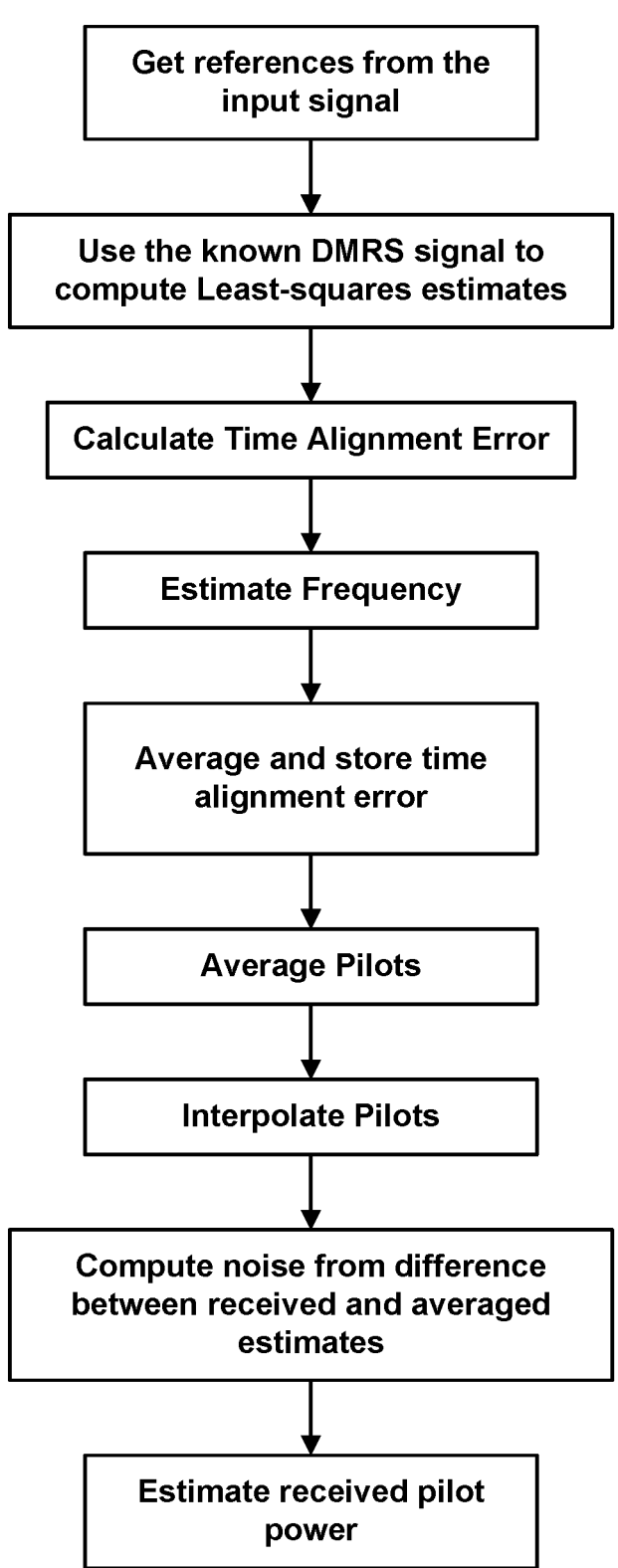
FIG. 23 illustrates an example process for PUSCH message processing, according to various embodiments.

FIG. 23 illustrates an example process for PUSCH message processing, including LTE PUSCH channel estimation.

Figure 24:
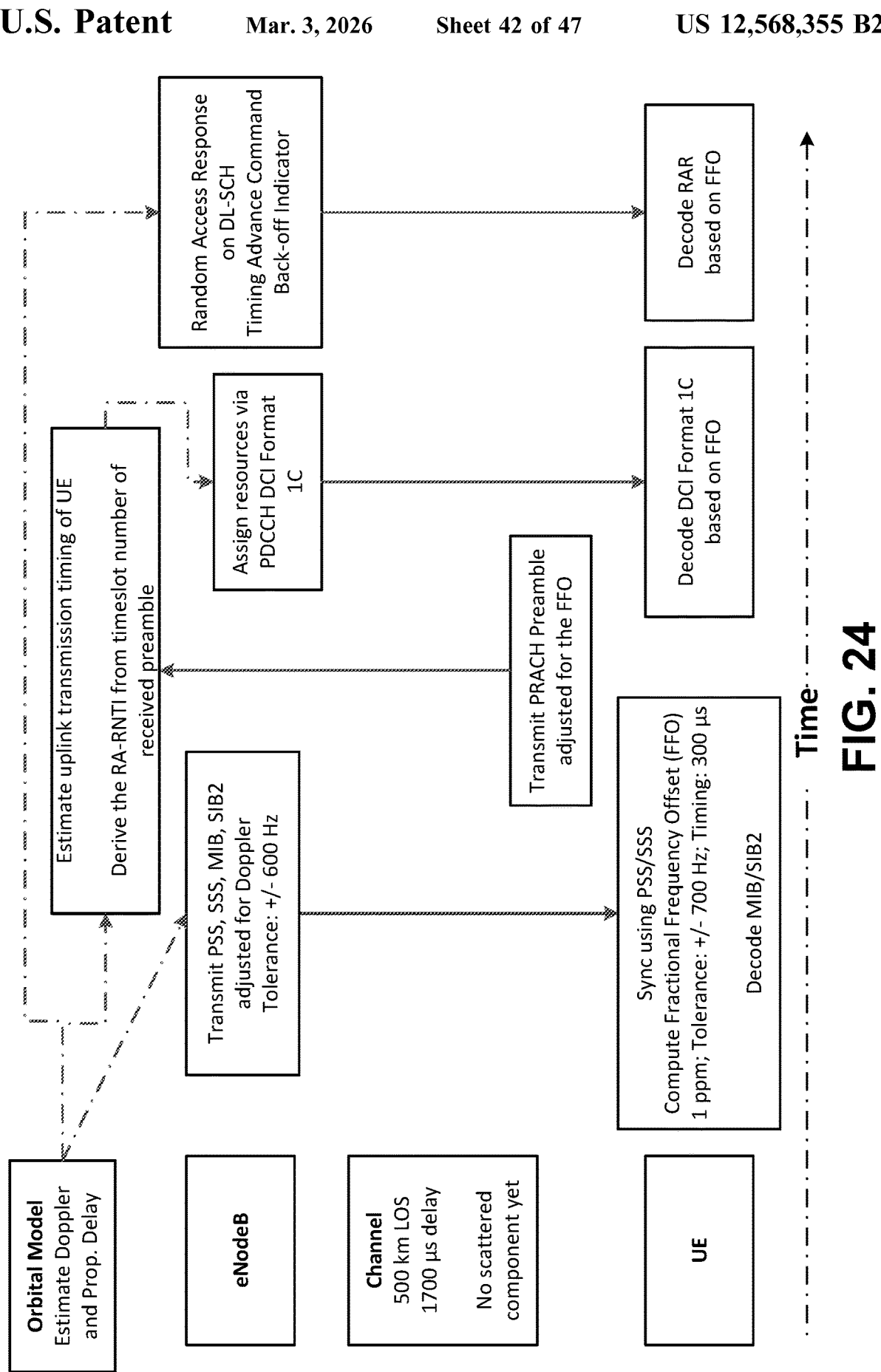
FIG. 24 illustrates an example process for PRACH message communication and processing according to various embodiments.

FIG. 24 illustrates an example process for PRACH message communication and processing.

Other Receiver Structures

Figure 25:
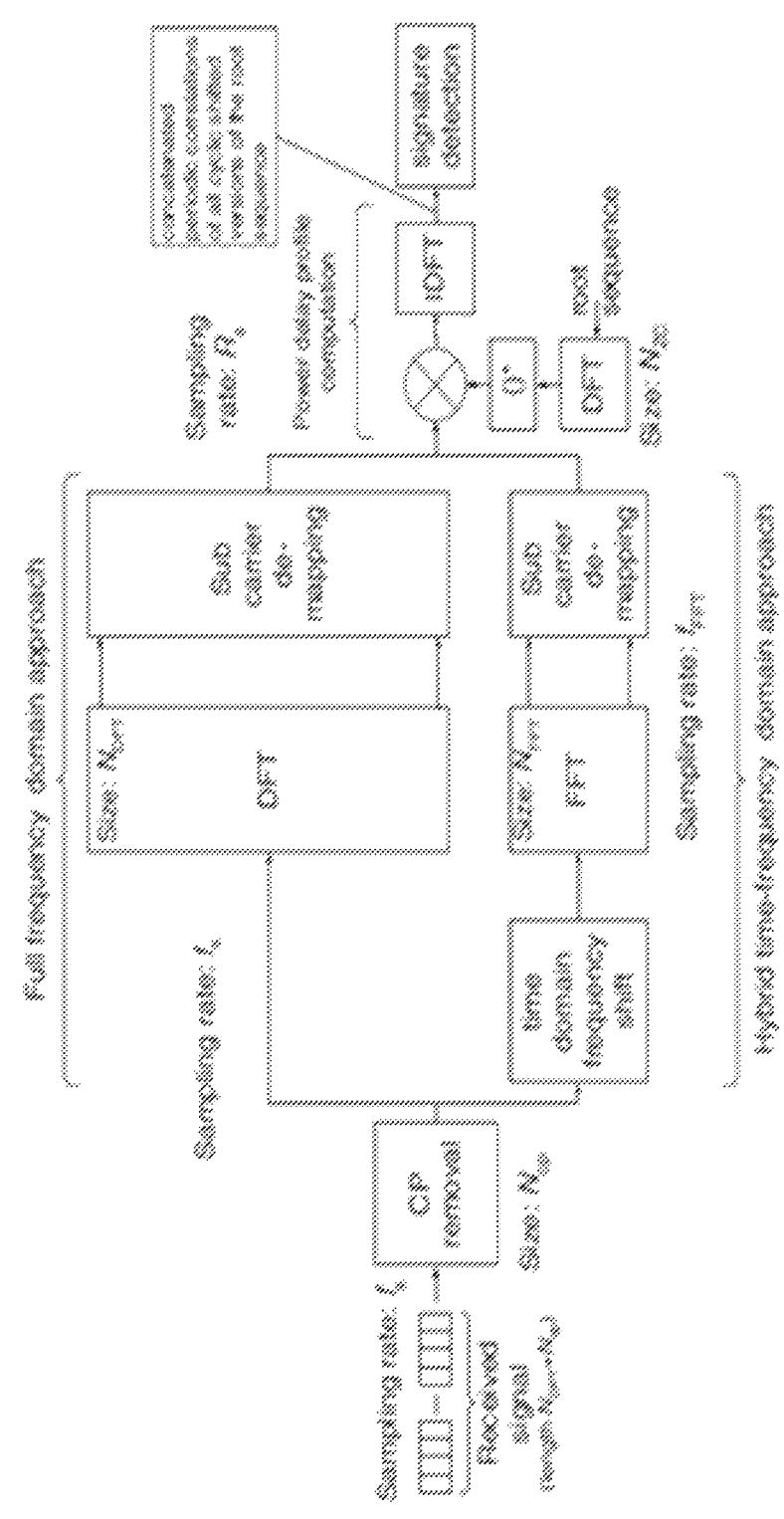
FIG. 25 illustrates an example PRACH receiver structure proposed by others.

FIG. 25 illustrates an example PRACH receiver structure proposed by others.

Figure 26:
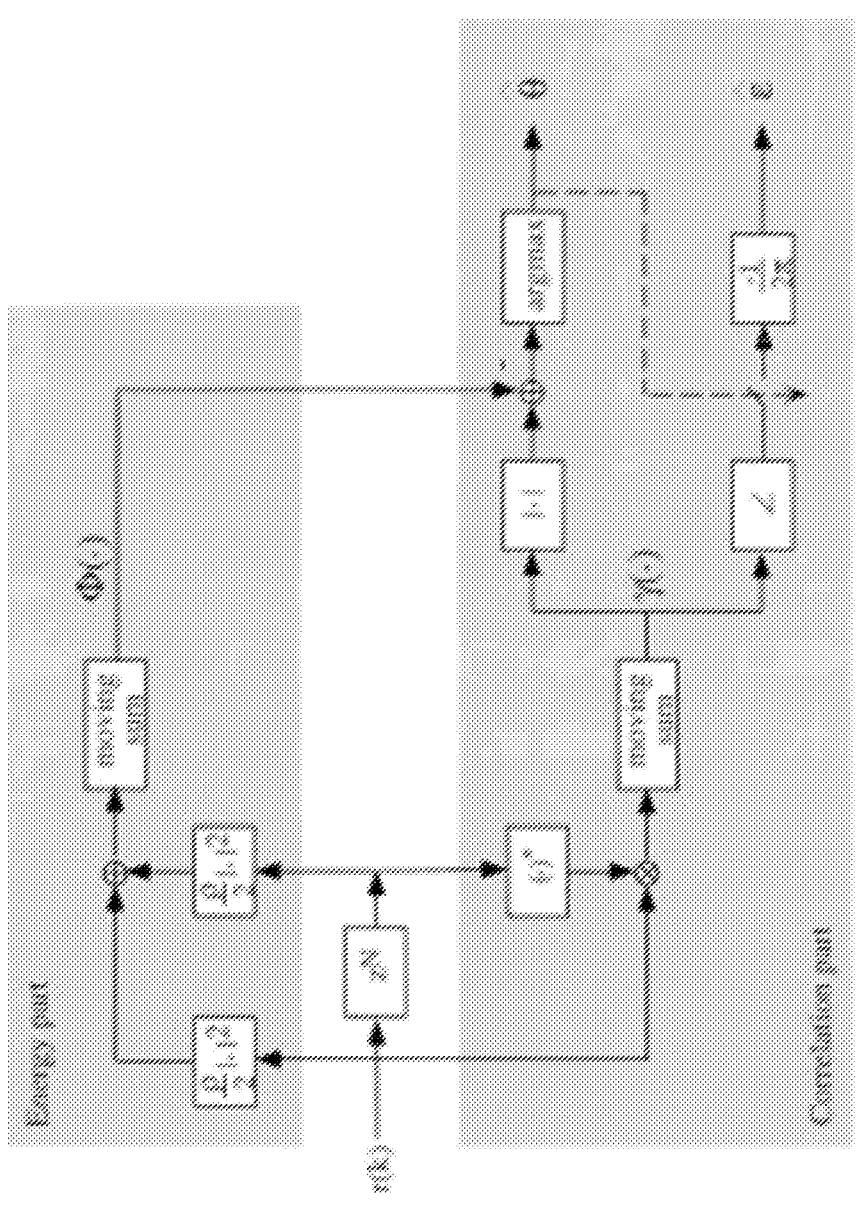
FIG. 26 illustrates an example of a frequency offset estimator proposed by others.

FIG. 26 illustrates an example of a frequency offset estimator proposed by others.

Figure 27:
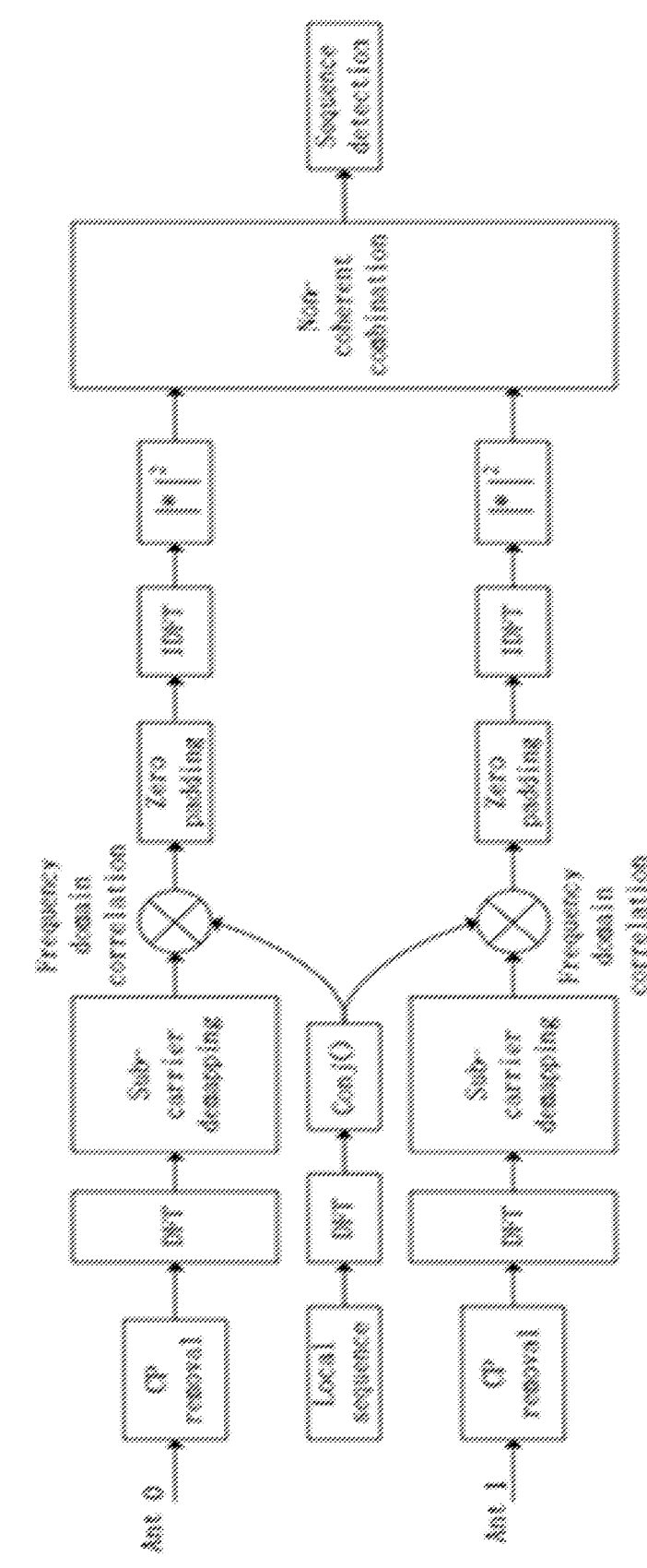
FIG. 27 illustrates an example of a preamble receiver structure for a random-access preamble proposed by others.

FIG. 27 illustrates an example of a preamble receiver structure for a random-access preamble proposed by others. FIG. 27 is from P. Li and B. Wu, "An Effective Approach to Detect Random Access Preamble in LTE Systems in Low SNR," Procedia Engineering, Wuhan, China (2011).

Example Hardware

Figure 28:
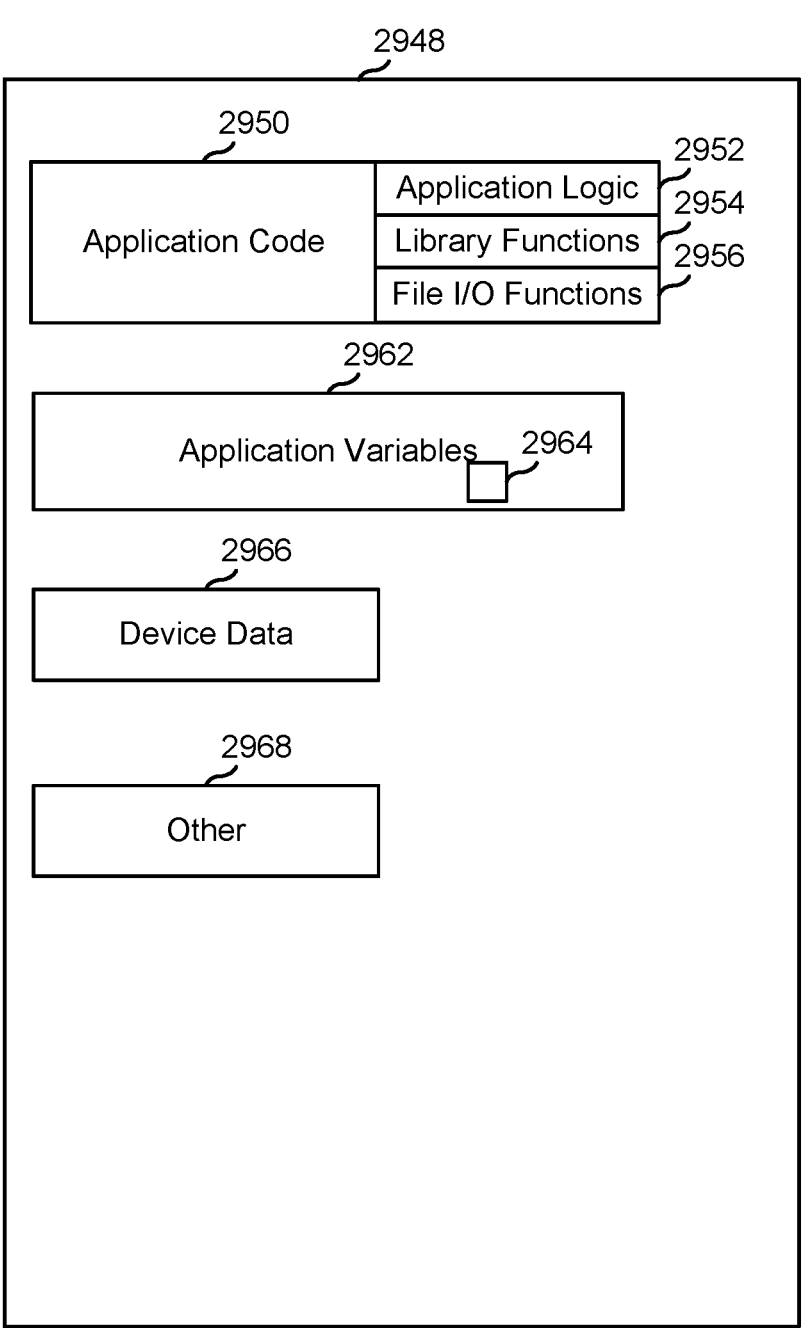
FIG. 28 illustrates an example computer system memory structure as might be used in performing methods described herein, according to various embodiments.

FIG. 28 illustrates an example of data structures that might be present in a memory 2948 or storage accessible to computer processors. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

Memory 2948 might include allocations for program code, some of which might write-only, and allocations for writable data. For example, Memory 2948 might store application code 2950 which might include application logic 2952, library functions 2954, and file I/O functions 2956. Such application code might be written specifically for a signal processing processor or a general-purpose processor to implement various functional blocks disclosed and described in various other figures. Memory 2948 might also store application variables 2962 and specific storage 2964 for variables referenced in various other figures. Memory 2948 might also include storage for device data 2966, and other memory storage 2968.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hardwired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Figure 29:
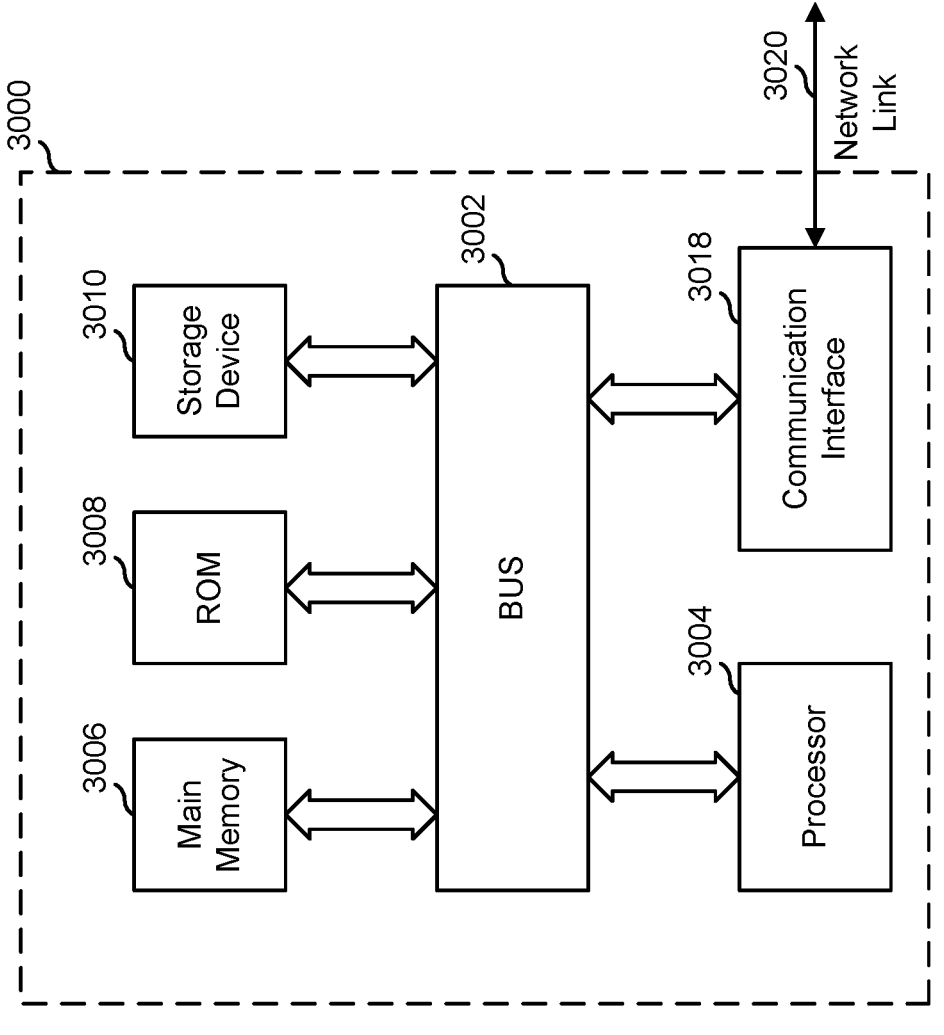
FIG. 29 is a block diagram illustrating an example computer system upon which the systems illustrated in various figures may be implemented, according to various embodiments.

FIG. 29 is a block diagram that illustrates a computer system 3000 upon which the computer systems of the systems described herein and/or data structures shown in FIG. 28 may be implemented. Computer system 3000 includes a bus 3002 or other communication mechanism for communicating information, and a processor 3004 coupled with bus 3002 for processing information. Processor 3004 may be, for example, a general-purpose microprocessor.

Computer system 3000 also includes a main memory 3006, such as a random-access memory (RAM) or other dynamic storage device, coupled to bus 3002 for storing information and instructions to be executed by processor 3004. Main memory 3006 may also be used for storing temporary variables or other intermediate information during execution of instructions to be executed by processor 3004. Such instructions, when stored in non-transitory storage media accessible to processor 3004, render computer system 3000 into a special-purpose machine that is customized to perform the operations specified in the instructions.

Computer system 3000 further includes a read only memory (ROM) 3008 or other static storage device coupled to bus 3002 for storing static information and instructions for processor 3004. A storage device 3010, such as a magnetic disk or optical disk, is provided and coupled to bus 3002 for storing information and instructions.

Computer system 3000 may implement the techniques described herein using customized hard-wired logic, one or more ASICs or FPGAs, firmware and/or program logic which in combination with the computer system causes or programs computer system 3000 to be a special-purpose machine. According to one embodiment, the techniques herein are performed by computer system 3000 in response to processor 3004 executing one or more sequences of one or more instructions contained in main memory 3006. Such instructions may be read into main memory 3006 from another storage medium, such as storage device 3010. Execution of the sequences of instructions contained in main memory 3006 causes processor 3004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 3010. Volatile media includes dynamic memory, such as main memory 3006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 3002. Transmission media can also take the form of acoustic or light waves, such as those generated during radio-wave and infra-red data communications.

Various forms of media may be involved in carrying one or more sequences of one or more instructions to processor 3004 for execution. For example, the instructions may initially be carried on a magnetic disk or solid-state drive of a remote computer. The remote computer can load the instructions into its dynamic memory and send the instructions over a network connection 3020. A modem or network interface 3018 local to computer system 3000 can receive the data. Bus 3002 carries the data to main memory 3006, from which processor 3004 retrieves and executes the instructions. The instructions received by main memory 3006 may optionally be stored on storage device 3010 either before or after execution by processor 3004.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A telecommunications transceiver adapted to communicate with a mobile device while the telecommunications transceiver is in Earth orbit, wherein communications is according to a communications protocol, the telecommunications transceiver comprising:

a receiver for receiving signals from the mobile device, including at least one received signal that is to be received by the telecommunications transceiver when the telecommunications transceiver is moving relative to the mobile device at more than a maximum relative velocity specified by the communications protocol;

a signal sampler for sampling the at least one received signal to derive an array of samples;

a fractional frequency offset module, for determining a fractional frequency offset from the array of samples;

a first storage for an array of corrected samples generated from the array of samples with application of the fractional frequency offset; and a signal processor for generating a modified signal from the array of corrected samples and a determined integer frequency offset.

2. The telecommunications transceiver of claim 1, further comprising a numerically controlled oscillator for use in a complex vector multiply operation wherein the numerically controlled oscillator is driven by the fractional frequency offset.

3. The telecommunications transceiver of claim 1, further comprising an integer frequency offset module for determining the integer frequency offset from the array of corrected samples to form an array of subsequent corrected samples, wherein the fractional frequency offset and the integer frequency offset combined correspond to a frequency shift resulting from the telecommunications transceiver is moving relative to the mobile device.

4. The telecommunications transceiver of claim 1, wherein a computed Doppler shift is computed from the fractional frequency offset, the determined integer frequency offset, and a nominal carrier frequency, the telecommunications transceiver further comprising a first signal processing block for modifying transmissions from the telecommunications transceiver to the mobile device to counter a corresponding Doppler shift expected, based on the computed Doppler shift, to occur on the transmissions from the telecommunications transceiver to the mobile device.

5. The telecommunications transceiver of claim 4, wherein determining the computed Doppler shift is computed from a determined nominal carrier frequency, the fractional frequency offset, and the determined integer frequency offset.

6. The telecommunications transceiver of claim 1, further comprising:

a delayed auto-correlator; and a complex number module for computing the fractional frequency offset using output of the delayed auto-correlation.

7. The telecommunications transceiver of claim 1, wherein the communications protocol is a protocol that specifies signaling using OFDMA waveforms.

8. The telecommunications transceiver of claim 1, wherein the communications protocol is a 3GPP LTE protocol.

9. The telecommunications transceiver of claim 1, wherein the telecommunications transceiver is adapted to communicate with the mobile device in compliance with a 5G NR protocol.

10. The telecommunications transceiver of claim 1, wherein the communications protocol uses a plurality of subchannels each having subchannel bandwidths that collectively span a channel bandwidth larger than a subchannel bandwidth and wherein a frequency shift due to the telecommunications transceiver moving relative to the mobile device at more than the maximum relative velocity specified by the communications protocol exceeds the subchannel bandwidth, the telecommunications transceiver further comprising:

an integer frequency offset module for determining the determined integer frequency offset, wherein the determined integer frequency offset corresponds to an integer times the subchannel bandwidth, wherein the fractional frequency offset module determines the fractional frequency offset based, at least in part, on the communications protocol as well as the array of samples.

11. The telecommunications transceiver of claim 10, wherein the fractional frequency offset plus the integer frequency offset represent a Doppler shift in transmission transmitted from the mobile device due to a relative velocity of the telecommunications transceiver relative to the mobile device.

12. The telecommunications transceiver of claim 11, further comprising a transmitter for transmitting a subsequent transmission from the telecommunications transceiver to the mobile device wherein the subsequent transmission is according to the communications protocol, adjusted to compensate for an expected frequency shift in the subsequent transmission, the expected frequency shift being estimated from the Doppler shift.

13. The telecommunications transceiver of claim 10, wherein the communications protocol includes constraints as to a relative velocity of the telecommunications transceiver to the mobile device, and wherein a deployment of the telecommunications transceiver is such that the telecommunications transceiver will be moving relative to the mobile device at more than the maximum relative velocity specified by the communications protocol, and wherein adjustment to compensate for an expected frequency shift in a subsequent transmission compensates the subsequent transmission to be received at the mobile device within a predetermined subchannel, whereby receipt by the mobile device of the subsequent transmission appears, at least to the mobile device, to be compliant with the communications protocol.

14. The telecommunications transceiver of claim 10, further comprising:

an auto-correlator that performs a delayed auto-correlation; and a complex number multiplier that outputs an angle corresponding to a complex number output of the delayed auto-correlation.

15. The telecommunications transceiver of claim 10, wherein the communications protocol is a protocol that specifies signaling using OFDMA waveforms.

16. The telecommunications transceiver of claim 10, wherein the communications protocol is a 3GPP LTE protocol.

17. The telecommunications transceiver of claim 10, wherein the telecommunications transceiver is adapted to communicate with the mobile device in compliance with a 5G NR protocol.

18. The telecommunications transceiver of claim 1, wherein the telecommunications transceiver is adapted to determine a relative velocity of the telecommunications transceiver relative to the mobile device and the relative velocity is determined from a Doppler shift indicated in the array of samples.

19. The telecommunications transceiver of claim 18, wherein the telecommunications transceiver is adapted to determine the Doppler shift by:

determining a nominal carrier frequency;

determining an integer frequency offset from the array of corrected samples; and computing the Doppler shift from the fractional frequency offset, the determined integer frequency offset, and the nominal carrier frequency.

20. The telecommunications transceiver of claim 19, wherein the telecommunications transceiver is adapted to determine the fractional frequency offset by:

performing a delayed auto-correlation; and identifying an angle corresponding to a complex number output of the delayed auto-correlation.

* * * * *